(12) United States Patent
Wang et al.

(10) Patent No.: US 7,000,885 B2
(45) Date of Patent: Feb. 21, 2006

(54) APPARATUS AND METHOD FOR FORMING A SOL-GEL MONOLITH UTILIZING MULTIPLE CASTING

(75) Inventors: Shiho Wang, Lake Forest, CA (US); Yasar Halefoglu, Aliso Viejo, CA (US); Chih-hsing Cheng, Fullerton, CA (US); Dengfeng Xu, Irvine, CA (US)

(73) Assignee: Simax Technologies, Inc., Irvine, CA (US)

( * ) Notice: Subject to any disclaimer, the term of this patent is extended or adjusted under 35 U.S.C. 154(b) by 507 days.

(21) Appl. No.: 10/062,746

(22) Filed: Feb. 1, 2002

(65) Prior Publication Data

US 2003/0148053 A1  Aug. 7, 2003

(51) Int. Cl.
 B27N 1/08 (2006.01)
(52) U.S. Cl. .................. 249/102; 249/115; 249/134; 249/146; 425/468; 65/323; 65/374.1; 65/395
(58) Field of Classification Search ............... 249/83, 249/102, 115, 134, 146; 425/112, 117, 468; 425/808; 65/17.2, 323, 374.1, 395
See application file for complete search history.

(56) References Cited

U.S. PATENT DOCUMENTS

| | | | |
|---|---|---|---|
| 1,727,257 A * | 9/1929 | Stratton et al. ............. 249/147 |
| 2,794,002 A | 5/1957 | Haensel et al. | |
| 3,850,971 A | 11/1974 | Termin et al. | |
| 4,104,363 A | 8/1978 | Vozka et al. | |
| 4,323,381 A | 4/1982 | Matsuyama et al. | |
| 4,395,015 A * | 7/1983 | Reardon ...................... 249/115 |
| 4,419,115 A | 12/1983 | Johnson, Jr. et al. | |
| 4,477,580 A | 10/1984 | Fleming, Jr. | |
| 4,707,174 A | 11/1987 | Johnson, Jr. et al. | |
| 4,752,459 A | 6/1988 | Perrer | |
| 4,775,401 A | 10/1988 | Fleming et al. | |
| 4,786,302 A | 11/1988 | Osafune et al. | |
| 4,810,674 A | 3/1989 | Che et al. | |
| 4,822,136 A | 4/1989 | Hicks, Jr. | |
| 4,840,653 A | 6/1989 | Rabinovich | |
| 4,849,378 A | 7/1989 | Hench et al. | |
| 4,851,150 A | 7/1989 | Hench et al. | |
| 4,851,373 A | 7/1989 | Hench et al. | |
| 5,023,208 A | 6/1991 | Pope et al. | |
| 5,074,633 A | 12/1991 | Cohen et al. | |
| 5,076,980 A | 12/1991 | Nogues et al. | |

(Continued)

FOREIGN PATENT DOCUMENTS

| | | |
|---|---|---|
| EP | 0131057 | 11/1987 |
| GB | 2170799 A | 8/1986 |
| GB | 2 334 254 A * | 8/1999 |
| JP | 59-030730 | 8/1982 |

OTHER PUBLICATIONS

Shibata, Shuichi, et al., *Fabrication of Fluorine-Doped Silica Glasses by the Sol-Gel Method*, Journal of Non-Crystalline Solids, vol. 100 (1988), pp. 269-273.

(Continued)

*Primary Examiner*—Donald Heckenberg
(74) *Attorney, Agent, or Firm*—Knobbe, Martens, Olson & Bear, LLP

(57) ABSTRACT

A mold is configured to form a gel monolith including a first gel portion and a second gel portion. The mold includes a base including a first hydrophobic surface. The mold further includes a tubular outer wall including a second hydrophobic surface, and the outer wall is coupled to the base. The mold further includes a removable tubular insert including an inner surface and an outer hydrophobic surface. The insert is removably coupled to the base.

26 Claims, 39 Drawing Sheets

U.S. PATENT DOCUMENTS

| | | | |
|---|---|---|---|
| 5,123,940 | A | 6/1992 | DiGiovanni et al. |
| 5,182,236 | A | 1/1993 | Caldwell et al. |
| 5,185,020 | A | 2/1993 | Satoh et al. |
| 5,236,483 | A | 8/1993 | Miyashita et al. |
| 5,243,769 | A | 9/1993 | Wang et al. |
| 5,250,096 | A | 10/1993 | Bruce et al. |
| 5,254,508 | A | 10/1993 | Kirkbir et al. |
| 5,264,197 | A | 11/1993 | Wang et al. |
| 5,314,520 | A | 5/1994 | Yagi et al. |
| 5,352,259 | A | 10/1994 | Oku et al. |
| 5,380,510 | A | 1/1995 | Matsui et al. |
| 5,494,863 | A | 2/1996 | Mathur |
| 5,871,558 | A | 2/1999 | Takei et al. |
| 5,922,099 | A | 7/1999 | Yoon et al. |
| 6,209,357 | B1 | 4/2001 | Bhandarkar et al. |
| 6,442,977 | B1 | 9/2002 | Bhandarkar et al. |
| 6,555,048 | B1 * | 4/2003 | Yoon et al. ................. 264/621 |
| 6,732,549 | B1 | 5/2004 | Lum et al. |
| 2003/0210881 | A1 | 11/2003 | Mendoza et al. |

OTHER PUBLICATIONS

Brinker & Scherer, "Sol-Gel Science, The Physics and Chemistry of Sol-Gel Processing," Academic Press, 1990, pp. 483-498.

Drying and sintering of large $SiO_2$ Monoliths, Murata, et al., SPIE vol. 2288, Sol-Gel Optics, pp. 709-716 (1994).

Parametric study of strength of silica gels, Kirkbir, et al., *J. Non-Crystalline Solids*, vol. 178, pp. 284-292 (1994).

Structural Changes of Monolithic Silica Gel During the Gel-to-Glass Transition, Kawaguchi, et al., *J. Non-Crystalline Solids*, vol. 82, pp. 50-56 (1986).

Solgel-derived photosensitive germanosilicate glass monliths, A.D. Heaney and T. Erdogan, *Optics Letters*, vol. 25, No. 24, pp. 1765-1767, Dec. 15, 2000.

File wrappers for U.S. Appl. Nos. 10/062,613 & 10/062,748.

* cited by examiner

APPARATUS AND METHOD FOR FORMING A SOL-GEL MONOLITH UTILIZING MULTIPLE CASTING

CROSS-REFERENCE TO RELATED APPLICATIONS

This application is related to U.S. Utility application Ser. No. 10/062,613, filed on Feb. 1, 2002, and U.S. Utility application Ser. No. 10/062,748, filed on Feb. 1, 2002.

BACKGROUND OF THE INVENTION

1. Field of the Invention

This invention relates to sol-gel monoliths for fabricating optical components with selected properties (e.g., chemical purity, homogeneity) compatible with a variety of applications, including high-performance optical systems.

2. Description of the Related Art

High-performance oxide-based materials are increasingly in demand for use in a variety of optical applications. For example, silica glass has the optical transmittance, mechanical hardness, chemical durability, thermal stability, low thermal expansion, and high laser damage threshold which make it an optimal material for applications such as optoelectronic laser diodes, fiber optic telecommunications, medical laser delivery systems, and military optical sensors. There is significant pressure on manufacturers to find materials and fabrication techniques which can satisfy the increasingly stringent performance requirements of these and other high-performance optical systems.

Numerous techniques are currently in use for the fabrication of glasses or ceramics. For example, silica glasses have traditionally been manufactured by melting natural quartz or synthetic silica in crucibles at high temperatures (typically about 1700° C.–2000° C.). However, the resultant materials have limited utility for various optical applications, primarily due to structural inhomogeneities as well as impurity concentrations (e.g., from intrinsic impurities in the raw materials, incomplete chemical reactions of components, and contamination by the crucible). Such high-temperature processes are also unsuitable for manufacturing products with certain compositions, tailored dopant or additive gradients, organic or high vapor pressure additives, or additives in their metallic or partially reduced states.

Another more recent technique for manufacturing silica glasses has been chemical vapor deposition (CVD), in which silicon-containing chemical vapors are combined with oxygen under high temperature conditions to deposit silica onto a substrate. However, the resultant materials are relatively expensive due to low material collection efficiencies, slow processing rates, and complex processing and pollution control equipment. Furthermore, CVD processes lack the versatility for fabricating more compositionally complex glasses.

Sol-gel technology has been used to fabricate products which satisfy some or all of the desired performance requirements without the difficulties or limitations found in more conventional fabrication techniques. A typical sol-gel silica process involves the transition of a liquid colloidal solution "sol" phase into a solid porous "gel" phase, followed by drying and consolidating (i.e., sintering) the resulting gel monolith at elevated temperatures to form silica glass. One method of preparing a silica porous gel monolith is to pour into a mold a solution of silica-forming compounds (e.g., silicon alkoxides), solvents, and catalysts, which then undergoes hydrolysis and polymerization, resulting in a wet porous gel monolith or matrix. After drying the wet gel monolith in a controlled environment to remove the fluid from the pores, the dry gel monolith is densified into a solid glass-phase monolith.

Sol-gel technology can yield products with the desired chemical purity, homogeneity, and flexibility in compositions, dopants, and dopant profiles. However, the potential for sol-gel processes for fabricating large monoliths has been limited by various problems. Large gel monoliths can take a long time to dry, thereby limiting the product throughput. But even more importantly, shrinkage of the gel monolith during the drying process often results in cracking, especially in larger gel monoliths.

As outlined by Pope, et al. in U.S. Pat. No. 5,023,208 and Wang, et al. in U.S. Pat. No. 5,264,197, both of which are incorporated by reference herein, this resultant cracking of gel monoliths during the drying step of the fabrication process is believed to result from stresses due to capillary forces in the gel pores. Numerous techniques for reducing this cracking have been proposed, and many of these efforts have focused on increasing the pore sizes of the gel monolith to reduce the capillary stresses generated during drying. Pope, et al. discloses subjecting the gel to a hydrothermal aging treatment which causes silica monomers to migrate from small pores to silica particle surfaces in the porous gel matrix, thereby increasing the average pore diameter. Wang, et al. discloses adjusting the relative concentrations of an alcohol diluent and/or one or more catalysts such as HCl or HF, which has the effect of increasing the average pore radius of the resulting dry gel. HF catalyzed gels generally have larger pore sizes than gels catalyzed by other catalysts such as HCl, $HNO_3$, $H_2SO_4$, or oxalic acid.

SUMMARY OF THE INVENTION

According to one aspect of the present invention, a mold is configured to form a gel monolith comprising a first gel portion and a second gel portion. The mold comprises a base comprising a first hydrophobic surface. The mold further comprises a tubular outer wall comprising a second hydrophobic surface, and the outer wall is coupled to the base. The mold further comprises a removable tubular insert comprising an inner surface and an outer hydrophobic surface. The insert is removably coupled to the base.

In another aspect of the present invention, a method forms a gel monolith having a first gel portion and a second gel portion. The method comprises preparing a first sol-gel solution comprising at least 3 mole % of a first catalyst. The method further comprises providing a mold having a first volume and a second volume. At least a portion of the first volume has a common boundary with at least a portion of the second volume. The method further comprises forming the first gel portion in the first volume, said forming comprising allowing the first sol-gel solution to gel in the first volume. The method further comprises preparing a second sol-gel solution comprising at least 3 mole % of a second catalyst. The method further comprises forming the second gel portion in the second volume after the first sol-gel portion has gelled along the common boundary. Forming the second gel portion comprises allowing the second sol-gel solution to gel in the second volume.

In yet another aspect of the present invention, a method forms a gel monolith comprising a plurality of gel portions. The method comprises preparing a first sol-gel solution comprising at least 3 mole % of a first catalyst. The method further comprises forming a tubular gel portion, said forming comprising confining the first sol-gel solution to a tubular volume and allowing the first sol-gel solution to gel while confined to the tubular volume. The method further comprises preparing a second sol-gel solution comprising at least 3 mole % of a second catalyst. The method further comprises forming a cylidrical gel portion, said forming comprising confining the second sol-gel solution to a cylindrical volume within the tubular volume and allowing the second sol-gel solution to gel while in the cylindrical volume.

BRIEF DESCRIPTION OF THE DRAWINGS

These and other aspects of the present invention will be apparent to the skilled artisan from the following detailed description read in conjunction with the appended drawings, which are meant to illustrate, and not to limit, the invention, and in which.

DETAILED DESCRIPTION OF THE PREFERRED EMBODIMENT

Preparing a Solution

Figure 1:
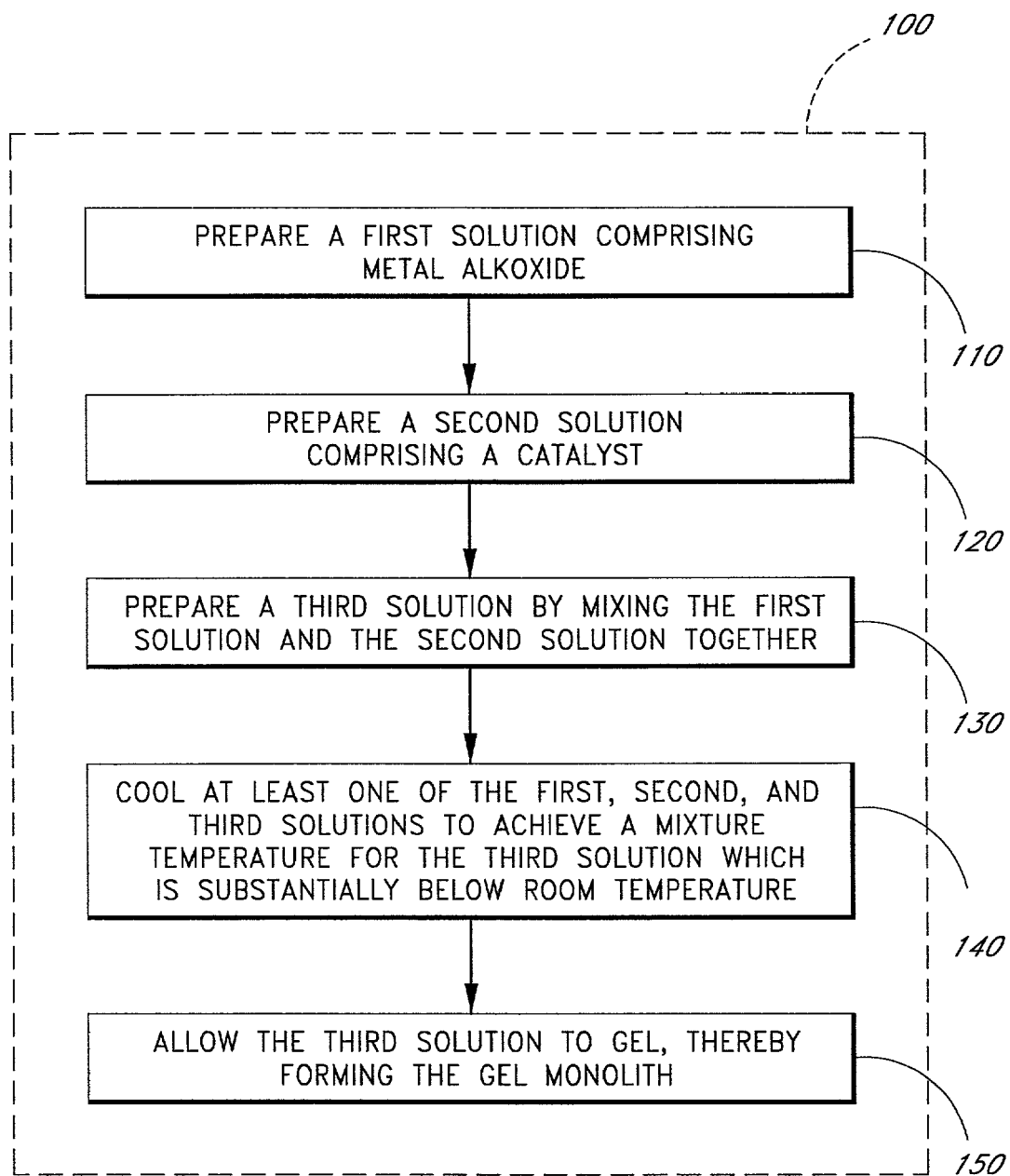
FIG. 1 is a flow diagram of a method of forming a gel monolith in accordance with an embodiment of the present invention.

During the drying of a large gel monolith, the gel monolith shrinks in size, and capillary forces in the gel pores arise as the liquid content of the gel monolith is reduced. The tendency of gel monoliths to develop cracks is dependent on these capillary forces. For example, U.S. patent application Ser. No. 09/615,628 by Wang, et al., entitled "Sol-Gel Process for Production of Oxide-Based Glass and Ceramic Articles," which is incorporated by reference herein, discloses a process that reduces the influence of these forces. The process comprises removing liquid from the pores of the gel monolith such that the outer region of the gel monolith is not dried before the inner region of the gel monolith is dried, thereby avoiding inhomogeneities in the capillary forces which cause stresses and cracking of the gel monolith.

Because the magnitude of the capillary forces is a function of the sizes of the pores in the gel monolith, the tendency for cracking of gel monoliths may be reduced by tailoring the gel microstructure so as to produce gel monoliths with larger pore sizes. The microstructure of a gel monolith is influenced by the rates of hydrolysis and of polymerization which occur simultaneously during the gelation of the wet gel monolith from the sol. For example, in the case of a silica-based sol in which tetraethylorthosilicate or TEOS (($C_2H_5O)_4Si$) is mixed with deionized water, a diluent or solvent such as ethyl alcohol or ethanol ($C_2H_5OH$), and a catalyst such as HF or ammonia, hydrolysis occurs with the following reaction: $(C_2H_5O)_4Si+4H_2O \rightarrow 4C_2H_5OH+Si(OH)_4$. The $Si(OH)_4$ molecules polymerize, resulting in a network of $SiO_2$ and water. Numerous factors influence the kinetics of hydrolysis and polymerization, including the type and concentration of any catalysts and the temperature profile. The influence of the catalyst concentration on the pore sizes of the resultant gel monoliths is illustrated by Wang, et al. in U.S. Pat. No. 5,264,197. Wang, et al. disclose that increasing the HF catalyst concentration, while maintaining constant concentrations of other constituents of the sol, results in an increase in the average pore radius of the resulting dry gel.

Catalysts such as HF or ammonia increase the rate of hydrolysis and polymerization. If the catalyst concentration is too high, the hydrolysis and polymerization reactions are so fast that the gelation time is extremely short, and in certain circumstances can be nearly instantaneous. Gelation time as used herein is defined as the time from the moment a sol comprising water and a silicon-containing material such as TEOS, along with the other constituents of the sol, is prepared to the moment the sol forms a gel which does not flow. Very short gelation times do not provide sufficient time to allow a prepared sol to be filtered, poured into molds for casting, eventual gelation, and further processing. In addition, bubbles which form during the gelation process may not have an opportunity to diffuse out of the gel if the gelation time is short, thereby degrading the quality of the resulting gel. Furthermore, higher temperatures have the effect of shortening the gelation time even further.

FIG. 1 is a flow diagram of a method 100 of forming a gel monolith in accordance with an embodiment of the present invention. While the flow diagram of FIG. 1 illustrates a particular embodiment with steps in a particular order, other embodiments with different orders of steps are also compatible with the present invention.

In the embodiment described in FIG. 1, in an operational block 110, a first solution 10 is prepared, the first solution 10 comprising metal alkoxide. Examples of metal alkoxides compatible with embodiments of the present invention include, but are not limited to, silicon alkoxides (such as tetramethylorthosilicate (TMOS) or tetraethylorthosilicate (TEOS)), germanium alkoxides (such as tetraethylorthogermanium (TEOG)), aluminum alkoxides, zirconium alkoxides, and titanium alkoxides. In certain embodiments, the first solution 10 comprises more than one metal alkoxide (e.g., both TEOS and TEOG). In certain embodiments, the first solution 10 further comprises a solvent. Examples of solvents include, but are not limited to, ethyl alcohol, methyl alcohol, or other alcohols.

In an operational block 120, a second solution 20 is prepared, the second solution 20 comprising a catalyst. Examples of catalysts include, but are not limited to, hydrofluoric acid (HF) and ammonia ($NH_3$). In certain embodiments, the second solution 20 further comprises a solvent, examples of which include, but are not limited to ethyl alcohol, methyl alcohol, or other alcohols.

In an operational block 130, a third solution 30 is prepared by mixing the first solution 10 and the second solution 20 together. While in certain embodiments, the second solution 20 further comprises water, in other embodiments, water is added to the third solution 30 such that the third solution 30 thereby comprises water and metal alkoxide. The third solution 30 can then begin to undergo the hydrolysis and polymerization reactions which form the gel. The presence of the catalyst in the third solution 30 accelerates the formation of the gel (i.e., reduces the gelation time of the third solution 30 as compared to the gelation time without the catalyst) as described above. In an operational block 140, at least one of the first solution 10, second solution 20, and third solution 30 is cooled to achieve a mixture temperature for the third solution which is substantially below room temperature. In certain embodiments, only the third solution 30 is cooled to achieve a mixture temperature which is substantially below room temperature. Such a mixture temperature serves to decelerate the formation of the gel, such that the third solution 30 has a significantly longer gelation time at the mixture temperature as compared to a room temperature gelation time for the third solution 30. In this way, cooling the third solution 30 to the mixture temperature makes it possible to increase the catalyst concentration in the third solution 30 while reducing the problematic effects associated with higher catalyst concentrations. In an operational block 150, the third solution 30 is allowed to gel, thereby forming the gel monolith.

Figure 2:
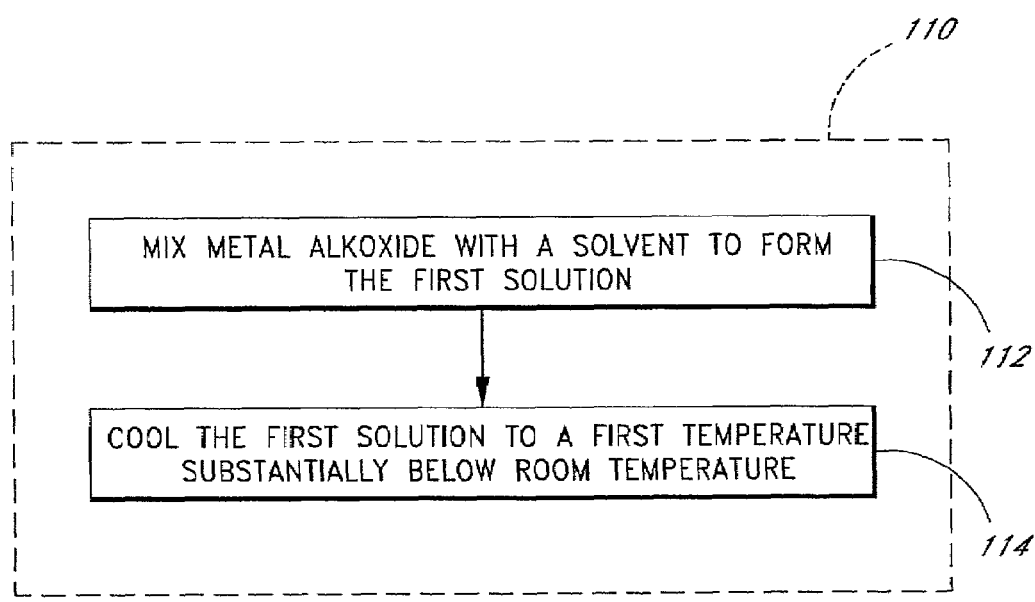
FIG. 2 is a flow diagram corresponding to another embodiment of the present invention in which the first solution is formed by mixing metal alkoxide with a solvent and cooling the first solution.

In certain embodiments, as illustrated in the flow diagram of FIG. 2, preparing 110 the first solution 10 comprises an operational block 112 in which metal alkoxide is mixed with a solvent to form the first solution 10 and an operational block 114 in which the first solution 10 is cooled to a first temperature substantially below room temperature. While FIG. 2 illustrates a particular embodiment in which mixing 112 occurs before cooling 114, in other embodiments one or both of the mixed constituents of the first solution 10 (i.e., the metal alkoxide and the solvent) can be cooled before or while being mixed together to form the first solution 10.

Figure 3A:
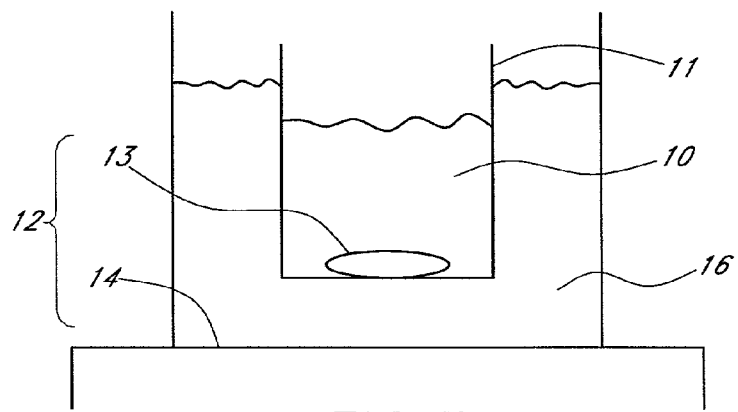
FIGS. 3A–3F schematically illustrate various embodiments of the present invention in which the first solution is mixed and cooled.
Figure 3B:
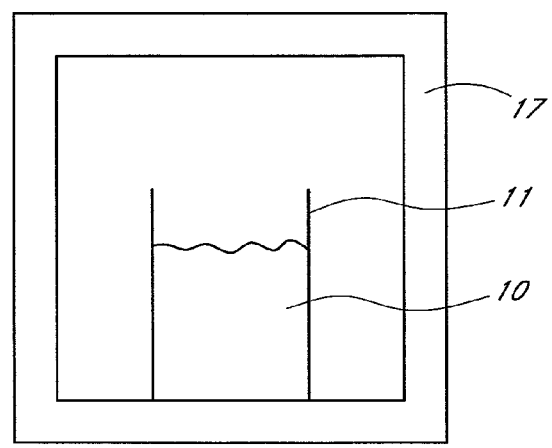
Figure 3C:
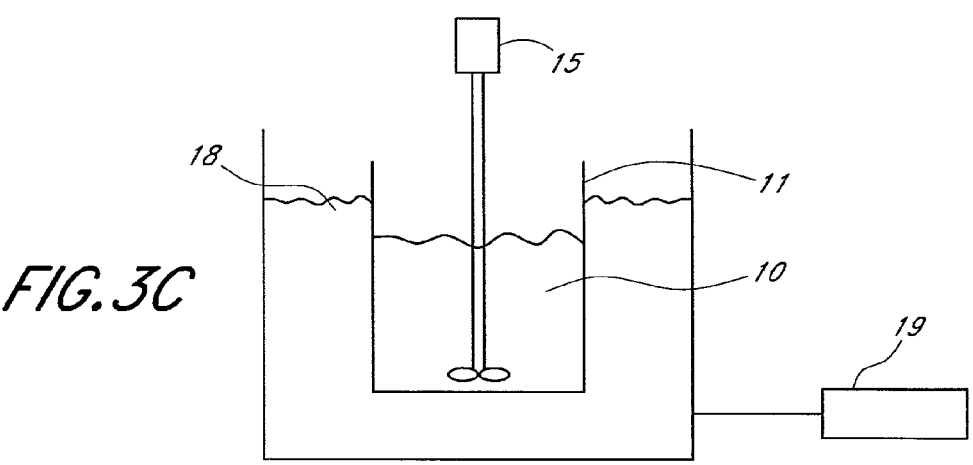

In certain embodiments, mixing 112 the metal alkoxide with the solvent is achieved by pouring both constituents of the first solution 10 into a first vessel 11. In other embodiments, a mixing system 12 is used to agitate the first solution 10 to ensure sufficiently homogeneous mixing of the metal alkoxide and the solvent. Examples of mixing systems 12 in accordance with embodiments of the present invention include, but are not limited to, magnetic stirrers, mechanical stirrers, static mixers, or other mechanisms to agitate the first solution 10. In the embodiment schematically illustrated in FIG. 3A, the mixing system 12 comprises a magnetic stirrer which includes a stir bar 13 comprising a ferromagnetic material and a magnetic driver 14 coupled to the stir bar 13. Upon activation, the magnetic driver 14 generates magnetic forces to spin the stir bar 13 within the first solution 10 for a predetermined period of time. In other embodiments, as schematically illustrated in FIG. 3C (discussed more fully below), the mixing system 12 comprises a mechanical stirrer 15 which is inserted into the first solution 10, activated to agitate the first solution 10 for a predetermined period of time, then removed from the first solution 10.

In certain embodiments, the first temperature is preferably approximately equal to or less than 0° C., more preferably approximately equal to or less than −10° C., still more preferably approximately equal to or less than −25° C., and most preferably approximately equal to or less than −40° C. In certain embodiments in which the first temperature is approximately equal to or less than 0° C., the first solution 10 can be cooled in a first vessel 11 placed in an ice bath 16 comprising a mixture of water and ice, as schematically illustrated in FIG. 3A. In still other embodiments, the first solution 10 can be cooled in a first vessel 11 contained within a refrigerator 17, as schematically illustrated in FIG. 3B. One example of a refrigerator 17 compatible with embodiments of the present invention is an Isotemp General Purpose Lab Refrigerator available from Fisher Scientific International of Hampton, N.H.

Figure 3D:
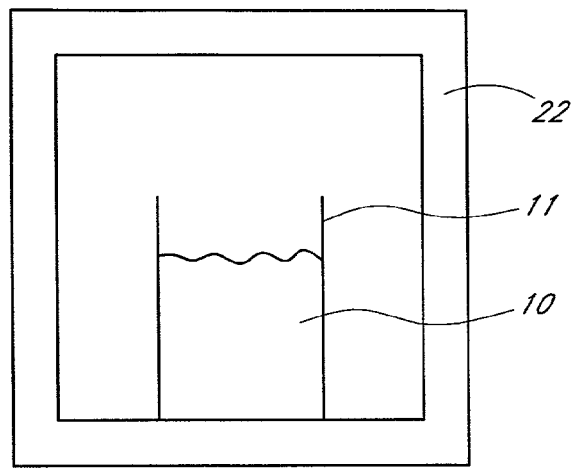

In certain embodiments in which the first temperature is approximately equal to or less than −10° C., the first solution 10 can be cooled in a first vessel 11 placed in a glycol bath 18 comprising a mixture of propylene glycol or ethylene glycol and water, typically in approximately equal proportions. In certain embodiments, as schematically illustrated in FIG. 3C, the glycol bath 18 is coupled to a chiller 19 which removes heat from the glycol bath 18 to maintain the desired first temperature. One example of a chiller 19 compatible with embodiments of the present invention is an RTE-140 Low Temperature Bath Circulator from Thermo Neslab of Portsmouth, N.H. In other embodiments in which the first temperature is approximately equal to or less than −25° C., the first solution 10 can be cooled in a first vessel 11 contained within a freezer 22, as schematically illustrated in FIG. 3D. One example of a freezer 22 compatible with embodiments of the present invention is an Isotemp General Purpose Lab Freezer available from Fisher Scientific International of Pittsburgh, Pa.

Figure 3E:
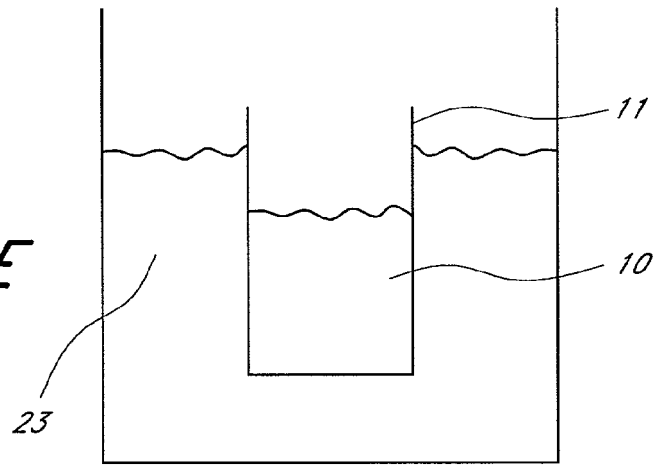
Figure 3F:
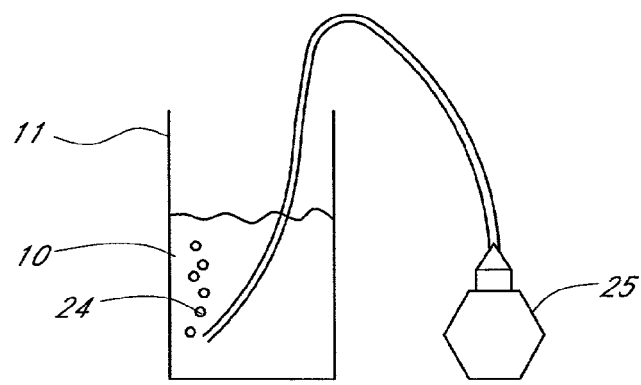

In certain embodiments in which the first temperature is approximately equal to or less than −40° C., the first solution 10 can be cooled in a first vessel 11 placed in a dry ice bath 23 comprising a mixture of dry ice ($CO_2$), propylene glycol or ethylene glycol, and water, as schematically illustrated in FIG. 3E. Typically, the dry ice bath 23 comprises equal amounts of propylene glycol or ethylene glycol, and water, and a sufficient amount of dry ice to reduce the temperature of the dry ice bath 23 to the desired level. In certain embodiments, a freezer 22 can be used to reach temperatures equal to or less than −40° C., as schematically illustrated in FIG. 3D. One example of a freezer 22 compatible with embodiments of the present invention is an ULT-80 Ultra Low Temperature Bath Circulator from Thermo Neslab of Portsmouth, N.H. In other embodiments, the first solution 10 can be cooled by bubbling nitrogen vapor 24 from a liquid nitrogen reservoir 25 through the first solution 10, as schematically illustrated in FIG. 3F.

Figure 4:
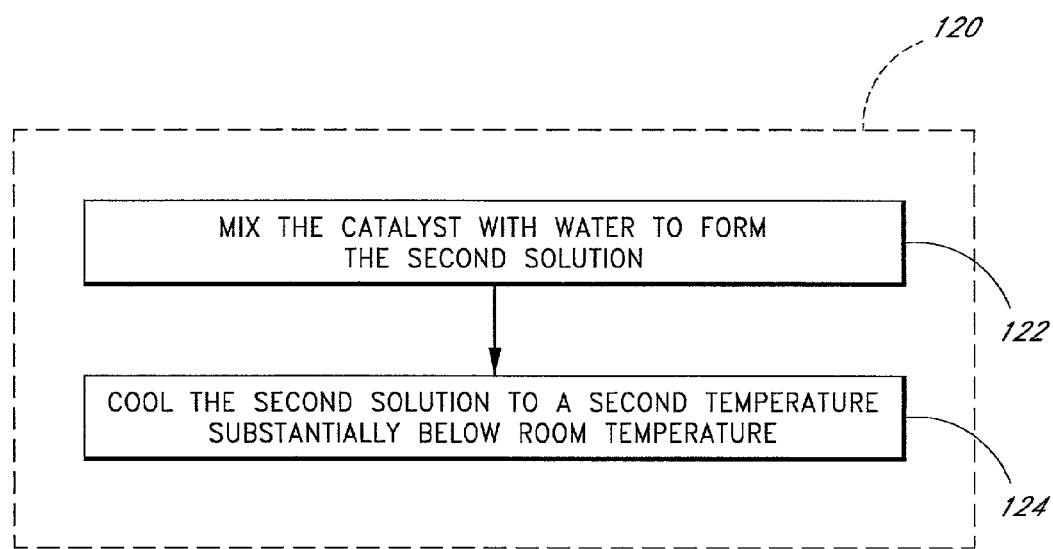
FIG. 4 is a flow diagram corresponding to another embodiment of the present invention in which the second solution is formed by mixing the catalyst with water and cooling the second solution.

As illustrated in the flow diagram of FIG. 4, in certain embodiments, preparing 120 the second solution 20 comprises an operational block 122 in which the catalyst is mixed with water to form the second solution 20 and an operational block 124 in which the second solution 20 is cooled to a second temperature substantially below room temperature. While FIG. 4 illustrates a particular embodiment in which mixing 122 occurs before cooling 124, in other embodiments one or both of the mixed constituents of the second solution 20 (i.e., the catalyst and the water) are cooled before or while being mixed together.

In certain embodiments, mixing 122 the catalyst with water is achieved by pouring both constituents of the second solution 20 into a second vessel. Similarly to the mixing 112 of the metal alkoxide with the solvent to form the first solution 10, in other embodiments, a stirring system can be used to agitate the second solution 20 to ensure sufficiently homogeneous mixing of the catalyst and water. Examples of stirring systems in accordance with embodiments of the present invention include, but are not limited to, magnetic stirrers, mechanical stirrers, static mixers, or other mechanisms to agitate the second solution 20.

In certain embodiments, the second temperature is preferably approximately equal to or less than 0° C., more preferably approximately equal to or less than −10° C., still more preferably approximately equal to or less than −25° C., and most preferably approximately equal to or less than −40° C. In certain embodiments in which the second temperature is approximately equal to or less than 0° C., the second solution 20 can be cooled in the second vessel placed in an ice bath 16 or contained in a refrigerator 17, as described above in relation to the cooling of the first solution 10. Similarly, in embodiments in which the second temperature is approximately equal to or less than −10° C., a glycol bath 18 and chiller 19 can be used, in embodiments in which the second temperature is approximately equal to or less than −25° C., a freezer 22 can be used, and in embodiments in which the second temperature is approximately equal to or less than −40° C., a dry ice bath 23 or a freezer 22 can be used. In addition, in other embodiments, the second solution 20 can be cooled by bubbling nitrogen vapor 24 from a liquid nitrogen reservoir 25 through the second solution 20.

Figure 5:
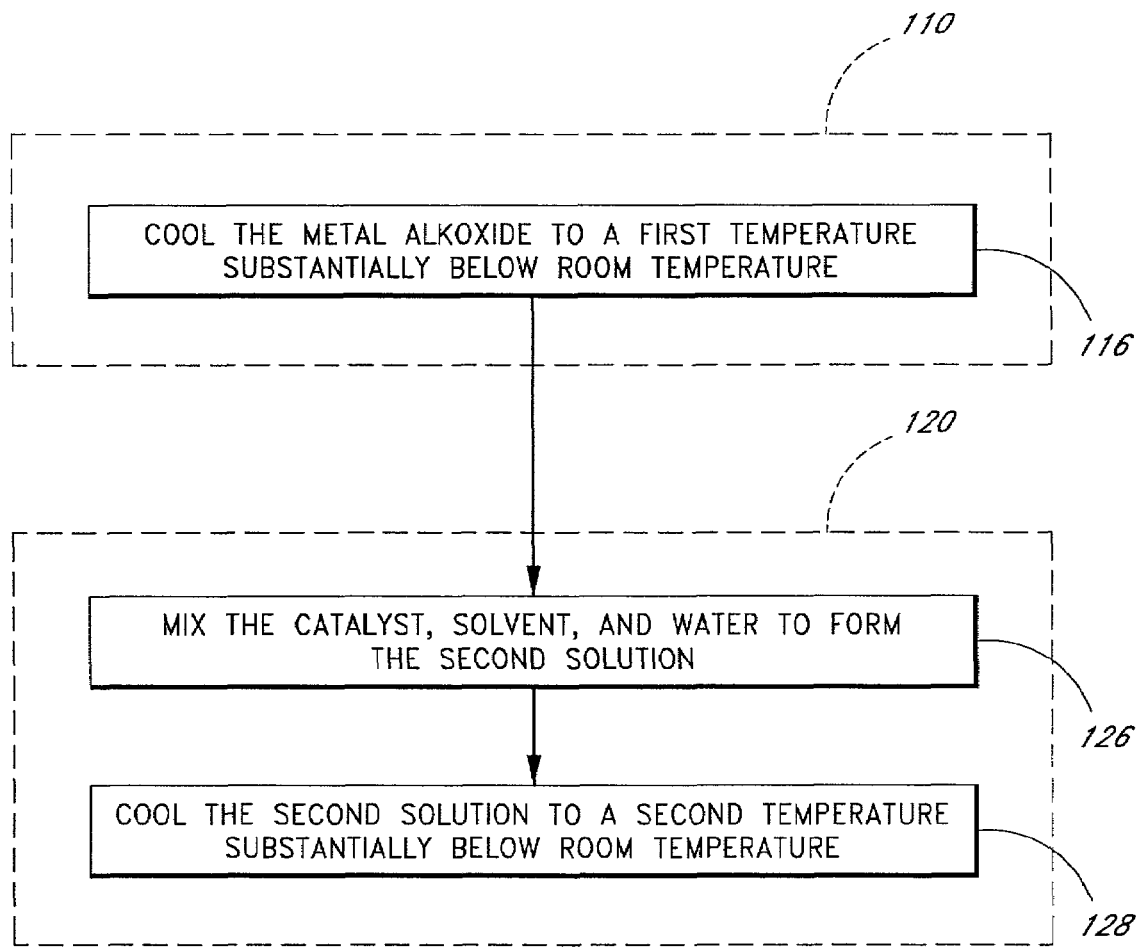
FIG. 5 is a flow diagram corresponding to another embodiment of the present invention in which the metal alkoxide is cooled to a first temperature, the second solution is formed by mixing the catalyst, solvent, and water, and cooling the second solution.

In certain embodiments, the first solution 10 can comprise metal alkoxide and the second solution 20 can comprise the catalyst, solvent, and water. In such an embodiment, as illustrated in the flow diagram of FIG. 5, preparing 110 the first solution 10 comprises cooling the metal alkoxide to a first temperature substantially below room temperature in an operational block 116. In such an embodiment, preparing 120 the second solution 20 comprises mixing the catalyst, solvent, and water to form the second solution 20 in an operational block 126, and cooling the second solution 20 to a second temperature substantially below room temperature in an operational block 128. Embodiments such as that illustrated in FIG. 5 avoid having the water freeze which would inhibit sufficient mixing and further processing of the gel monolith, for example in embodiments in which the second temperature is approximately equal to or less than −25° C. Other embodiments for preparing the first solution 10 and second solution 20 include other procedures for cooling the first solution 10 and second solution 20 without freezing any of the constituents.

Figure 6:
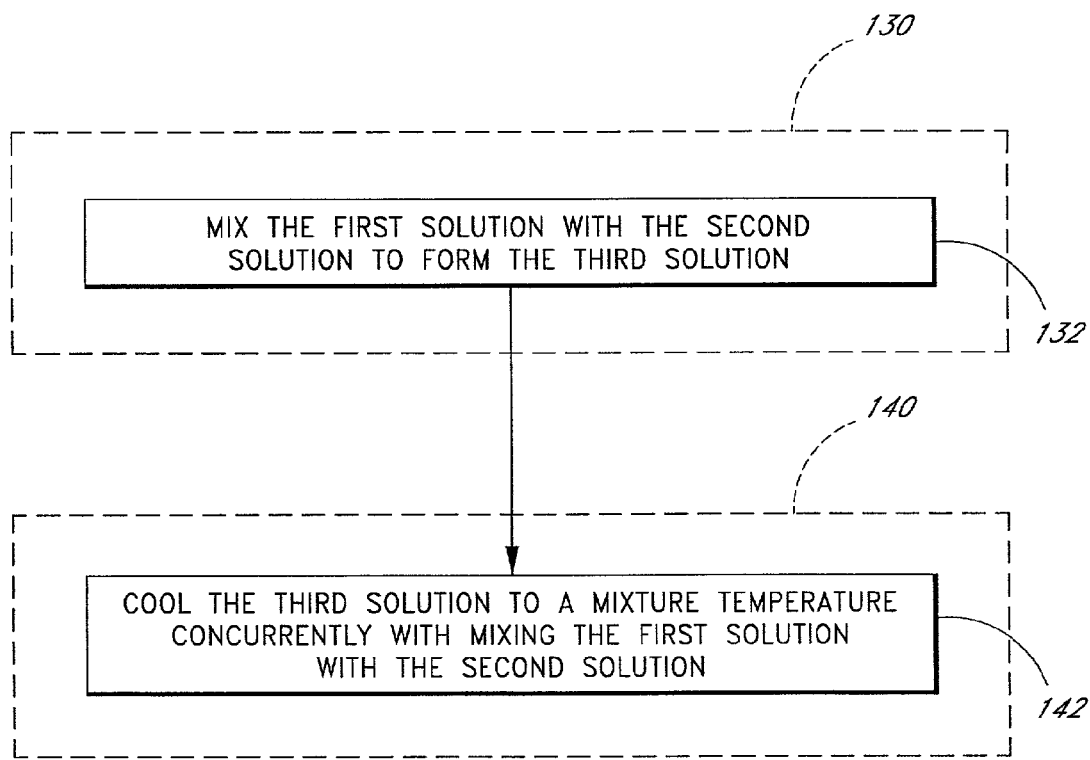
FIG. 6 is a flow diagram corresponding to another embodiment of the present invention in which the third solution is formed by mixing the first solution and the second solution, and cooling the third solution.

As illustrated in the flow diagram of FIG. 6, in certain embodiments, preparing 130 the third solution 30 comprises an operational block 132 in which the first solution 10 is mixed with the second solution 20 to form the third solution 30. In certain embodiments, mixing 132 the first solution 10 and second solution 20 is achieved by pouring both solutions 10, 20 into a third vessel 55. Alternatively in other embodiments, the first solution 10 is maintained at a temperature substantially below room temperature while being transferred to the third vessel 55 via a material measurement system 60.

Figure 7:
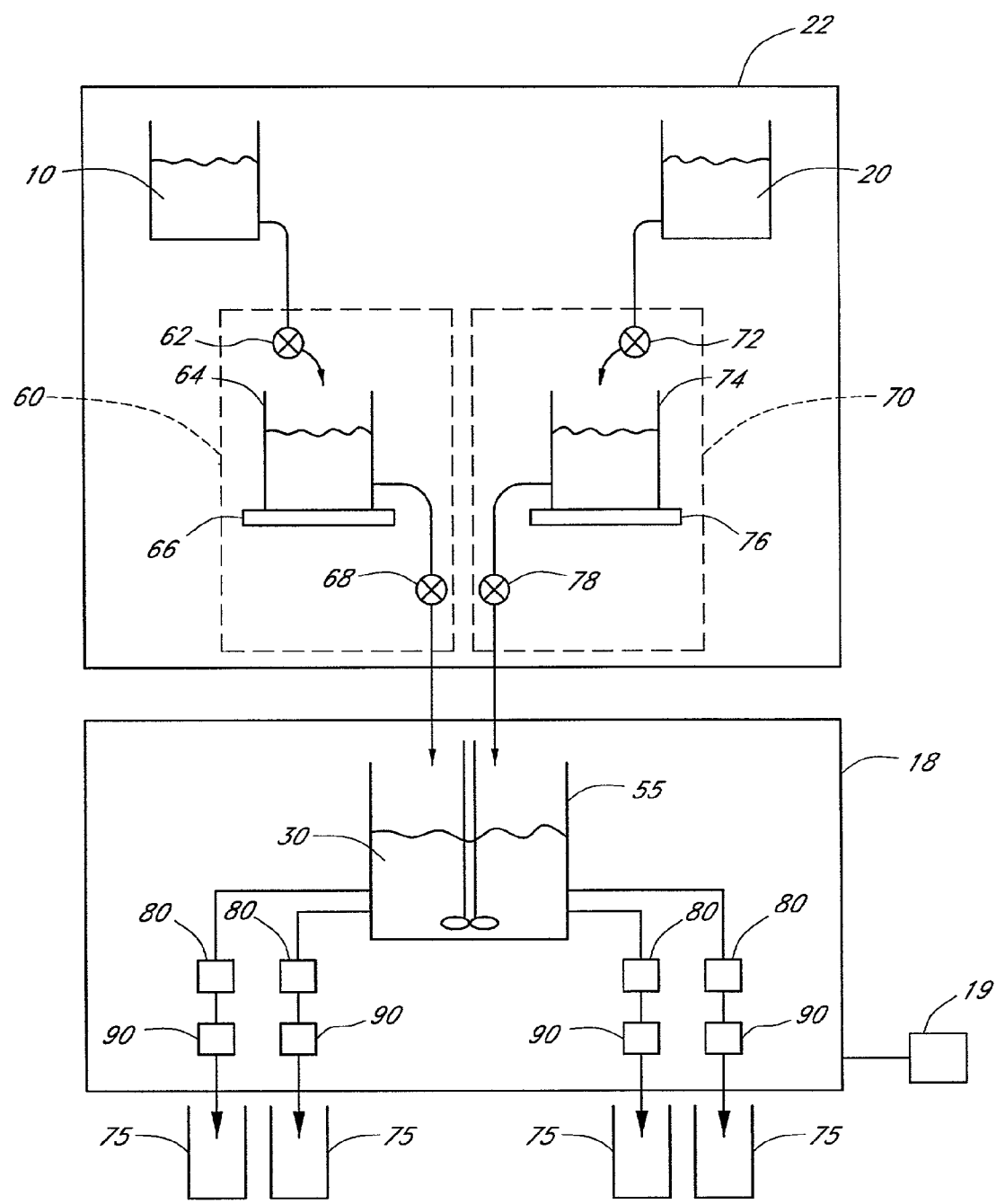
FIG. 7 schematically illustrates a mixing station in accordance with embodiments of the present invention.

As schematically illustrated in FIG. 7, the material measurement system 60 of certain embodiments comprises an input valve 62, a measuring vessel 64, a scale 66, and an output valve 68. In certain embodiments, the input valve 62 is adjustable and coupled to a proportional-integral-differential (PID) controller (not shown) to control the flow of the first solution 10 into the measuring vessel 64. The scale 66 of certain embodiments is a weight scale which provides a measure of the amount of the first solution 10 in the measuring vessel 64. Alternatively, in other embodiments, the scale 66 measures the total volume of the first solution 10 in the measuring vessel 64. The output valve 68 of certain embodiments is coupled to a solenoid (not shown) which opens and closes the output valve 68 in response to signals. In certain embodiments, the second solution 20 is transferred to the third vessel 55 via a second material measurement system 70. The second material measurement system 70 can be similar to the material measurement system 60 for the first solution 10, i.e., comprising a second input valve 72, a second measuring vessel 74, a second scale 76, and a second output valve 78, as schematically illustrated in FIG. 7. Other embodiments of the material measurement system 60 do not comprise a scale 66 or a second scale 76. Furthermore, in still other embodiments, the first solution 10 and the second solution 20 can be metered directly into the third vessel 55, thereby avoiding the measuring vessels 64, 74.

Similarly to the mixing 112 of the metal alkoxide with the solvent to form the first solution 10, in other embodiments, a stirring system can be used to agitate the third solution 30 to ensure sufficiently homogeneous mixing of the first solution 10 and second solution 20. Examples of stirring systems in accordance with embodiments of the present invention include, but are not limited to, magnetic stirrers, mechanical stirrers, static mixers, or other mechanisms to agitate the third solution 30.

At least one of the first solution 10, second solution 20, and third solution 30 is cooled 140 to achieve a mixture temperature for the third solution 30 which is substantially below room temperature. As illustrated in an operational block 142 of FIG. 6, in certain embodiments, the third solution 30 is cooled 142 to the mixture temperature concurrently with mixing 132 the first solution 10 with the second solution 20. In the embodiment schematically illustrated in FIG. 7, the third vessel 55 is in a glycol bath 18 coupled to a chiller 19 to maintain the third solution 30 at a temperature substantially below room temperature during mixing. While FIG. 6 illustrates a particular embodiment in which mixing 132 occurs concurrently with cooling 142, in other embodiments cooling 140 the third solution 30 occurs after mixing 132, or one or both of the mixed constituents of the third solution 30 (i.e., the first solution 10 or the second solution 20) are cooled before being mixed together.

Once the first solution 10 and the second solution 20 are mixed together, the metal alkoxide of the first solution 10 and the water of the second solution 20 begin to undergo exothermic hydrolysis and polymerization reactions which result in the formation of the gel monolith. The presence of a catalyst, such as HF, increases the reaction rates of these hydrolysis and polymerization reactions, thereby reducing the gelation time. With the temperature of the third solution 30 increasing due to the exothermic reactions, the reaction rates of these reactions increase even further, thereby reducing the gelation time even further. As described above, due to the combination of high catalyst concentrations and increased heat from the exothermic reactions, the hydrolysis and polymerization reaction rates can become too fast (i.e., the gelation time is too short) to allow sufficient processing of the gel monolith resulting from the third solution 30. Therefore, in embodiments of the present invention in which the third solution 30 comprises a catalyst, the third solution 30 is cooled 142 to a mixture temperature substantially below room temperature concurrently with the mixing 132 to reduce the heat available to the hydrolysis and polymerization reactions and to slow down the kinetics of these reactions. At the mixture temperature, the third solution 30 has a longer gelation time as compared to its gelation time at room temperature.

In certain embodiments, the mixture temperature is preferably approximately equal to or less than 0° C., more preferably approximately equal to or less than −10° C., still more preferably approximately equal to or less than −25° C., and most preferably approximately equal to or less than −40° C. In certain other embodiments, the third solution 30 is cooled to a mixture temperature at which the gelation time of the third solution 30 is increased by at least ten times as compared to the gelation time of the third solution 30 at room temperature. In certain embodiments in which the mixture temperature is approximately equal to or less than 0° C., the third solution 30 can be cooled using an ice bath 16 or a refrigerator 17, as described above in relation to the cooling of the first solution 10. Similarly, in embodiments in which the mixture temperature is approximately equal to or less than −10° C., a glycol bath 18 and chiller 19 can be used, in embodiments in which the mixture temperature is approximately equal to or less than −25° C., a freezer 22 can be used, and in embodiments in which the mixture temperature is approximately equal to or less than −40° C., a dry ice bath 23 or a freezer 22 can be used. In addition, in other embodiments, the third solution 30 can be cooled by bubbling nitrogen vapor 24 from a liquid nitrogen reservoir 25 through the third solution 30.

In certain embodiments, the third solution 30 is allowed to gel, thereby forming the gel monolith, as illustrated in the operational block 150 of the flow diagram of FIG. 1. The cooled third solution 30 is poured into a mold 75 in certain embodiments, where the hydrolysis and polymerization reactions are allowed to continue so that the third solution 30 gels into the gel monolith. In certain other embodiments, the third solution 30 is prepared by mixing the first solution 10 and second solution 20, filtering the resultant third solution 30, transferring the third solution 30 into the mold 75, and cooling the third solution 30 in the mold 75 while the third solution 30 continues to gel to form the gel monolith.

In still other embodiments, as schematically illustrated in FIG. 7, the third solution 30 is transferred from the third vessel into a series of molds 75 at approximately 20° C. via cooled pumps 80 and cooled filters 90. In certain embodiments, the pumps 80 are either cooled or insulated to prevent the temperatures of the third solution 30 from increasing while flowing to the molds 75. One example of a pump 80 compatible with embodiments of the present invention is Type Number UND1.300TT.18, available from KNF Neuberger, Inc. of Trenton, N.J.

The filters 90 remove particles from the third solution 30 which would degrade the quality of the resultant gel monolith. These particles can be contaminants or can be due to pre-gelling of small amounts of the third solution 30. In certain embodiments, each filter 90 comprises multiple filters, which can be chosen to remove particles within certain size ranges. For example, a filter 90 can comprise a 0.6 $\mu$m filter connected in series with a 0.05 $\mu$m filter. Filters of other sizes of particles are also compatible with embodiments of the present invention. In certain embodiments, the filters 90 are cooled or insulated to prevent the temperatures of the third solution 30 from increasing while flowing therethrough. Exemplary filters 90 compatible with embodiments of the present invention are available from Millipore Corporation of Bedford, Mass.

Figure 8:
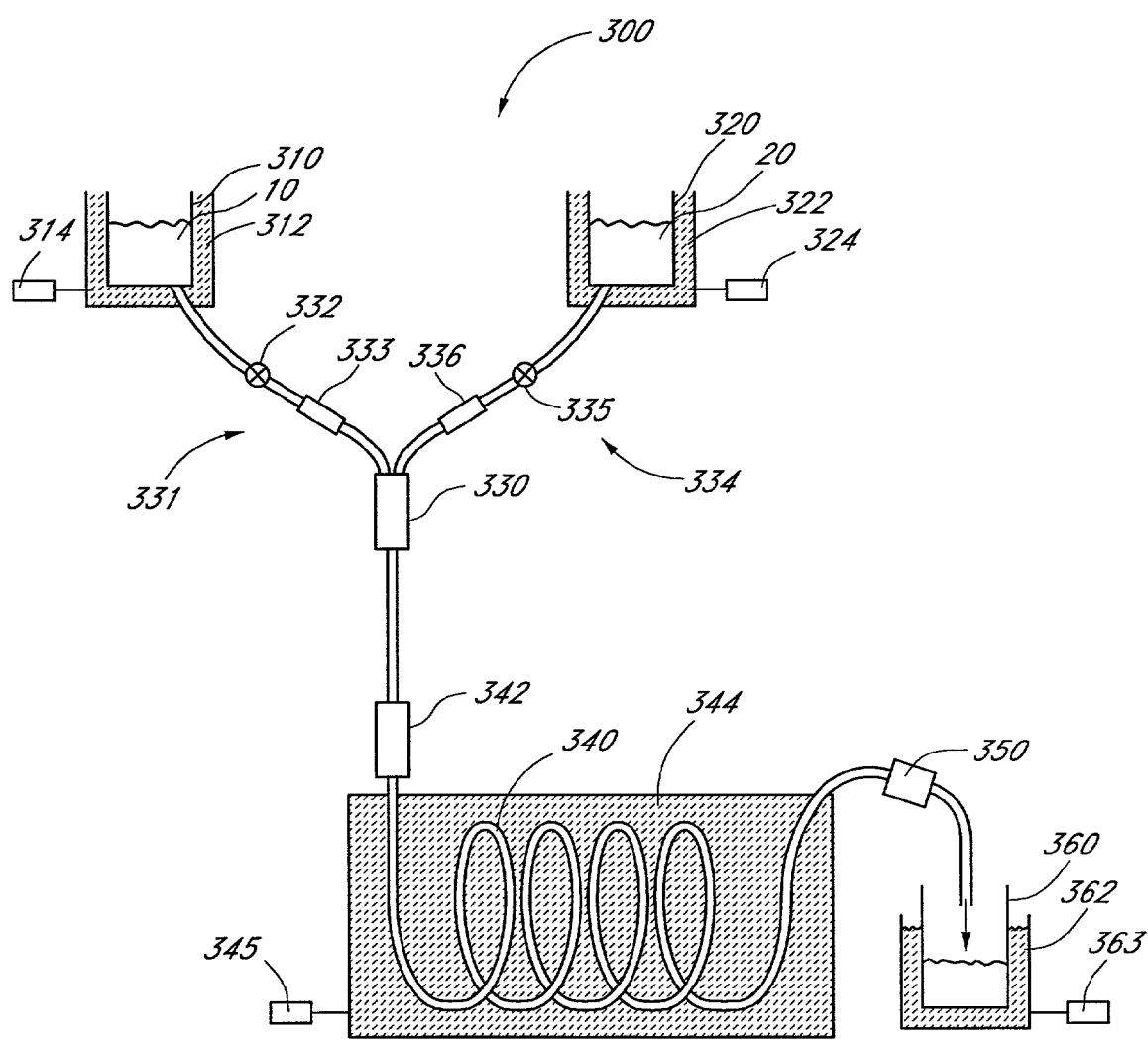
FIG. 8 schematically illustrates an alternative mixing station in accordance with embodiments of the present invention.

FIG. 8 schematically illustrates a mixing station 300 compatible with embodiments of the present invention in which the first solution 10 and second solution 20 are each prepared in a first vessel 310 and second vessel 320, respectively. In the embodiment schematically illustrated in FIG. 8, the first vessel 310 is cooled by a first glycol bath 312 which is maintained at a first temperature by a chiller 314. Similarly, the second vessel 320 is cooled by a second glycol bath 322 which is maintained at a second temperature by a chiller 324. In certain other embodiments, the first temperature and second temperature are approximately equal, and the first solution 10 and second solution 20 are cooled to the same temperature by a single bath. In addition, as described above, other types of baths or cooling procedures to reduce the temperatures of the first solution 10 and second solution 20 are in accordance with embodiments of the present invention.

In certain embodiments, the first vessel 310 is coupled to a static mixer 330 via a first fluid conduit 331 comprising a first valve 332 and a first pump 333, and the second vessel 320 is coupled to the static mixer 330 via a second fluid conduit 334 comprising a second valve 335 and a second pump 336. As schematically illustrated in FIG. 8, the first solution 10 is pumped through the first fluid conduit 331 from the first vessel 310 by the first pump 333 upon opening the first valve 332. Similarly, the second solution 20 is pumped through the second fluid conduit 334 from the second vessel 320 by the second pump 336 upon opening the second valve 335. In certain such embodiments, the mixing station 300 is configured to match the pressure drops along the first fluid conduit 331 and second fluid conduit 334 (e.g., by pressurizing the first vessel 310 and second vessel 320). In certain embodiments, the first fluid conduit 331 and second fluid conduit 334 are either cooled or insulated to prevent the temperatures of either the first solution 10 or second solution 20 from increasing while flowing to the static mixer 330.

Certain embodiments comprise an in-line static mixer 330, as schematically illustrated in FIG. 8, which has various mixing elements to generate vortices as the fluid flows through the static mixer 330, thereby providing an efficient mixing of the fluids flowing therethrough. Exemplary static mixers 330 compatible with embodiments of the present invention are available from Cole-Parmer Instrument Company of Vernon Hills, Ill. In certain embodiments, the static mixer 330 is either cooled or insulated to prevent the temperature of the third solution 30 from increasing while being mixed in the static mixer 330.

In the embodiment schematically illustrated in FIG. 8, the mixing station 300 further comprises a cooling coil 340 coupled to the static mixer 330 via a third pump 342. In certain embodiments, the cooling coil 340 is a thin-walled tube placed in a third glycol bath 344 which is coupled to a third chiller 345. The thin walls of the cooling coil 340 permit heat transfer from the third solution 30 to the third glycol bath 344, thereby achieving a mixture temperature for the third solution 30 substantially below room temperature. In addition, as described above, other types of baths or cooling procedures to reduce the mixture temperature of the third solution 30 are in accordance with embodiments of the present invention.

In the embodiment schematically illustrated in FIG. 8, the mixing station 300 comprise a filter 350 coupled to the cooling coil 340. In certain embodiments, the filter 350 comprises multiple filters, which can be chosen to remove particles within certain size ranges. For example, the filter 350 can comprise a 0.6 μm filter connected in series with a 0.05 μm filter. In certain embodiments, the filter 350 is cooled or insulated to prevent the temperatures of the third solution 30 from increasing while flowing therethrough. Exemplary filters 350 compatible with embodiments of the present invention are available from Millipore Corporation of Bedford, Mass.

In the embodiment schematically illustrated in FIG. 8, the third solution 30 flows through the filter 350 to the mold 360, which is in a fourth glycol bath 362 coupled to a fourth chiller 363. Alternatively in other embodiments, the mold 360 is at approximately room temperature. Once in the mold 360, the third solution 30 is permitted to gel, thereby forming the gel monolith. In addition, as described above, other types of baths or cooling procedures to reduce the temperature of the third solution 30 are in accordance with embodiments of the present invention.

In certain other embodiments, because of the corrosive nature of the constituents of the third solution 30 (e.g., the hydrogen fluoride catalyst), some or all of the components of the mixing station 300 have their internal portions coated with a protective material. Examples of protective materials in accordance with embodiments of the present invention include, but are not limited to, Teflon® available from E. I. DuPont de Nemours & Co. of Wilmington, Del. or Kynar® available from Elf Atochem North America of Philadelphia, Pa.

In certain other embodiments, some or all of the valves, pumps, and chillers are controlled by a control system comprising a microprocessor. In response to user input, the control system can regulate the timing and duration of the flow of the first solution 10, second solution 20, and third solution 30, as well as the temperatures of these solutions.

By preparing the third solution 30 at a mixture temperature substantially below room temperature, embodiments of the present invention allow higher percentages of catalyst in the third solution 30 without having gelation times which inhibit further processing of the gel monolith. For example, the gelation time for a third solution 30 comprising approximately 3.7 mole % of HF at room temperature is on the order of 100 to 200 seconds. Typically, a gelation time greater than approximately 5 minutes is required to pour the third solution 30 into a mold and to permit bubbles to diffuse out of the third solution 30, thereby avoiding difficulties in the processing of the gel monolith. When processing larger quantities of solution (e.g., during production runs), the time required to process the solution can be even longer. However, by preparing the same third solution 30 comprising approximately 3.7 mole % of HF at −14° C., the gelation time is on the order of 10 to 30 minutes. By preparing the third solution 30 at −40° C., the third solution 30 can comprise approximately 10 mole % of HF before the gelation time is shortened to 10 minutes.

As described above, higher percentages of the catalyst result in larger pore sizes in the resultant gel monolith, thereby reducing the capillary stresses generated during drying of the gel monolith. For example, a third solution 30 comprising approximately 3.7 mole % of HF results in a gel monolith with pore sizes of approximately 500 Å, while a third solution 30 comprising approximately 7.4 mole % of HF results in a gel monolith with pore sizes of approximately 1150 Å.

In certain embodiments, the third solution 30 comprises preferably greater than approximately 3 mole % of a catalyst, more preferably greater than 4 mole % of a catalyst, and most preferably greater than 10 mole % of a catalyst. In certain embodiments, the third solution 30 comprising greater than approximately 3 mole % of the catalyst is cooled to have a gelation time greater than approximately five minutes. In certain other embodiments, the third solution 30 comprising greater than approximately 3 mole % of a catalyst is cooled to have a gelation time greater than one hour. In still other embodiments, the third solution 30 comprising greater than approximately 3 mole % of a catalyst is cooled to have a gelation time greater than two hours.

Monoliths produced using chemical-vapor deposition techniques typically have pore diameter distributions which range from approximately 1000 Å to 2000 Å (i.e., with standard deviations of approximately 500 Å. In certain embodiments, the third solution 30 can result in gel monoliths with pore diameter distributions with mean pore diameters between approximately 400 Å and approximately 1600 Å, but with smaller ranges of diameters than those obtained using chemical-vapor deposition techniques, as described more fully below.

In an exemplary embodiment, a first solution 10 comprising approximately 900 grams of TEOS, approximately 117 grams of TEOG, and approximately 440 grams of ethanol is prepared and stored in a freezer 22 at a temperature of approximately −30° C. for approximately 20 hours. A second solution 20 comprising approximately 110 grams of ethanol, approximately 165 grams of water, and approximately 50 grams of a 49% HF (51% water) solution is also prepared and stored in the freezer 22 at a temperature of approximately −30° C. for approximately 20 hours. The first solution 10 and the second solution 20 are then mixed together using a magnetic stirrer in a vessel in a glycol bath 18 coupled to a chiller 19 whereby the temperature of the resultant third solution 30 is maintained between approximately −10° C. and −15° C. After mixing for a minimum of approximately five minutes, the third solution 30 is pumped into a mold 75 through a filter 80 comprising a 0.6 $\mu$m filter and a 0.05 $\mu$m filter. The mold 75 is then moved to a flat and safe area at approximately room temperature where the third solution 30 sits and forms a gel monolith. After the third solution 30 forms the gel monolith, ethanol is poured onto the gel monolith to prevent cracking due to the reaction heat generated inside the gel monolith body. All the steps of this exemplary embodiment are performed in a class 1000 or better clean room environment in which the temperature is maintained at approximately 60° to 70° F. and the humidity is between approximately 35% and 55%.

Prior to casting the gel monolith, the mold used for the casting is cleaned in certain embodiments to avoid any materials or particulate matter which could degrade the resultant gel monolith and could create bubbles between the gel monolith and the mold which would be potential stress points for cracking. Such cleaning procedures are also particularly important for embodiments in which a good surface finish of the gel monolith is desired.

Figure 9:
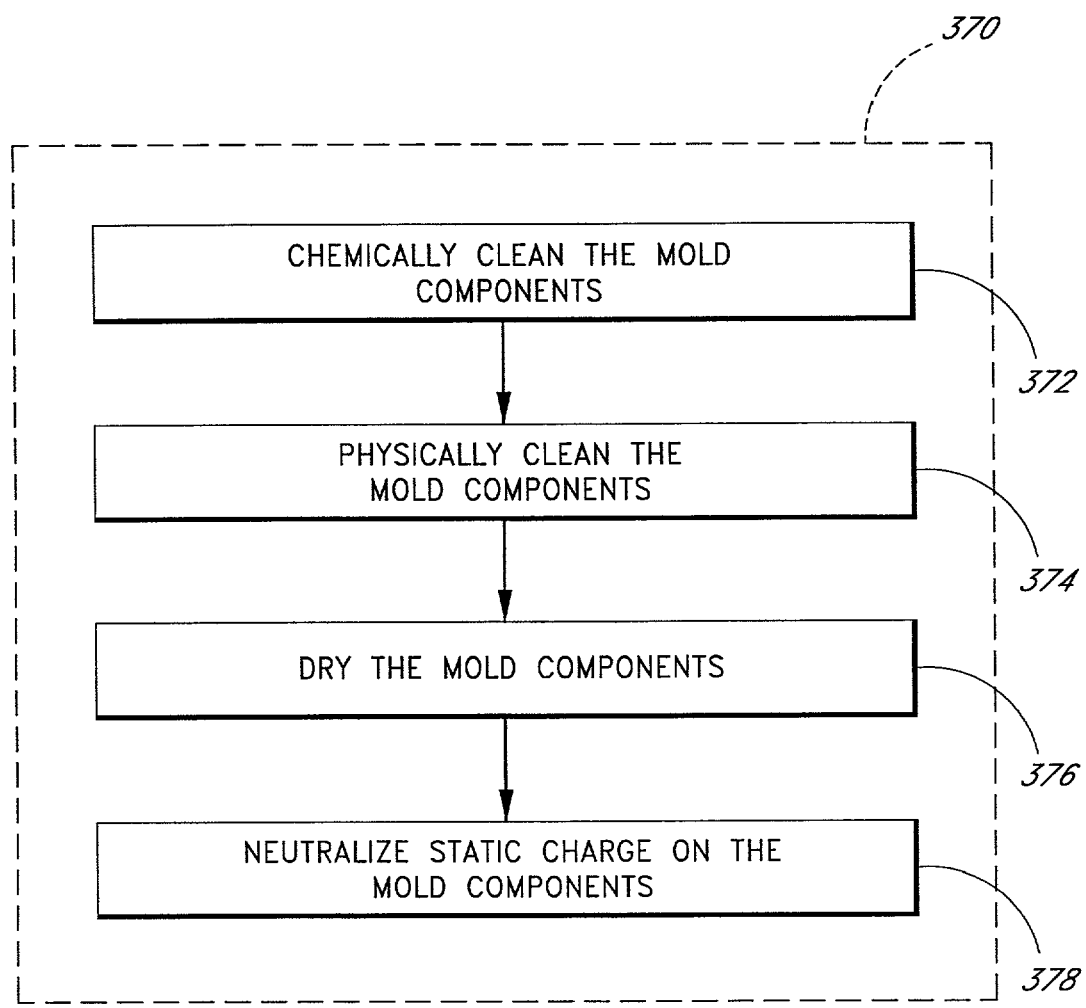
FIG. 9 is a flowchart of a procedure for preparing components of a mold for casting in accordance with embodiments of the present invention.

FIG. 9 is a flowchart of a procedure 370 for preparing components of a mold for casting in accordance with embodiments of the present invention. In certain embodiments, the procedure 370 is performed in a Class 1000 (or lower) clean room to reduce the possibility of particulate contamination of the mold prior to casting the gel monolith. In an operational block 372, the components of the mold are chemically cleaned. In an operational block 374, the components of the mold are physically cleaned. In an operational block 376, the components of the mold are dried. In an operational block 378, the components of the mold have any static charge neutralized.

In certain embodiments of the operational block 372, chemically cleaning the mold components comprises soaking the components in a HF solution and rinsing the components with deionized water. In certain such embodiments, a cleaning vessel is provided and visually inspected to ensure that it is free of residue such as dried gel, particles, dust, etc. The cleaning vessel is then filled to a desired level with a cleaning solution comprising deionized water and hydrofluoric acid (HF). In certain embodiments, the HF:$H_2O$ ratio is approximately 1:10. The mold components are then soaked in the cleaning solution for at least approximately 8 hours to remove residual material from the surfaces of the mold components. The mold components are then soaked in a first rinsing vessel containing deionized water for approximately 30 minutes to remove HF which has adhered to the surfaces of the mold components and are then soaked in a second rinsing vessel containing deionized water for approximately 5 minutes. The mold is then filled briefly with deionized water which is then dumped out.

In certain embodiments of the operational block 374, physically cleaning the mold components comprises ultrasonically cleaning the mold components. Certain mold components are filled with deionized water and placed in an ultrasonic cleaner for approximately 30 minutes, and are then emptied. A final rinse with deionized water is then performed.

In certain embodiments of the operational block 376, drying the mold components comprises allowing water to evaporate from the surfaces of the mold components. In certain embodiments of the operational block 378, neutralizing the static charge on the mold components comprises exposing the mold components to an anti-static air flow from a filtered air gun for approximately 10 to 15 seconds. A static meter can be used to ensure that the mold components are no longer statically charged. In addition, a particle counter can be utilized to detect particles within the mold. After the procedure 370, non-static, lint-free material can be used to completely cover the cleaned mold components until they are used for casting. Other embodiments of the procedure 370 for preparing mold components for casting are compatible with embodiments of the present invention.

Casting a Gel Monolith

Figure 10:
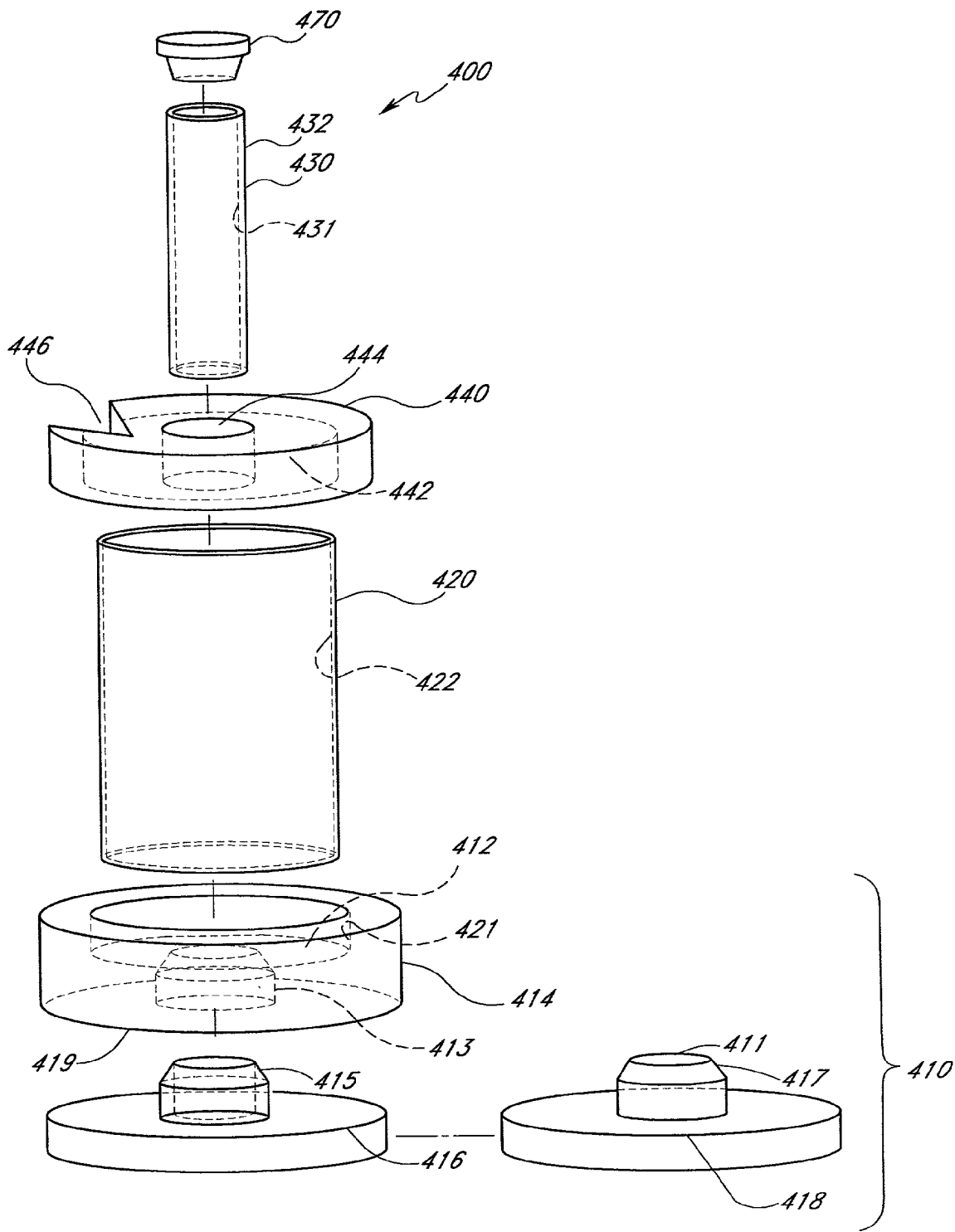
FIG. 10 schematically illustrates an exploded view of a mold for forming a gel monolith in accordance with embodiments of the present invention.

FIG. 10 schematically illustrates an exploded view of a mold 400 for forming a gel monolith 402 comprising a first gel portion 404 and a second gel portion 406 in accordance with embodiments of the present invention. FIGS. 11A–11D schematically illustrate interim stages during the formation of the gel monolith 402 in accordance with an embodiment of the present invention. The mold 400 comprises a base 410 comprising a first hydrophobic surface 412. The mold 400 further comprises a tubular outer wall 420 comprising a second hydrophobic surface 422 and the outer wall 420 is coupled to the base 410. The mold 400 further comprises a removable tubular insert 430 comprising an inner surface 431 and an outer hydrophobic surface 432 and the insert 430 is removably coupled to the base 410.

In certain embodiments, the first hydrophobic surface 412 of the base 410 comprises polytetrafluoroethylene (PTFE) (e.g., Teflon®), while in other embodiments, the first hydrophobic surface 412 comprises polymethylpentene (PMP), polystyrene (PS), or other hydrophobic materials. In addition, the first hydrophobic surface 412 in certain embodiments has a good surface finish (i.e., it is polished and sufficiently defect-free) to provide resultant glass surfaces which conform to the desired specifications. Certain embodiments can utilize a tapered first hydrophobic surface 412 to facilitate removal of the gel monolith 402 from the mold 400. The first hydrophobic surface 412 of such embodiments can be tapered from the tubular outer wall 420 to the tubular insert 430, and can be flat or have a curvature (e.g., spherical).

The base 410 can be fabricated entirely from these materials, thereby providing the first hydrophobic surface 412 of such embodiments. Alternatively, the base 410 can comprise other materials which have a coating of a hydrophobic material (e.g., PTFE, PMP, or PS) on one or more surfaces, thereby forming the first hydrophobic surface 412. In certain such embodiments, the base 410 accompanies the gel monolith 402 through additional processing steps, so the materials comprising the base 410 are able to withstand the various temperatures, pressures, and exposure to various corrosive compounds (e.g., HF, TEOS, Ge) to which the base 410 is subjected during the formation of the gel monolith 402. As is described more fully below, the base 410 is shaped so as to couple to the outer wall 420 and to the insert 430. In addition, the base 410 of certain embodiments is removably coupled to the outer wall 420 so as to facilitate cleaning of the mold 400 and removal of the gel monolith 402 from the mold 400.

In certain embodiments, as schematically illustrated in FIG. 10, the base 410 further comprises a first base portion 414 and a second base portion 416, or alternatively, the first base portion 414 and a third base portion 418. The first base portion 414 is coupled to the outer wall 420 and comprises the first hydrophobic surface 412, a cavity 413, and a mating surface 419. The cavity 413 extends from the first hydrophobic surface 412 to the mating surface 419. The second base portion 416 comprises a tubular projection 415 adapted to couple to the insert 430 and to the mating surface 419 of the first base portion 414 with the tubular projection 415 coupled to the cavity 413. The third base portion 418 comprises a solid projection 417 adapted to couple to the mating surface 419 with the solid projection 417 filling the cavity 413.

The second base portion 416 and third base portion 418 can each be interchangeably removably coupled to the first base portion 414. As is explained more fully below, when coupled to the first base portion 414, the second base portion 416 and third base portion 418 provide alternative versions of the base 410 compatible with various stages of the formation of the gel monolith 402 in accordance with an embodiment of the present invention. In addition, using a base 410 comprising removably coupled components facilitates cleaning of the mold 410 and removal of the gel monolith 402 from the mold 410.

In the embodiment schematically illustrated in FIG. 10, the cavity 413 is adapted to couple to the tubular projection 415 of the second base portion 416 when the second base portion 416 is coupled to the mating surface 419. Similarly, the cavity 413 is adapted to couple to the solid projection 417 of the third base portion 418 when the third base portion 418 is coupled to the mating surface 419. The tubular projection 415 is adapted to couple to the insert 430. In certain such embodiments, the insert 430 fits through the cavity 413 and is coupled to the tubular projection 415 when the second base portion 416 is coupled to the first base portion 414.

The solid projection 417 is adapted to fill the cavity 413 of the first base portion 414 once the insert 430 and second base portion 416 are removed from the mold 400. In certain such embodiments, the solid projection 417 has a top surface 411 which is hydrophobic and is substantially flush with the first hydrophobic surface 412 when the third base portion 418 is coupled to the first base portion 414.

In certain embodiments, the second hydrophobic surface 422 of the tubular outer wall 420 comprises PTFE, PMP, PS, or quartz coated with dichlorodimethylsilane (DCDMS). As described above in regard to the base 410, the outer wall 420 can be fabricated entirely from PTFE, PMP, or PS, or can comprise other materials which have a hydrophobic coating on one or more surfaces, thereby providing the second hydrophobic surface 422 in accordance with embodiments of the present invention. In addition, the second hydrophobic surface 422 in certain embodiments has a good surface finish (i.e., it is polished and sufficiently defect-free) to provide resultant glass surfaces which conform to the desired specifications. In embodiments in which the outer wall 420 accompanies the gel monolith 402 through additional processing steps, the outer wall 420 comprises materials which are able to withstand the various temperatures, pressures, and exposure to various corrosive compounds to which the outer wall 420 is subjected during the formation of the gel monolith 402.

In certain embodiments, the second hydrophobic surface 422 is cylindrical and the outer wall 420 is removably coupled to the base 410. For example, as schematically illustrated in FIG. 10, the outer wall 420 fits into a cylindrical recess 421 of the base 410 and can be removed to facilitate cleaning of the various components of the mold 400 (e.g., the base 410 and the outer wall 420) and to facilitate removal of the resultant gel monolith from the mold 400. In certain such embodiments, the cylindrical recess 421 of the base 410 comprises an o-ring (not shown) which couples to the outer wall 420, thereby forming a liquid-tight seal between the outer wall 420 and the base 410.

In certain embodiments, the outer hydrophobic surface 432 of the removable tubular insert 430 comprises PTFE, PMP, PS, or quartz coated with dichlorodimethylsilane (DCDMS). As described above in regard to the base 410 and the outer wall 420, the insert 430 can be fabricated entirely from PTFE, PMP, or PS, or can comprise other materials which have a hydrophobic coating on one or more surfaces, thereby providing the outer hydrophobic surface 432 in accordance with embodiments of the present invention. In addition, the outer hydrophobic surface 432 in certain embodiments has a good surface finish (i.e., it is polished and sufficiently defect-free) to provide resultant gel surfaces which conform to the desired specifications.

In certain exemplary embodiments, the insert 430 comprises a Heraeus F300 quartz tube (available from Heraeus Tenevo, Inc. of Duluth, Ga.). In such embodiments, the outer hydrophobic surface 432 is cylindrical. In certain embodiments in which the mold 400 is used to form an optical fiber preform comprising a core portion and a cladding portion, the second hydrophobic surface 422 is cylindrical and the outer hydrophobic surface 432 is cylindrical and concentric with the second hydrophobic surface 422. In such embodiments, the insert 430 is interior to and spaced from the outer wall 420 so as to form a volume for receiving a sol-gel solution.

In addition, the geometry of the core/cladding boundary of the resultant gel monolith is dependent on the geometry of the outer hydrophobic surface 432. For example, the smoothness, straightness, and ovality of the resultant core/cladding boundary are dependent on the corresponding parameters of the outer hydrophobic surface 432. In certain embodiments, the outer hydrophobic surface 432 satisfies a tolerance of ±1.5% of the diameter of the outer hydrophobic surface 432. In certain embodiments, the ratio of the diameter of the outer hydrophobic surface 432 of the insert 430 to the diameter of the second hydrophobic surface 422 of the outer wall 420 is less than approximately 1/2 and more preferably approximately equal to 1/3.

The insert 430 of certain embodiments is removably coupled to the base 410 so as to form an airtight seal between the insert 430 and the base 410. For example, as schematically illustrated in FIG. 10, the insert 430 fits through the cavity 413 of the first base portion 414 to fit within the tubular projection 415 of the second base portion 416. In certain such embodiments, the tubular projection 415 of the second base portion 416 comprises an o-ring (not shown) which couples to the insert 430, thereby forming a liquid-tight seal between the insert 430 and the second base portion 416.

In certain embodiments, the mold 400 further comprises a cap 440 which is removably coupled to the outer wall 420 and the insert 430, as schematically illustrated in FIG. 10. While FIG. 10 illustrates the cap 440 in conjunction with a particular embodiment of the mold 400, the cap 440 is compatible with other embodiments, as described below. In the embodiment schematically illustrated in FIG. 10, the cap 440 comprises a third hydrophobic surface 442 and a hole 444 to which the insert 430 is removably coupled. The cap 442 further comprises a cutout 446 that provides a conduit through which a sol-gel solution can be placed in the mold 400 while the cap 440 is coupled to the outer wall 420. In addition, other configurations of the cap 440 are compatible with embodiments of the present invention.

The third hydrophobic surface 442 of the cap 440 comprises PTFE, PMP, or PS in certain embodiments. Similarly to the base 410, the cap 440 can be fabricated entirely from PTFE, PMP, or PS, or can comprise other materials which have a hydrophobic coating on one or more surfaces, thereby providing the third hydrophobic surface 442. In embodiments in which the cap 440 accompanies the gel monolith 402 through additional processing steps, the cap 440 comprises materials which are able to withstand the various temperatures, pressures, and exposure to various corrosive compounds to which the cap 440 is subjected during the formation of the gel monolith 402. The third hydrophobic surface 442 of the cap 440 reduces the probability of the cap 440 sticking to the gel monolith 402 or to other portions of the mold 400, and helps to avoid impurities in the gel monolith 402. In certain embodiments, the hole 444 is positioned so that the outer hydrophobic surface 432 is concentric with the second hydrophobic surface 422.

Figure 11A:
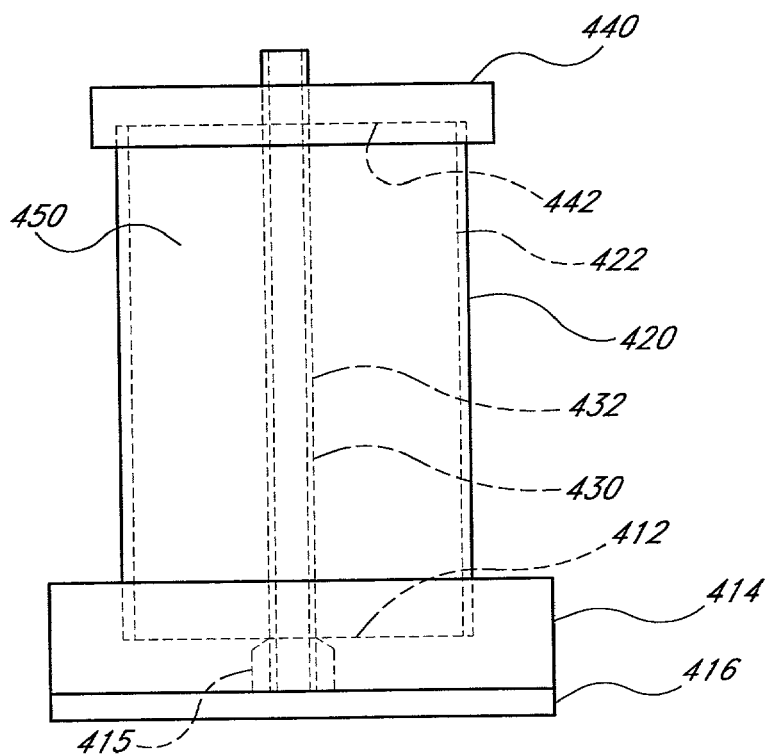
FIGS. 11A–11D schematically illustrate interim stages during the formation of the gel monolith using the mold of FIG. 10 in accordance with an embodiment of the present invention.
Figure 11B:
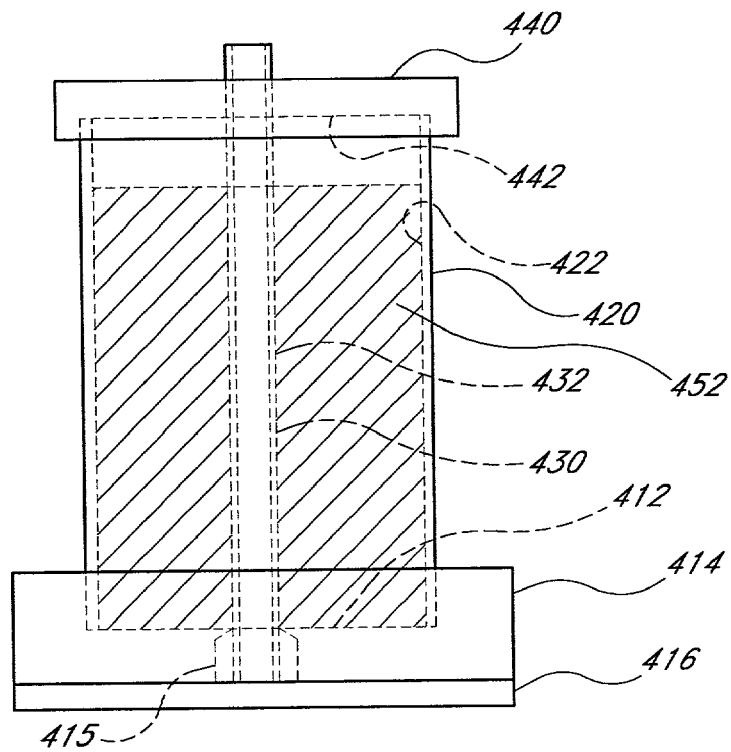

As schematically illustrated in FIG. 11A, in certain embodiments, the mold 400 defines a first volume 450. The insert 430 is interior to and spaced from the outer wall 420 so as to form the first volume 450. A portion of the first volume 450 is bounded by the first hydrophobic surface 412, the second hydrophobic surface 422, and the outer hydrophobic surface 432. In certain embodiments, the first volume 450 is further defined by the third hydrophobic surface 442. The first volume 450 is adapted to receive a first sol-gel solution 452, as schematically illustrated in FIG. 11B, which undergoes gelation to form the first gel portion 404.

In an exemplary embodiment, the first sol-gel solution 452 placed within the first volume 450 is allowed to gel in the first volume 450. As schematically illustrated in FIG. 11C, the resulting configuration has at least a portion of the first volume 450 filled by the first gel portion 404, with the insert 430 defining a hole through the first gel portion 404.

Figure 11C:
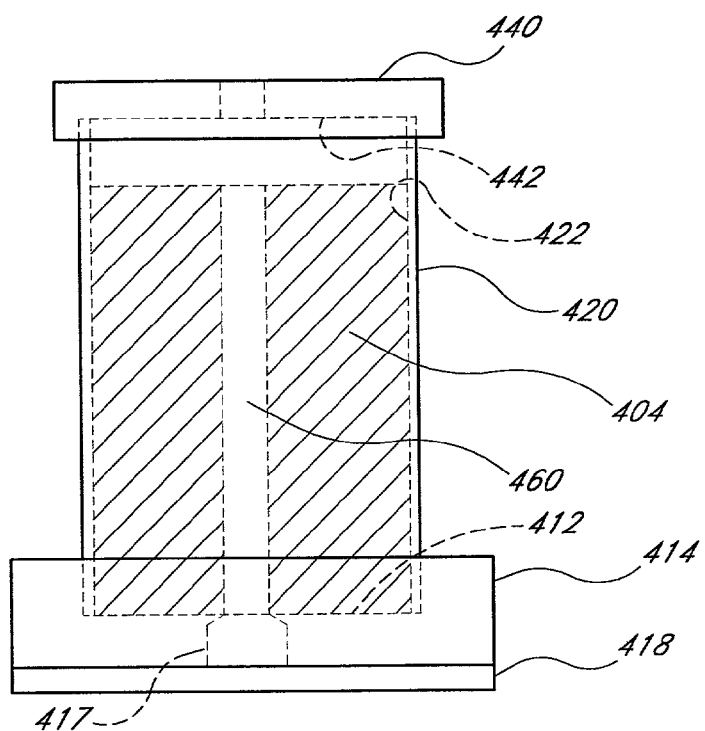

In certain embodiments, after forming the first gel portion 404, the insert 430 is removed from the mold 400 in preparation of forming the second gel portion 406, as schematically illustrated in FIG. 11C. In certain such embodiments, removal of the insert 430 is performed slowly and carefully to avoid damaging the first gel portion 404. In prior art systems which use a solid rod to define a hole through a gel, the gel forms a substantially airtight seal with the rod, and removal of the rod generates a vacuum region in the volume vacated by the rod. The atmospheric force on the rod due to this vacuum region hinders continued removal of the rod and can increase the likelihood of damaging the first gel portion 404 during the removal of the rod.

Conversely, in embodiments of the present invention, the insert 430 provides a conduit for gas to get to the volume vacated by the insert 430 as it is pulled out of the first gel portion 404 and base 410. In this way, embodiments of the present invention do not generate the vacuum region and its corresponding atmospheric force which otherwise hinders the removal of the insert 430.

As schematically illustrated in FIG. 11C, removal of the insert 430 from the mold 400 and replacement of the second base portion 416 with the third base portion 418 results in a configuration in which the first gel portion 404 has a substantially empty second volume 460 extending through the first gel portion 404. The second volume 460 is adapted to receive a second sol-gel solution 462 which undergoes gelation to form the second gel portion 406. In certain such embodiments, a portion of the second volume 460 is bounded by the first gel portion 404 and by the hydrophobic top surface 411 of the solid projection 417 of the third base portion 418.

Figure 11D:
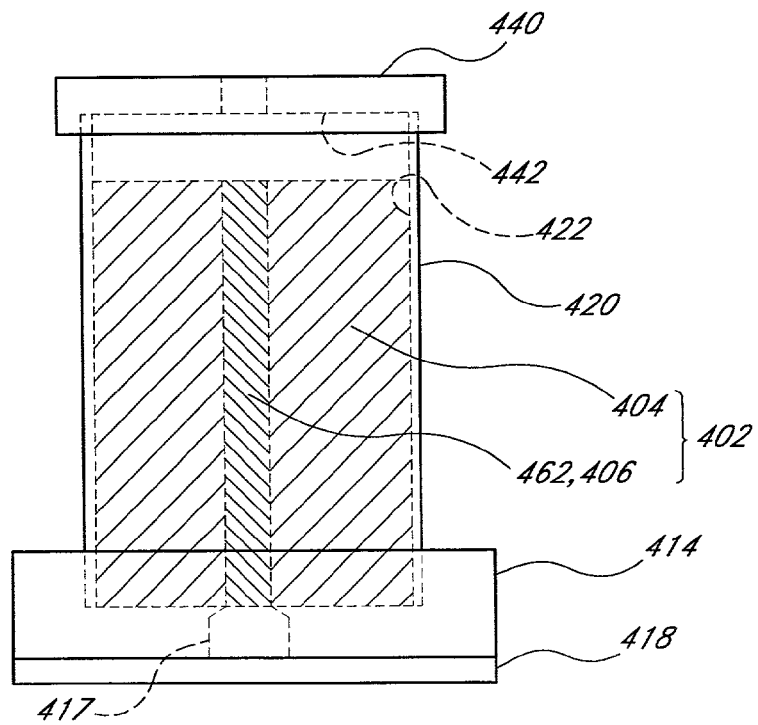

In an exemplary embodiment, the second sol-gel solution 462 is placed within the second volume 460 and is allowed to gel in the second volume 460. As schematically illustrated in FIG. 11D, the resulting configuration has at least a portion of the second volume 460 filled by the second gel portion 406. In embodiments in which the solid projection 417 has a hydrophobic top surface 411 that is substantially flush with the first hydrophobic surface 412, the corresponding ends of the resultant first gel portion 404 and second gel portion 406 are substantially flush with one another, thereby avoiding stress-generating corners in the interface region between the first gel portion 404 and the second gel portion 406.

In certain embodiments, the first gel portion 404 and the second gel portion 406 have different refractive indices and can be used in an optical fiber preform. In certain such embodiments, the ratio of the diameter of the outer hydrophobic surface 432 to the second hydrophobic surface 422 is approximately 1/3.

Embodiments of the process of multiple casting to form a resulting gel monolith 402 in accordance with embodiments of the present invention can have attributes which are particularly well-suited to forming optical fiber preforms and which have not been achieved by prior art systems. First, fabrication of optical preforms using multiple castings can be less complicated than prior art processes which utilize gas deposition. Multiple casting is predominantly a solution-based fabrication technique which can avoid the complexities and costs inherent in the gas-based chemistry of prior art deposition processes, such as gas handling, temperature control, and pollution control. In addition, optical preforms produced in accordance with embodiments of the present invention can be less expensive than those produced using prior art processes, by avoiding the low material collection efficiencies and the slow processing rates of deposition processes.

Second, by casting both the core portion and cladding portion using sol-gel processes, embodiments of multiple casting do not require low-OH and low-transition-metal silica deposition tubes as do prior art processes. For example, in modified chemical vapor deposition (MCVD), silica material (which becomes the outer surface of the core portion of the fiber) is deposited within a deposition tube (which can become the cladding portion of the fiber) by introducing gases and vapors within the deposition tube while heating and rotating the deposition tube. Because the cladding portion interacts with the light transmitted through the fiber, the deposition tube must have high optical quality (e.g., low OH and impurity concentrations) to avoid attenuation of the transmitted light.

Third, multiple casting in accordance with embodiments of the present invention can fabricate more compositionally complex optical fiber preforms than can deposition processes. For example, multiple castings of sol-gel materials can generate optical preforms comprising organic materials which would otherwise decompose under the high temperatures inherent in deposition processes such as MCVD, outside vapor deposition (OVD), or vapor axial deposition (VAD). In addition, by judiciously selecting the sol-gel materials to use in the multiple casting, embodiments of the present invention can generate tailored refractive index profiles across the optical fiber preform.

Fourth, multiple casting in accordance with embodiments of the present invention can be performed as batch processes (i.e., fabricating a plurality of optical fiber preforms in parallel). And fifth, forming a sleeve portion of a sol-gel-based optical fiber preform in accordance with embodiments of the present invention, as described more fully below (e.g., rod-in-tube process), utilizes less sophisticated sleeving processes than do chemical-vapor-deposition processes.

In certain embodiments, as schematically illustrated in FIG. 10, the mold 400 further comprises a plug 470 which is removably coupled to the insert 430. When coupled to the insert 430, the plug 470 forms an airtight seal between the plug 470 and the insert 430. As schematically illustrated in FIGS. 12A–12C, such embodiments can be used to form a gel monolith 402 with interim steps in accordance with embodiments of the present invention.

In certain embodiments, the plug 470 comprises a material which is chemically resistant to the corrosive compounds to which the plug 470 may be exposed during processing. Examples of materials compatible with embodiments of the present invention include, but are not limited to, silicone, PTFE, PMP, PS, and fluoroelastomer such as Viton® available from DuPont Dow Elastomers L.L.C. of Wilmington, Del. The material of the plug 470 can reduce the probability of the plug 470 sticking to the insert 430 and helps to avoid impurities in the gel monolith 402.

The plug 470 is dimensioned to be removably fit onto the insert 430 so as to form an airtight seal between the insert 430 and the plug 470. In certain embodiments, the plug 470 is tapered so as to fit within the inner diameter of the insert 430 to form an airtight seal with the inner surface 431, as schematically illustrated in FIG. 10.

Figure 12A:
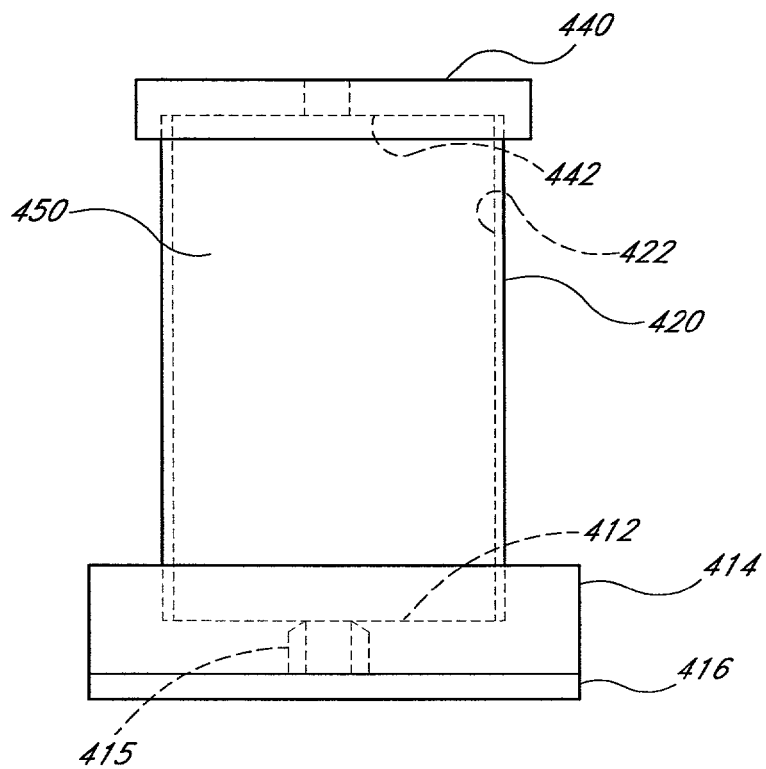
FIGS. 12A–12C schematically illustrate interim stages during the formation of the gel monolith using the mold of FIG. 11 in accordance with an embodiment of the present invention.
Figure 12B:
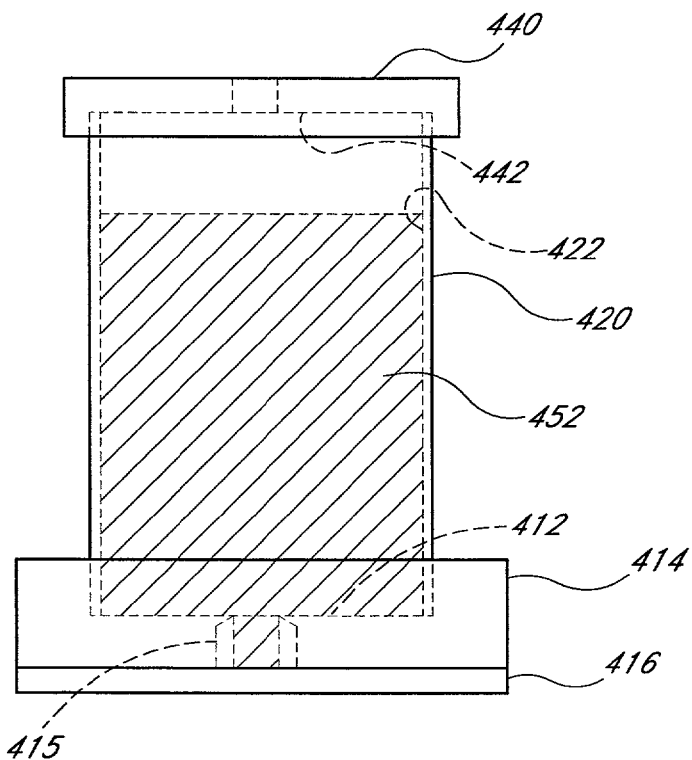
Figure 12C:
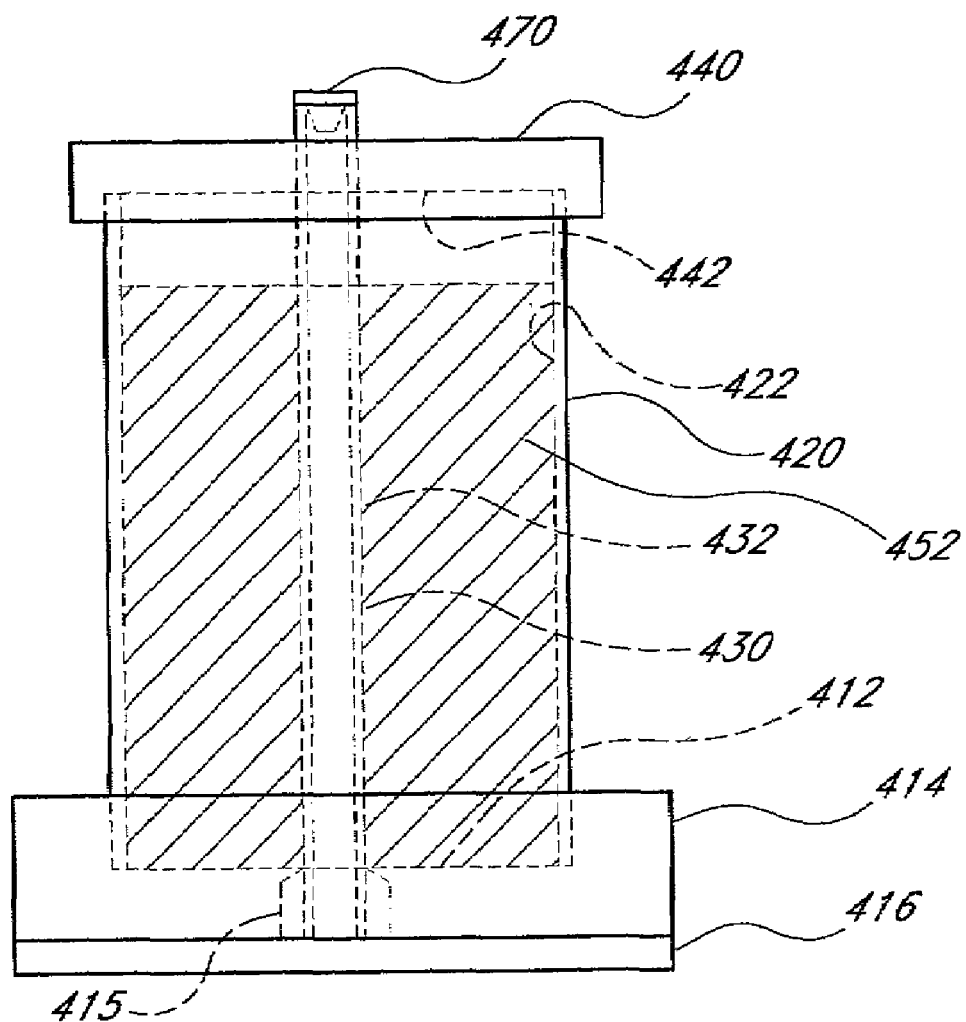

In certain embodiments, the mold 400 is assembled as schematically illustrated in FIG. 12A using the outer wall 420, the first base portion 414, and the second base portion 416. In certain such embodiments, the first sol-gel solution 452 is placed within the volume bounded by the second hydrophobic surface 422, the first hydrophobic surface 412, and the tubular projection 415 of the second base portion 416. As schematically illustrated in FIG. 12B, the first sol-gel solution 452 of the resulting configuration does not have a hole, and extends into the tubular projection 415 of the second base portion 416.

After placing the first sol-gel solution 452 in the mold 400, but before the first sol-gel solution 452 undergoes gelation, the insert 430 is inserted through the hole 444 of the cap 440, into and through the first sol-gel solution 452, to couple to the tubular projection 415 of the second base portion 416. Embodiments in which the insert 430 is inserted into and through the first sol-gel solution 452 tend to generate fewer bubbles in the first sol-gel solution 452 than embodiments in which the first sol-gel solution 452 is poured into the volume between the outer wall 420 and the insert 430. Reducing the number of bubbles formed in a sol-gel solution reduces the number of potential stress-generating defects in the resultant gel monolith, thereby lowering the probability of cracking of the gel monolith.

In embodiments in which the plug 470 is coupled to the insert 430, as schematically illustrated in FIG. 12C, the insert 430 displaces the first sol-gel solution 452 from the volume occupied by the insert 430, including from the tubular projection 415 of the second base portion 416. Due to the airtight seal between the plug 470 and the insert 430, the volume inside the insert 430 remains substantially free of the first sol-gel solution 452.

In such embodiments, the first sol-gel solution 452 is then allowed to undergo gelation thereby forming the first gel portion 404. To remove the insert 430 from the mold 400 in preparation of forming the second gel portion 406, the plug 470 is removed from the insert 430, thereby breaking the airtight seal between the plug 470 and the insert 430. In this way, a conduit for gas flow is provided through the insert 430 so that gas is able to get to the volume vacated by the insert 430 as the insert 430 is pulled out of the first gel portion 404 and base 410. Such embodiments avoid the vacuum region and its corresponding atmospheric force which otherwise hinders the removal of the insert 430. Once the insert 430 is removed from the mold 400, the process of forming the gel monolith 402 can continue as described above in relation to FIGS. 11C–11D.

In certain embodiments, a small portion of the first sol-gel solution 452 remains within the insert 430 and undergoes gelation. The resulting gel within the insert 430 then blocks gas from flowing to the volume vacated by the insert 430 as the insert 430 is removed from the mold 400. In such embodiments, the gel within the insert 430 can be broken up, thereby opening a conduit for gas to flow. For example, after removing the plug 470 from the insert 430, but before removing the insert 430 from the mold 400, a probe can be extended into the insert 430 to break apart any gel which has formed within the insert 430.

Figure 13:
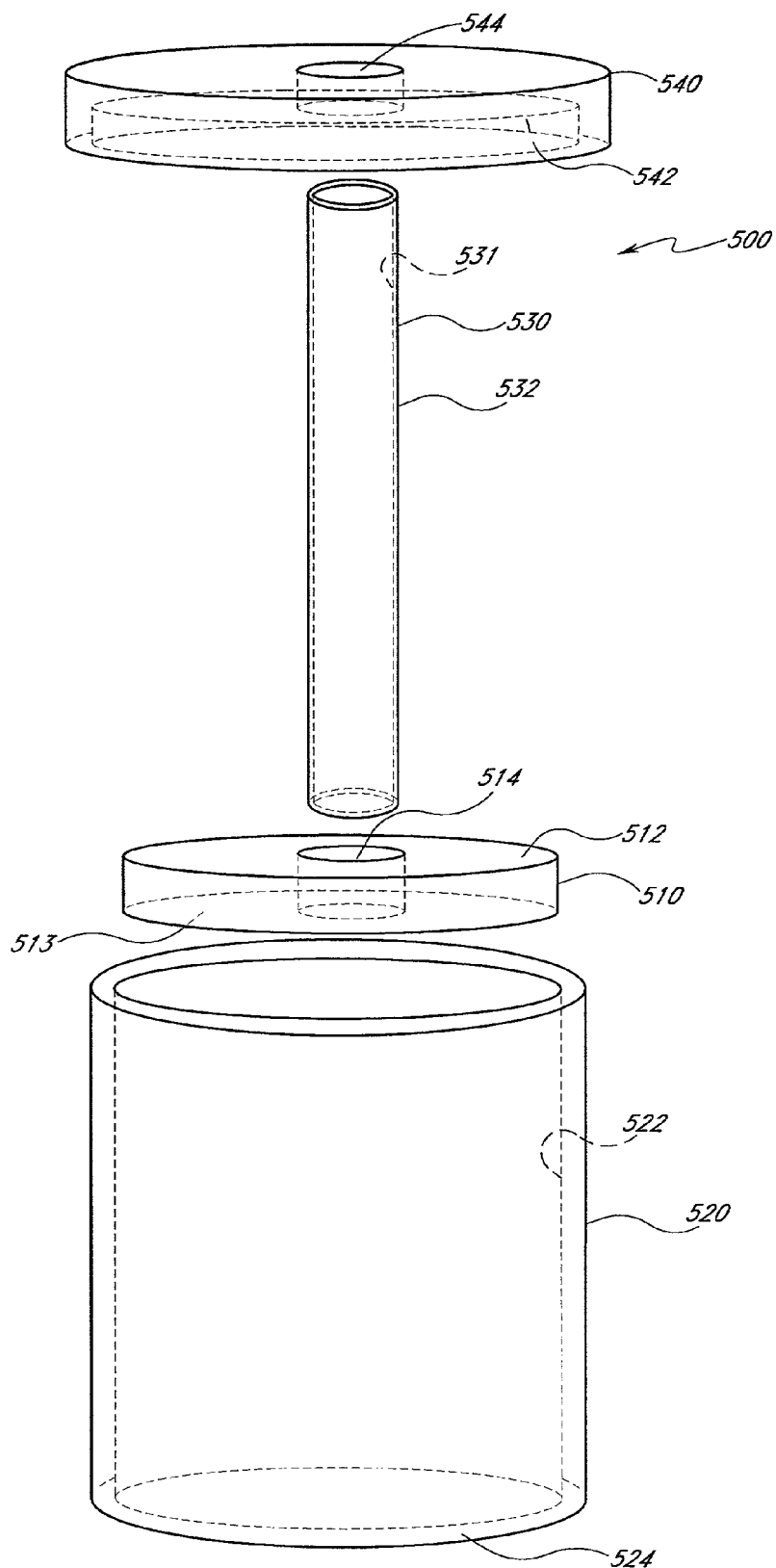
FIG. 13 schematically illustrates an exploded view of a mold in accordance with other embodiments of the present invention.

FIG. 13 schematically illustrates an exploded view of another mold 500 for forming a gel monolith 502 comprising a first gel portion 504 and a second gel portion 506 in accordance with embodiments of the present invention. FIGS. 14A–14E schematically illustrate interim stages during the formation of the gel monolith 502 using the mold 500 in accordance with an embodiment of the present invention. The mold 500 comprises a base 510 comprising a first hydrophobic surface 512. The mold 500 further comprises a tubular outer wall 520 comprising a second hydrophobic surface 522 and the outer wall 520 is coupled to the base 510. The mold 500 further comprises a removable tubular insert 530 comprising an inner surface 531 and an outer hydrophobic surface 532. The mold 500 further comprises a removable cap 540 comprising a third hydrophobic surface 542 and a hole 544. The insert 530 is removably coupled to the base 510 and the cap 540.

In the embodiment schematically illustrated in FIG. 13, the base 510 comprises the first hydrophobic surface 512, a bottom surface 513, and a cavity 514 adapted to couple the base 510 with the insert 530. The base 510 is configured to fit within the outer wall 520, as described more fully below. In certain embodiments, the cavity 514 extends from the first hydrophobic surface 512 to the bottom surface 513 of the base 510, while in other embodiments, the cavity 514 does not extend to the bottom surface 513.

Figure 14A:
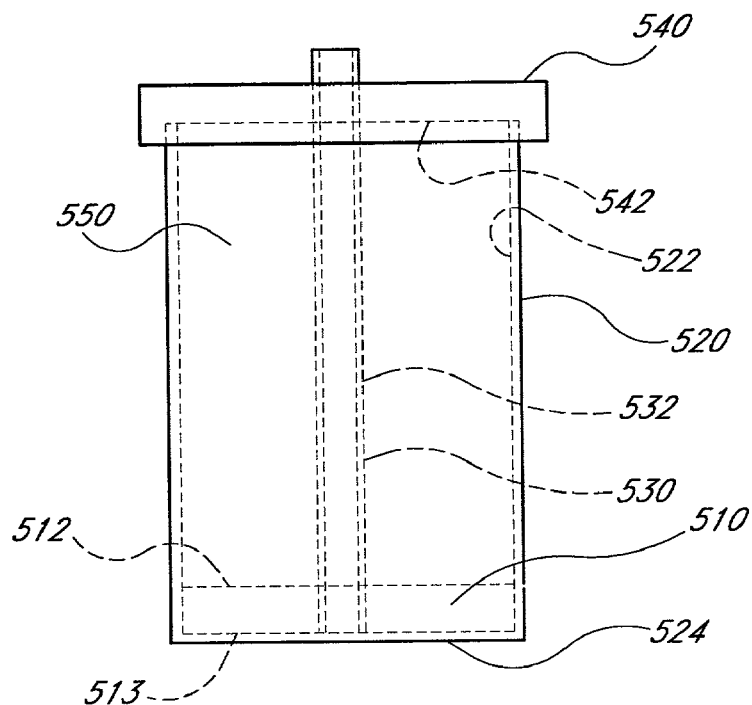
FIGS. 14A–14E schematically illustrate interim stages during the formation of the gel monolith using the mold of FIG. 13 in accordance with an embodiment of the present invention.

In the embodiment schematically illustrated in FIG. 13, the mold 500 further comprises a bottom wall 524 which encloses one end of the outer wall 520. The bottom wall 524 is adapted to couple with the base 510 so that the base 510 is within a volume defined by the outer wall 520 and the bottom wall 524, as illustrated in FIG. 14A. Using a base 510 which is removably coupled to the bottom wall 524 facilitates cleaning of the mold components, as described herein.

Formation of the gel monolith 502 proceeds as described above in relation to the embodiments of FIGS. 10–12. As schematically illustrated in FIG. 14A, in certain embodiments, the mold 500 defines a first volume 550, a portion of which is bounded by the first hydrophobic surface 512, the second hydrophobic surface 522, and the outer hydrophobic surface 532. The first volume 550 is adapted to receive a first sol-gel solution 552 which undergoes gelation to form the first gel portion 504.

Figure 14B:
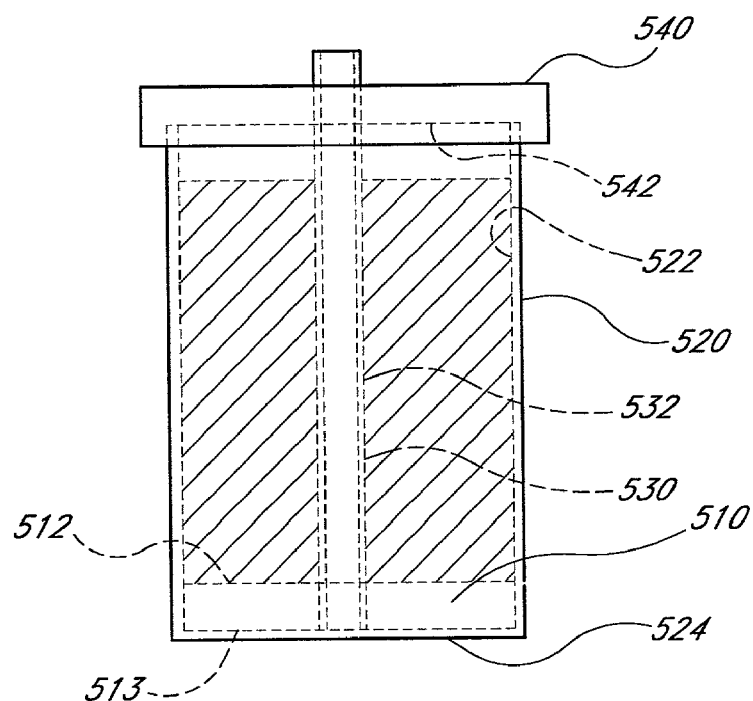

In an exemplary embodiment, the first sol-gel solution 552 is placed within the first volume 550 and is allowed to gel in the first volume 550. As schematically illustrated in FIG. 14B, the resulting configuration has at least a portion of the first volume 550 filled by the first gel portion 504, with the insert 530 defining a hole through the first gel portion 504.

Figure 14C:
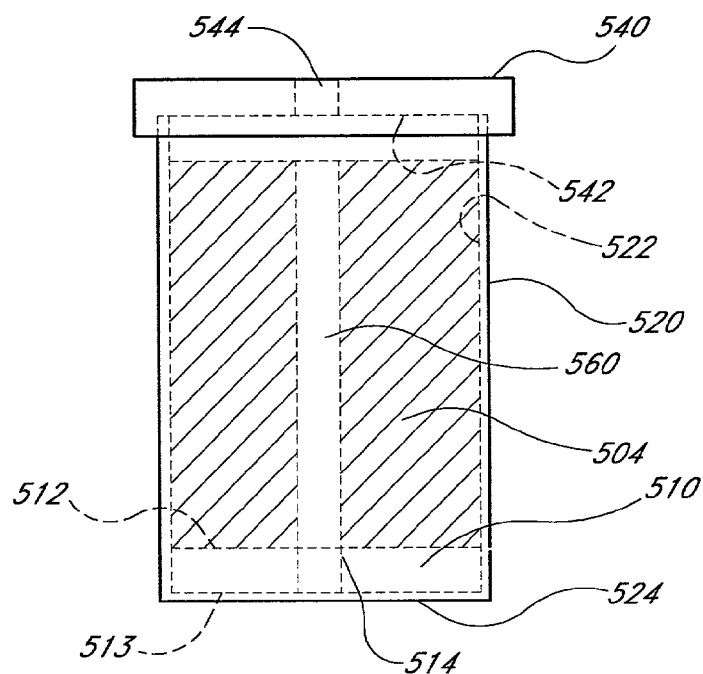

In certain embodiments, after forming the first gel portion 504, the insert 530 is removed from the mold 500 in preparation of forming the second gel portion 506, as schematically illustrated in FIG. 14C. In certain such embodiments, the insert 530 provides a conduit for gas to get to the volume vacated by the insert 530 as it is pulled out of the first gel portion 504 and base 510. In this way, embodiments of the present invention do not generate the vacuum region and its corresponding atmospheric force which otherwise hinders the removal of the insert 530.

As schematically illustrated in FIG. 14C, removal of the insert 530 from the mold 500 results in a configuration in which the first gel portion 504 has a substantially empty second volume 560 extending through the first gel portion 504. In such embodiments, a portion of the second volume 560 is bounded by the first gel portion 504.

Figure 14D:
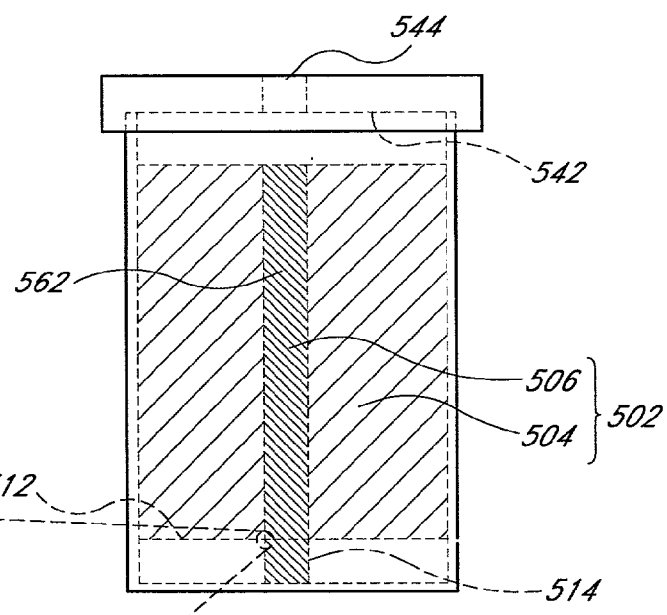
Figure 14E:
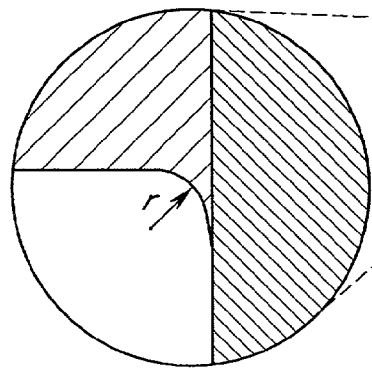

In an exemplary embodiment, the second sol-gel solution 562 is placed within the second volume 560 and is allowed to gel in the second volume 560. As schematically illustrated in FIG. 14D, the resulting configuration has at least a portion of the second volume 560 filled by the second gel portion 506. In certain such embodiments, as seen in FIG. 14E, the edge between the cavity 514 and the first hydrophobic surface 512 can have a sufficiently large radius of curvature to reduce potential stresses which would result from a sharp edge.

As described above in relation to the embodiments of FIGS. 11 and 12, the embodiments schematically illustrated in FIGS. 13 and 14 are compatible with use of a plug 570 which forms an airtight seal with the inner surface 531 of the insert 530. In such embodiments, the insert 530 can be inserted into and through the first sol-gel solution 542 and into the cavity 514 of the base 510.

In addition, in certain embodiments, the base 510 can be inserted into the mold 500 after the first sol-gel solution 552 is placed in the volume defined by the outer wall 520 and the bottom wall 524. In such embodiments, the base 510 is inserted into and through the first sol-gel solution 552 to couple to the bottom wall 524 in a manner that generates fewer bubbles in the first sol-gel solution 552 than in embodiments in which the first sol-gel solution 552 is poured onto the base 510. As described above, reducing the number of bubbles formed in a sol-gel solution reduces the number of potential stress-generating defects in the resultant gel monolith, thereby lowering the probability of cracking of the gel monolith.

Figure 15A:
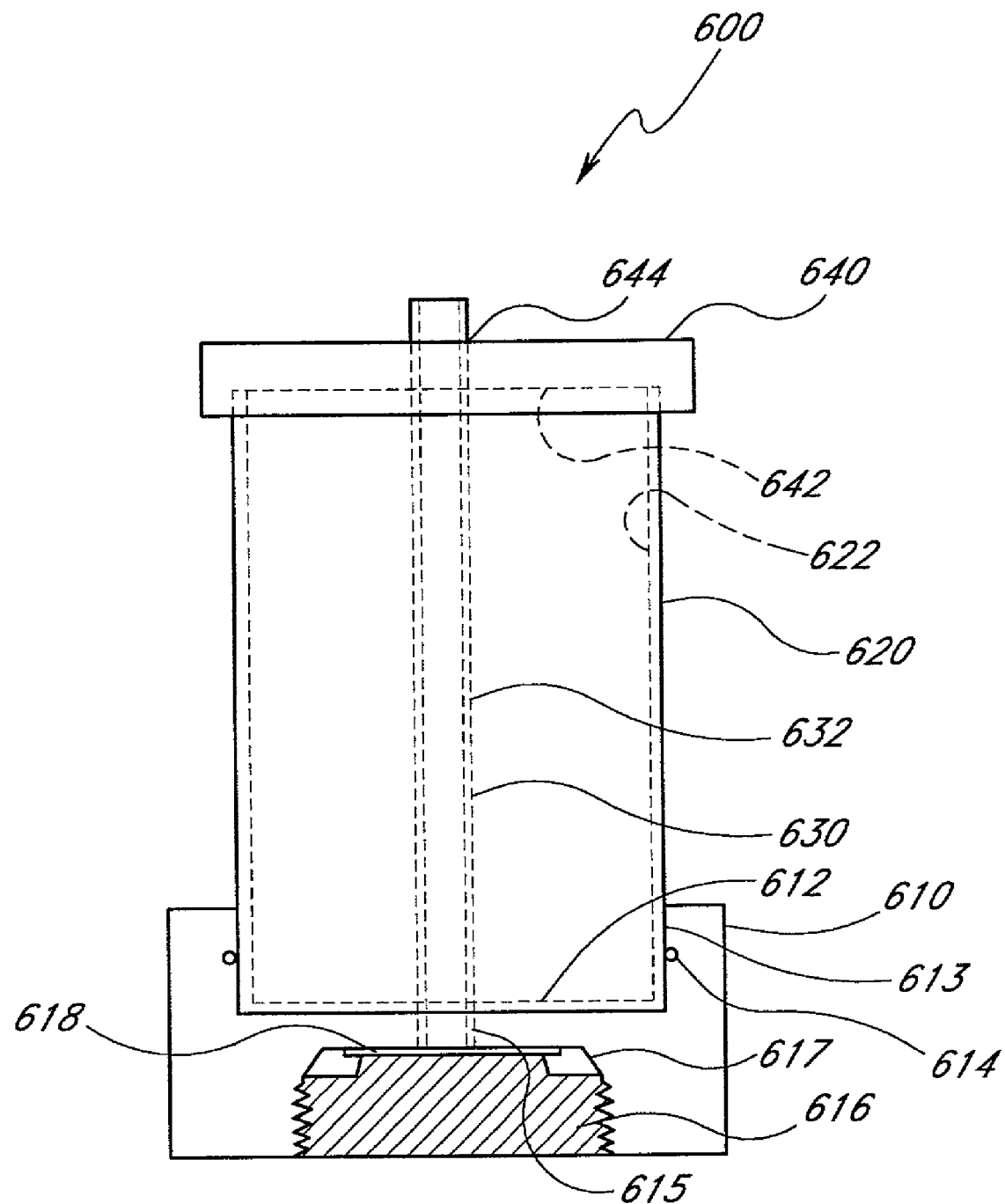
FIGS. 15A and 15B schematically illustrate two molds in accordance with embodiments of the present invention.
Figure 15B:
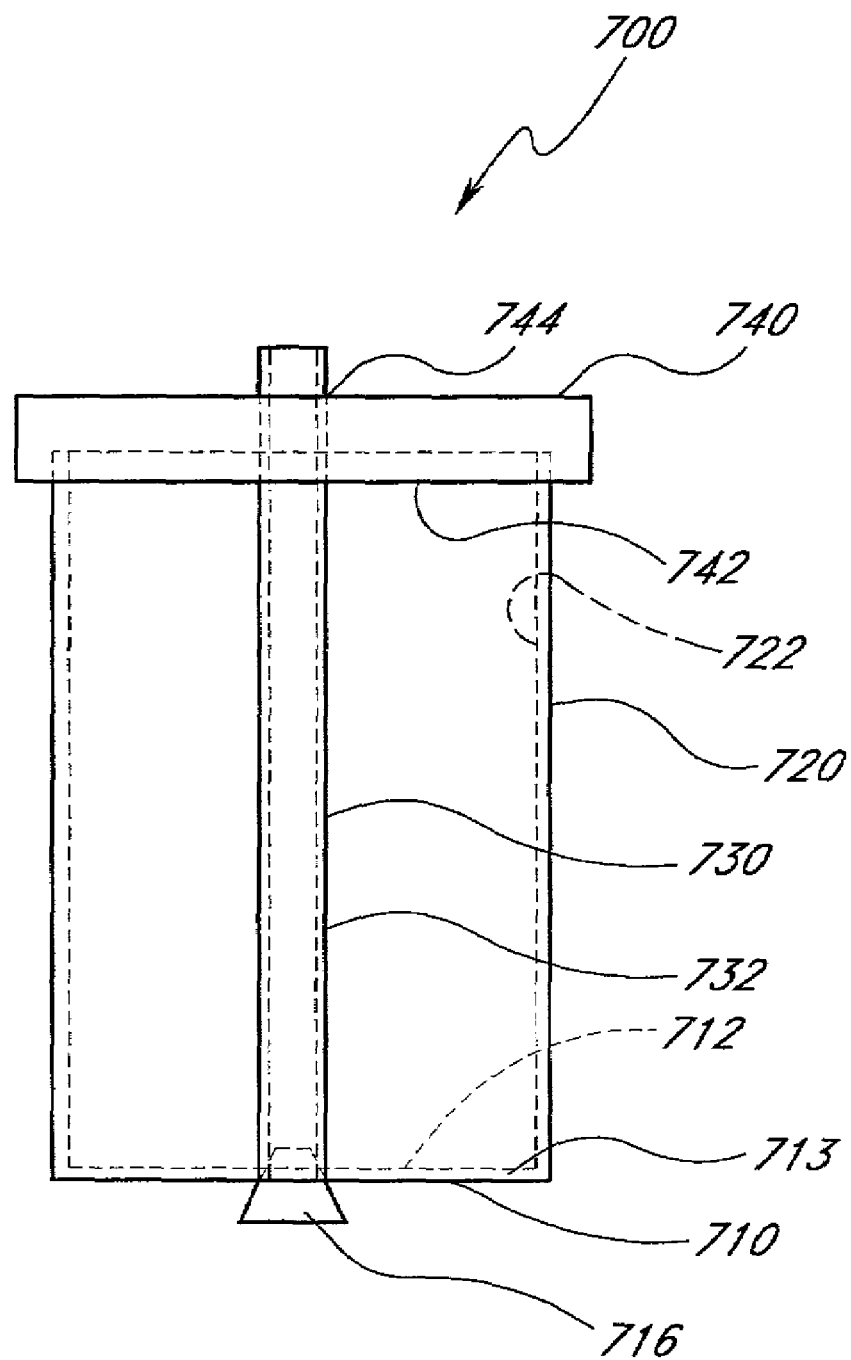

FIGS. 15A and 15B schematically illustrate alternative configurations of the mold in accordance with embodiments of the present invention. In the embodiment illustrated in FIG. 15A, the mold 600 comprises a base 610 comprising a first hydrophobic surface 612, a mating surface 613 with a first seal 614, a cavity 615, a plug 616, a recess 617, and a removable second seal 618 between the cavity 615 and the recess 617. The mold 600 further comprises an outer wall 620 comprising a second hydrophobic surface 622, a tubular insert 630 comprising an outer hydrophobic surface 632, and a cap 640 comprising a third hydrophobic surface 642 and a hole 644. The mating surface 613 is removably coupled to the outer wall 620 and the first seal 614 forms a liquid-tight seal between the base 610 and the outer wall 620. The cavity 615 is removably coupled to the insert 630. The second seal 618 forms a removable liquid-tight seal between the cavity 615 and the recess 617. The plug 616 is removably coupled to the recess, whereby removing the plug 616 and the second seal 618 from the recess 617 fluidly couples the cavity 615 and the recess 617.

In the embodiment schematically illustrated in FIG. 15A, the first hydrophobic surface 612 is flat and horizontal. In other embodiments, the first hydrophobic surface 612 of the base 610 can be tapered from the mating surface 613 of the base 610 towards the cavity 615. In certain such embodiments, the tapered first hydrophobic surface 612 is flat, while in other embodiments, it has a curvature, such as spherical. Tapered first hydrophobic surfaces 612 can serve to facilitate removal of the gel monolith from the mold 600 and to reduce potential crack-inducing stresses within the gel monolith.

In addition, the first hydrophobic surface 612 of certain embodiments has a sufficiently large radius of curvature along the edge of the cavity 615 so as to avoid stress-generating corners in the interface region between the first gel and second gel portions. The first hydrophobic surface 612, as well as any other surfaces of the mold 600 which contact the gel monolith, has a good surface finish (i.e., it is polished and sufficiently defect-free) to provide resultant gel surfaces which conform to the desired specifications.

In certain embodiments, the outer wall 620 is coupled to the mating surface 613 of the base 610 via the first seal 614. In the embodiment illustrated in FIG. 15A, the first seal 614 is an o-ring which provides a liquid-tight seal between the base 610 and the outer wall 620. Other embodiments can utilize other configurations of the first seal 614 (e.g., an interference fit between the outer wall 620 and the base 610). The first seal 614 is particularly useful to provide a liquid-tight seal in embodiments in which the base 610 and the outer wall 620 have different thermal expansion coefficients.

As illustrated in FIG. 15A, certain embodiments of the base 610 comprise a plug 616 which fits into and couples to a recess 617 of the base 610. In the embodiment schematically illustrated in FIG. 15A, the plug 616 and the base 610 are threaded with tapered NPT (National Pipe Thread) threads. Other embodiments can utilize other types of threads, or can utilize other methods of coupling the plug 616 and the base 610. Both the plug 616 and the recess 617 of certain embodiments can be tapered to facilitate removably coupling the plug 616 within the recess 617, as illustrated schematically in FIG. 15A.

The second seal 618 can provide a liquid-tight seal between the cavity 615 and the recess 617 of the base. In the embodiment illustrated in FIG. 15A, the second seal 618 is a compressible disk which is compressed between the plug 616 and the recess 617 when the plug 616 is screwed into the base 610. In such embodiments, the disk comprises a material which is more compressible than the materials of the plug 616 or the recess 617 in the region where the disk is compressed. Other embodiments can utilize other configurations or materials for the second seal 618. The second seal 615 of certain embodiments is chemically resistant and has a hydrophobic surface which can contact the sol-gel solution.

Upon removing the plug 616 and the second seal 618 from the recess 617, the cavity 615 and the recess 617 are fluidly coupled. Such embodiments are particularly useful to provide a conduit for liquid removal from the gel monolith during drying.

The insert 630 of certain embodiments is removably coupled to the base 610, and as illustrated in FIG. 15A, fits snugly into the cavity 615 of the base 610. In addition, certain embodiments of the second seal 618 can also provide a liquid-tight seal between the insert 630 and the base 610.

In the embodiment illustrated in FIG. 15B, the mold 700 comprises a base 710 comprising a first hydrophobic surface 712, a bottom wall 713 with a hole 714, and a plug 716. The mold 700 further comprises an outer wall 720 comprising a second hydrophobic surface 722, a tubular insert 730 comprising an outer hydrophobic surface 732, and a cap 740 comprising a third hydrophobic surface 742 and a hole 744.

The bottom wall 713 of the embodiment of FIG. 15B encloses one end of the outer wall 720. The plug 716 is removably coupled to the bottom wall 713 via the hole 714, providing a removable liquid-tight seal between the plug 716 and the bottom wall 713. In certain embodiments, as schematically illustrated in FIG. 15B, the hole 714 and the plug 716 are concentric with the second hydrophobic surface 722 and a portion of the plug 716 extends into the mold 700 past the first hydrophobic surface 712. In such embodiments, the plug 716 couples to the inner surface of the insert 730, thereby positioning the insert 730 concentrically with the second hydrophobic surface 722. In certain embodiments, the coupling of the plug 716 with the insert 730 can provide a removable liquid-tight seal between the plug 716 and the insert 730, thereby keeping sol-gel solution from within the insert 730.

When the mold 700 is filled with sol-gel solution, the plug 716 keeps the solution within the mold 700. Once the solution has gelled, the plug 716 can be removed to facilitate removal of liquid from the pores of the gel monolith during drying while the gel monolith remains in the mold 700.

Figure 16:
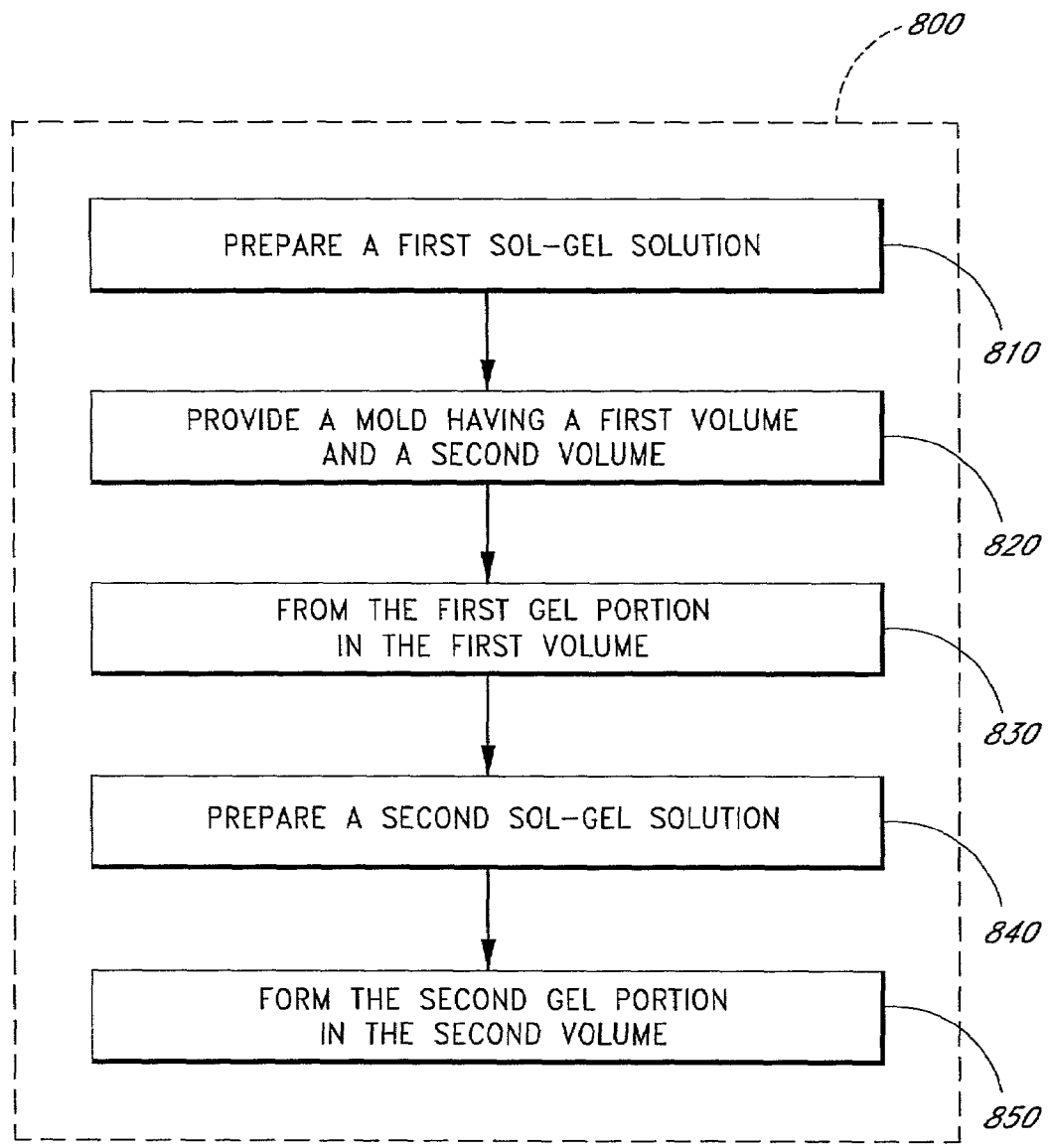
FIG. 16 is a flow diagram of a method of forming a gel monolith having a first gel portion and a second gel portion in accordance with embodiments of the present invention.

FIG. 16 is a flow diagram of a method 800 of forming a gel monolith 402 having a first gel portion 404 and a second gel portion 406. While the flow diagram of FIG. 16 illustrates a particular embodiment with steps in a particular order, other embodiments with different orders of steps are also compatible with the present invention. In addition, while the description below refers to the exemplary embodiment schematically illustrated by FIGS. 11A–11D, various other embodiments of the interim stages of the formation of the gel monolith 402 are compatible with the present invention (e.g., the embodiments schematically illustrated by FIGS. 12A–12C, 14A–14D, and 15A–15B).

In the embodiment diagrammed in FIG. 16, in an operational block 810, a first sol-gel solution 452 is prepared with the first sol-gel solution 452 comprising at least 3 mole % of a first catalyst. As described above, the first sol-gel solution 452 in certain embodiments is prepared at a reduced mixing temperature, thereby increasing the gelation time of the first sol-gel solution 452 to facilitate subsequent fabrication steps. In certain embodiments, the first catalyst is hydrogen fluoride, while in other embodiments, the first catalyst comprises other compounds. The first sol-gel solution 452 comprises preferably at least 3 mole % of the first catalyst, more preferably at least 4 mole % of the first catalyst, and more preferably at least 10 mole % of the first catalyst.

In an operational block 820, a mold 400 having a first volume 450 and a second volume 460 is provided. At least a portion of the first volume 450 has a common boundary with at least a portion of the second volume 460. In certain embodiments, the second volume 460 is cylindrical and the first volume 450 is tubular and concentric with the second volume 460, as schematically illustrated in FIGS. 11A–11D.

In an operational block 830, the first gel portion 404 is formed in the first volume 450. Forming the first gel portion 404 comprises allowing the first sol-gel solution 452 to gel in the first volume 450. In certain embodiments, as schematically illustrated in FIG. 11B, the first volume 450 is tubular, and confining the first sol-gel solution 452 to the tubular first volume 450 results in a tubular first gel portion 404.

In the embodiment schematically illustrated by FIG. 11B, the second volume 460 contains the removable insert 430 while forming the first gel portion 404 in the first volume 450. The removable insert 430 can be placed in the second volume 460 before placing the first sol-gel solution 452 in the first volume 450. Alternatively, the first sol-gel solution 452 can be placed in both the first volume 450 and the second volume 460, and the removable insert 430 can then be inserted through the first sol-gel solution 452 prior to allowing the first sol-gel solution 452 to gel in the first volume 450, thereby displacing the first sol-gel solution 452 out of the second volume 460.

In an operational block 840, a second sol-gel solution 462 is prepared with the second sol-gel solution 462 comprising at least 3 mole % of a second catalyst. As described above, the second sol-gel solution 462 in certain embodiments is prepared at a reduced mixing temperature, thereby increasing the gelation time of the second sol-gel solution 462 to facilitate subsequent fabrication steps. In certain embodiments, the second catalyst is hydrogen fluoride, while in other embodiments, the second catalyst comprises other compounds. In certain embodiments, the second catalyst is the same as the first catalyst. The second sol-gel solution 462 comprises preferably at least 3 mole % of the second catalyst, more preferably at least 4 mole % of the second catalyst, and more preferably at least 10 mole % of the second catalyst.

In an operational block 850, the second gel portion 406 is formed in the second volume 460 after the first sol-gel solution 452 has gelled along the common boundary. Forming the second gel portion 406 comprises allowing the second sol-gel solution 462 to gel in the second volume 460. In the embodiment schematically illustrated by FIG. 11C, the removable insert 430 is removed from the second volume 460 prior to forming the second gel portion 406 in the second volume 460. As schematically illustrated in FIG. 11B, the second volume 460 of certain embodiments is cylindrical and the second gel portion 406 is formed by confining the second sol-gel solution 462 to the cylindrical second volume 460 within the tubular first volume 450, and allowing the second sol-gel solution 462 to gel.

In certain embodiments, the tubular first gel portion 404 is formed before forming the cylindrical second gel portion 406. A mold 400 comprising a cylindrical outer wall 420 and a cylindrical removable insert 430 concentric with the cylindrical outer wall 420 can be provided in certain embodiments. In such embodiments, the first sol-gel solution 452 can be placed in the tubular first volume 450 between the outer wall 420 and the insert 430. The insert 430 can then be removed after allowing the first sol-gel solution 452 to gel, and the second sol-gel solution 462 can be placed within the second volume 460 defined by the first gel portion 404.

Prior to placing the second sol-gel solution 462 within the second volume 460 defined by the first gel portion 404, in certain embodiments, a washing procedure is performed in which the second volume 460 is filled with a dilute HF solution for a predetermined period of time (typically 30 to 60 minutes), which is then removed. The dilute HF solution can be diluted in water or in ethanol, with a typical HF concentration of approximately 5 mole %. In this way, the common boundary is washed prior to forming the second gel portion 406 in the second volume 460. This washing procedure can serve to enhance the bonding at the common boundary between the first gel portion 404 and the second gel portion 406 by removing residual (possibly hydrophobic) material left by the outer hydrophobic surface 432 of the insert 430 on the inner surface of the first gel portion 404. In certain other embodiments, a bonding agent (e.g., formamide) can be added to enhance the bonding at the common boundary.

In certain embodiments, during the washing procedure, the temperature of the first gel portion 404 is increased in preparation of placing the second sol-gel solution 462 within the second volume 460. The gelation of the second sol-gel solution 462 in the second volume 460 can create heat in a short period of time, thereby potentially creating thermal stresses across the first gel portion 404. Heating the first gel portion 404 (typically to approximately 40° C.) during the washing procedure prior to the gelation of the second sol-gel solution 462 can reduce such thermal stresses.

In certain embodiments, the cylindrical second gel portion 406 can be formed before forming the first tubular gel portion 404. In such embodiments, a mold 400 comprising a cylindrical outer wall 420 and a tubular removable insert 430 concentric with the cylindrical outer wall 420 can be provided. In certain such embodiments, the inner surface of the insert 430 is hydrophobic and the second sol-gel solution 462 is placed within the second volume 460 defined by the volume within the tubular removable insert 430. The insert 430 can then be removed after allowing the second sol-gel solution 462 to gel, and the first sol-gel solution 452 can be placed within the first volume 450 defined by the cylindrical second gel portion 406 and the outer wall 420 of the mold 400.

Figure 17:
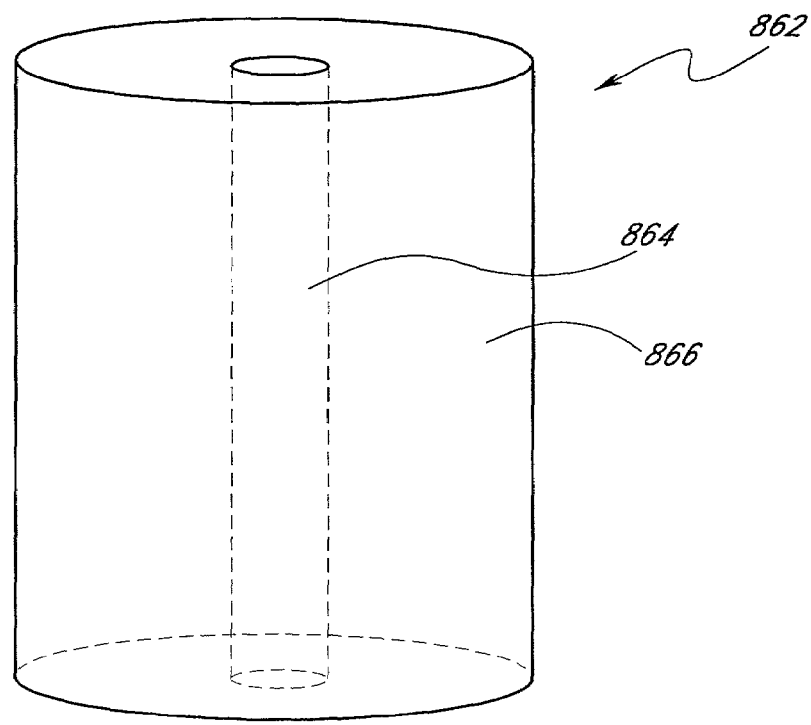
FIG. 17 schematically illustrates a gel monolith formed by a method in accordance with embodiments of the present invention.

FIG. 17 schematically illustrates a gel monolith 862 in accordance with an embodiment of the present invention. The gel monolith 862 comprises a cylindrical gel portion 864 and a tubular gel portion 866. The tubular gel portion 866 is around and concentric with the cylindrical gel portion 864. The gel monolith 862 is formed by a method in accordance with the method diagrammed by FIG. 16, as described above.

Figure 18:
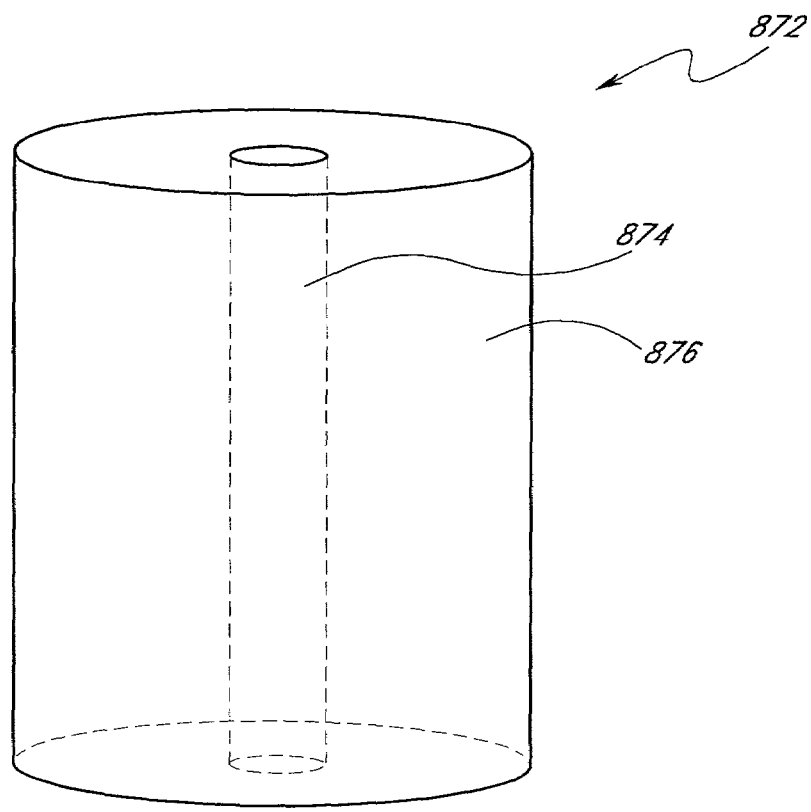
FIG. 18 schematically illustrates a sol-gel-derived rod formed by a method in accordance with embodiments of the present invention.

FIG. 18 schematically illustrates a sol-gel-derived rod 872 in accordance with an embodiment of the present invention. The sol-gel-derived rod 872 comprises a cylindrical core portion 874 and a tubular cladding portion 876 around and concentric with the core portion 874. The sol-gel-derived rod 872 is formed by a process comprising drying a gel monolith 862 comprising a cylindrical gel portion 864 and a tubular gel portion 866 around and concentric with the cylindrical gel portion 864. The gel monolith 862 is formed by a method in accordance with the method diagrammed by FIG. 16, as described above. The process for forming the sol-gel-derived rod 872 further comprises consolidating the gel monolith 862.

Drying the Gel Monolith

The embodiments disclosed herein form silica-based gel monoliths which are virtually free of cracks. However, the methods and structures disclosed herein also have application to the formation of gel monoliths generally, including other oxide-based gel monoliths.

Figure 19:
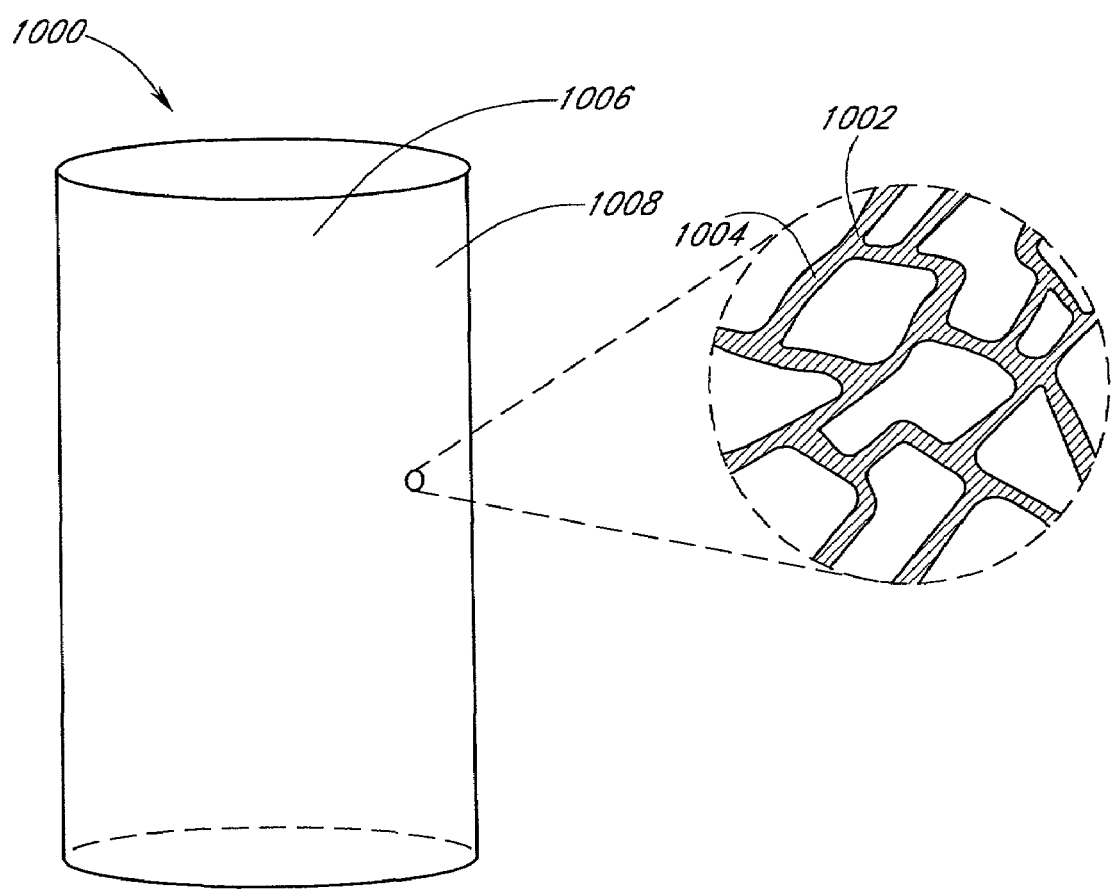
FIG. 19 schematically illustrates a gel monolith comprising pores filled with liquid, an inner region, and an outer region.

During gelation, the components of the sol undergo hydrolysis and polymerization, resulting in a wet porous gel monolith 1000. As schematically illustrated in FIG. 19, the gel monolith 1000 comprises pores 1002 filled with liquid 1004, an inner region 1006, and an outer region 1008. During the drying of the gel monolith 1000, the gel monolith 1000 shrinks in size, and capillary forces in the gel pores 1002 arise as the amount of liquid 1004 in the gel monolith 1000 is reduced. If the drying of the gel monolith 1000 progresses too quickly in one region of the gel monolith as compared to another region, then inhomogeneities in the capillary forces create stresses in the gel monolith 1000, thereby causing cracks. If the drying of the gel monolith 1000 progresses too slowly, then the fabrication process takes longer than is economically desirable. In embodiments of the present invention, the drying rate of the gel monolith 1000 is controlled to avoid cracking and to provide economically rapid drying without generating large inhomogeneities in the capillary forces during the drying of the gel monolith 1000.

The wet porous gel monolith 1000 of certain embodiments is formed, as described above, by forming a liquid sol by mixing together organo-metallic compounds, such as metal alkoxides, with solvents and catalysts in predetermined proportions and at predetermined temperatures. Suitable metal alkoxide materials include, but are not limited to, TEOS, TEOG, and TMOS. Solvents compatible with the present invention include, but are not limited to, ethanol and other alcohols, and suitable catalysts include, but are not limited to, HCl and HF. Alternatively, the liquid sol is prepared by mixing together inorganic metal salts and water, which form a colloidal dispersion.

The formation of the wet porous gel monolith 1000 of certain embodiments also comprises stirring and pouring the liquid sol into a mold. Colloidal silica-based particles are formed by hydrolysis and polymerization reactions, with the colloidal particles linking together, thereby forming the wet porous silica gel monolith 1000 with pores 1002 filled with liquid 1004.

The microstructure (e.g., pore diameter, surface area, volume, and distribution) of the resulting porous gel monolith 1000 significantly affects the ability of the porous gel monolith 1000 to withstand the capillary forces during the drying process and the ability to subsequently introduce desired dopants or additives to the porous gel monolith 1000 to tailor its properties. For example, as described above, the tendency for cracking of gel monoliths may be reduced by tailoring the gel microstructure so as to produce gel monoliths with larger pore diameters. This microstructure is dependent in part on the relative concentrations of the solvents and the catalysts as described above, and can be varied within a wide range by judicious selection of process parameters. In certain embodiments, drying control chemical additives ("DCCA") are added to the sol to control its hydrolysis and polymerization rates so as to tailor the pore diameters and distributions.

The time required for formation of the wet porous gel monolith 1000 is dependent on the sol composition, temperature, and the type of catalyst used. In certain embodiments, after formation of the wet porous gel monolith 1000, the pore liquid 1004 may be replaced by a second liquid by removing the gel monolith 1000 from the mold and submerging it in the second liquid while at elevated temperatures (e.g., approximately 60° C. to approximately 70° C.). After such a procedure, the liquid 1004 within the pores 1002 of the gel monolith 1000 comprises primarily the second liquid. In certain embodiments, the second liquid comprises primarily ethanol, while in other embodiments, the second liquid comprises other alcohols or water. Embodiments utilizing a second liquid comprising an alcohol to replace the pore liquid 1004 comprising water can help subsequent drying, because the diffusion rate of liquid through the pores can be increased and the capillary forces can be reduced.

Figure 20:
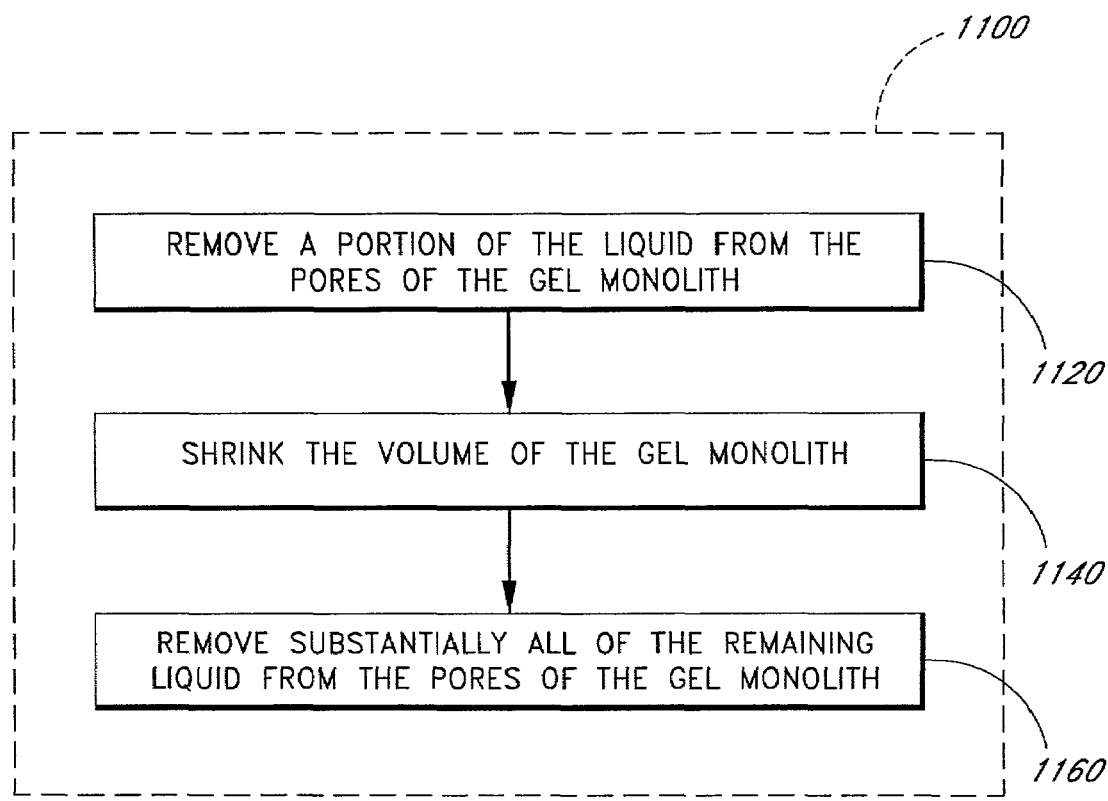
FIG. 20 is a flow diagram of a method of processing a gel monolith in accordance with embodiments of the present invention.

FIG. 20 is a flow diagram of a method 1100 of processing a gel monolith 1000 in accordance with embodiments of the present invention. The gel monolith comprises pores 1002 filled with liquid 1004, an inner region 1006, and an outer region 1008, an embodiment of which is schematically illustrated in FIG. 19. In certain embodiments, the method 1100 results in a dried xerogel monolith, which is a gel monolith which was not dried under supercritical conditions. While the flow diagram of FIG. 20 illustrates a particular embodiment with steps in a particular order, other embodiments with different orders of steps are also compatible with the present invention.

In certain embodiments, the method 1100 is performed with the gel monolith 1000 in a drying oven which allows the temperature applied to the gel monolith 1000 to be controllably adjusted, resulting in a temporal temperature profile. Examples of heating technologies for drying ovens compatible with embodiments of the present invention include, but are not limited to, resistive heating, microwave heating, and infrared lamp heating.

In certain embodiments, the gel monolith 1000 is removed from the mold prior to being placed in the drying oven, while in other embodiments, the gel monolith 1000 and mold are placed in the drying oven together. The gel monolith 1000 and mold can be inverted upon being placed in the drying oven in certain embodiments, to facilitate handling of the gel monolith 1000 and removal of liquid 1004 from the pores 1002.

In the embodiment diagrammed in FIG. 20, in an operational block 1120, a portion of the liquid 1004 is removed from the pores 1002 of the gel monolith 1000 while both the inner region 1006 and the outer region 1008 of the gel monolith 1000 remain wet. In an operational block 1140, the volume of the gel monolith 1000 shrinks during the removing of the portion of the liquid 1004, with the gel monolith 1000 becoming correspondingly more dense. In an operational block 1160, substantially all of the remaining liquid 1004 is subsequently removed from the pores 1002 of the gel monolith 1000. As is described more fully below, removing substantially all of the remaining liquid 1004 comprises modulating a temperature gradient between the outer region 1008 and the inner region 1006 of the gel monolith 1000.

Figure 21:
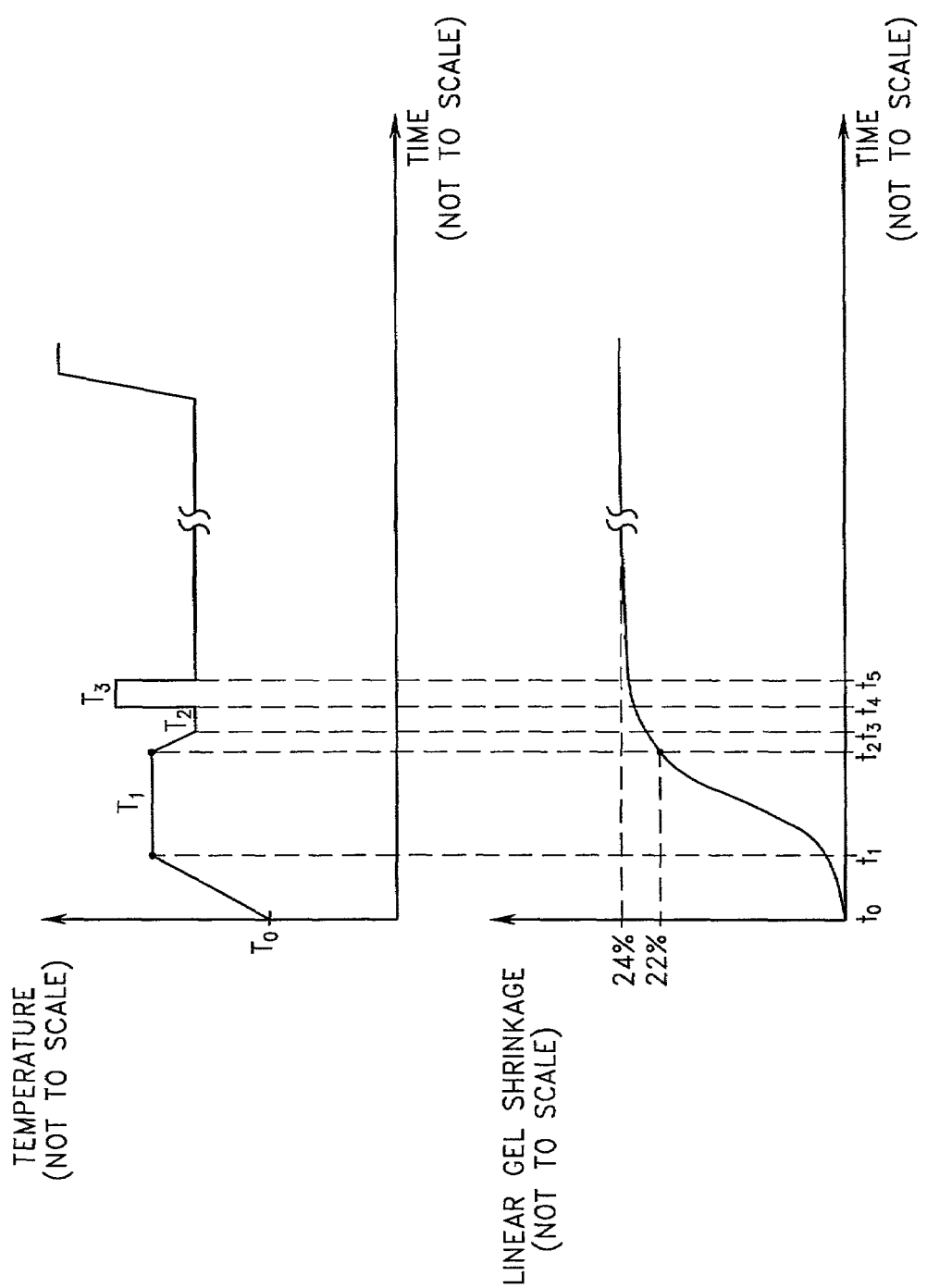
FIG. 21 schematically illustrates a temporal temperature profile compatible with embodiments of the present invention.
Figure 22:
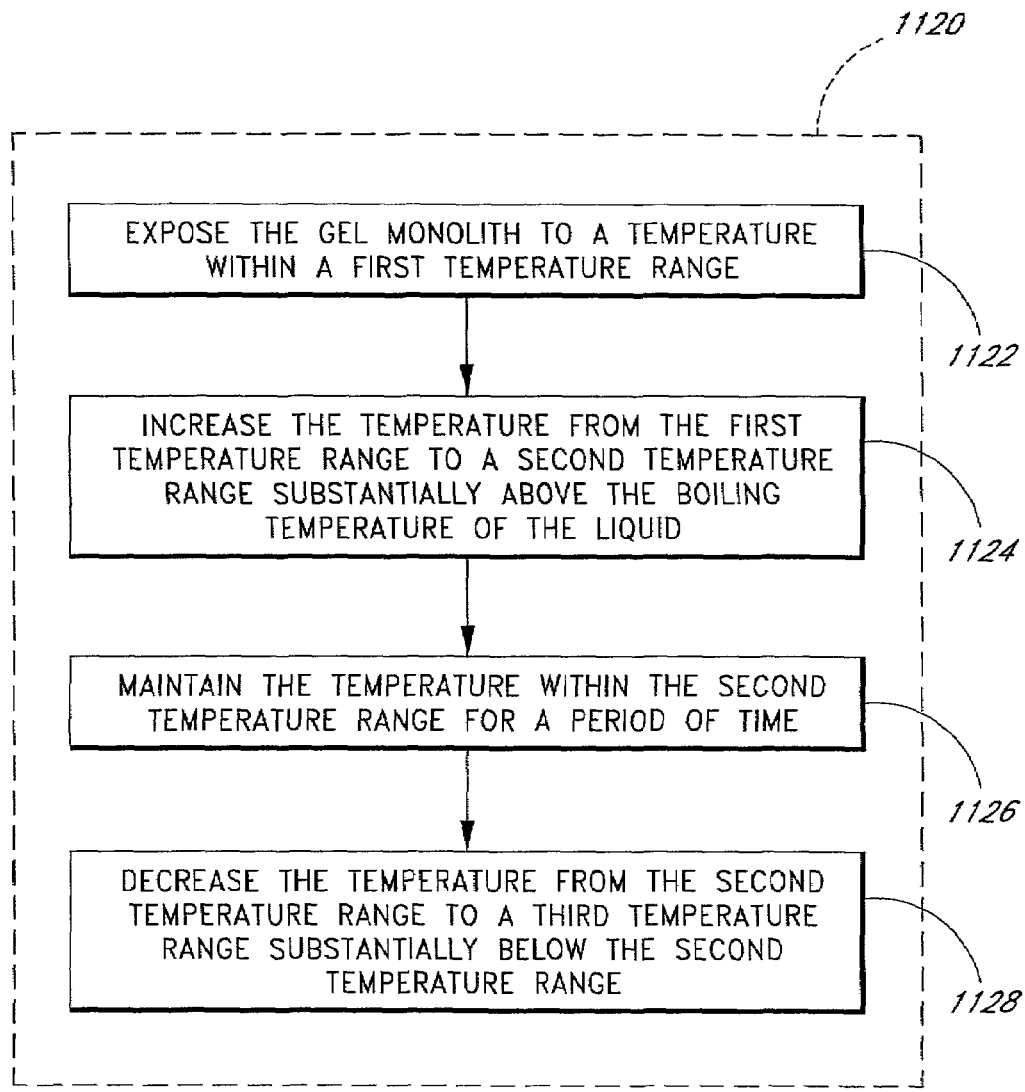
FIG. 22 is a flow diagram of an embodiment of removing a portion of the liquid from the pores of the gel monolith.

FIG. 21 schematically illustrates a temporal temperature profile compatible with embodiments of the present invention. FIG. 22 is a flow diagram of an embodiment of the operational block 1120 in which a portion of the liquid 1004 is removed from the pores 1002 of the gel monolith 1000. In an operational block 1122, the gel monolith 1000 is exposed to a temperature within a first temperature range. In an operational block 1124, the temperature is increased from the first temperature range to a second temperature range substantially above the boiling temperature of the liquid 1004. In an operational block 1126, the temperature is maintained within the second temperature range for a period of time. In an operational block 1128, the temperature is decreased from the second temperature range to a third temperature range substantially below the second temperature range.

Exposing the wet porous gel monolith 1000 to elevated temperatures in the operational block 1120 increases the rate of evaporation $\Theta_{evap}$ of liquid 1004 from the gel monolith 1000, and reduces the overall time required to dry the gel monolith 1000. In addition, the microstructure of the gel monolith 1000 is dependent on the temporal temperature profile used to remove the liquid 1004 in the operational block 1120. In certain embodiments, removal of the portion of the liquid 1004 in the operational block 1120 results in the gel monolith 1000 having pores 1002 with a pore diameter distribution with an average pore diameter between approximately 200 and approximately 1500 Angstroms, while in certain other embodiments, the average pore diameter is between approximately 400 and approximately 1500 Angstroms, and in still other embodiments, the average pore diameter is between approximately 1000 and approximately 1500 Angstroms.

In certain embodiments, such as that schematically illustrated in FIG. 21, the gel monolith 1000 is exposed to a temperature $T_0$ at time $t_0$ in the operational block 1122. The temperature $T_0$ is in a first temperature range which in certain embodiments is between approximately 0° C. and approximately 75° C., in other embodiments is between approximately 0° C. and approximately 35° C., and in still other embodiments is between approximately 18° C. and approximately 35° C. In certain embodiments, as described above, the sol is prepared at a reduced mixing temperature, and gelation of the sol also occurs at a reduced temperature. In such embodiments, the first temperature range can be dependent on the temperature at which gelation of the gel monolith 1000 occurs. However, in other embodiments, the gel monolith 1000 is allowed to warm during or after gelation, and the drying of the gel monolith 1000 begins at a temperature $T_0$ which is approximately room temperature (e.g., approximately +18° C. to +35° C.).

In certain embodiments, the temperature is increased in the operational block 1124 from $T_0$ to an elevated temperature $T_1$ at time $t_1$, as schematically illustrated in FIG. 21. The temperature $T_1$ is in a second temperature range which in certain embodiments is below approximately 20° C. above the boiling temperature of the liquid 1004, in other embodiments is between approximately 3° C. and approximately 15° C. above the boiling temperature of the liquid 1004, and in still other embodiments is between approximately 5° C. and approximately 10° C. above the boiling temperature of the liquid 1004. In embodiments in which the liquid 1004 comprises primarily ethanol, the boiling temperature of the liquid 1004 is approximately 78° C.

In certain embodiments, the temperature $T_1$ is selected based on the overall compressive and tensile stresses on the gel monolith 1000. As $T_1$ increases, at some temperature, the overall tensile forces within the gel monolith 1000 will exceed the compressive forces, thereby cracking the gel monolith 1000. Because ceramics maintain integrity under compression, $T_1$ of certain embodiments is selected to keep compressive forces on the gel monolith 1000 greater than tensile forces.

Increasing the temperature from the first temperature range to the second temperature range in the operational block 1124 is performed in certain embodiments at a rate between approximately 0.01° C. and approximately 10° C. per hour. Alternatively, in other embodiments, increasing the temperature is performed at a rate between approximately 0.01° C. and approximately 1.5° C. per hour. In still other embodiments, increasing the temperature is performed at a rate approximately equal to 0.042° C. per hour. While FIG. 21 shows the rate of temperature increase between times $t_0$ and $t_1$ to be generally linear, other embodiments compatible with the present invention can use a nonlinear temperature increase, or can include interim decreases of the temperature.

In certain embodiments, as the temperature approaches the boiling temperature of the liquid 1004, the temperature is increased at a slower ramp rate, thereby reducing the vapor pressure (i.e., tensile force) generated by the evaporating liquid 1004. After a period of time at the slower ramp rate, the ramp rate can be increased until a predetermined temperature is reached. In certain embodiments, this transition from the slower ramp rate to an increased ramp rate occurs at approximately 86.5° C. In certain other embodiments, this transition from the slower ramp rate to an increased ramp rate occurs once a predetermined portion of the liquid 1004 is expelled from the pores 1002 and the gel monolith 1000 approaches its final dimensions (i.e., once the tensile forces due to vapor pressures have a reduced importance.

In the operational block 1126, the temperature of the gel monolith 1000 is maintained within the second temperature range for a period of time. In certain embodiments, the period of time is between approximately 1 hour and approximately 48 hours. In other embodiments, the period of time is between approximately 5 hours and approximately 15 hours. In still other embodiments, the period of time is between approximately 7 hours and approximately 10 hours. While FIG. 21 shows the temperature to be generally constant during the time period $(t_2-t_1)$ between times $t_1$ and $t_2$, other embodiments compatible with the present invention can vary the temperature $T_1$ during the period of time while staying in the second temperature range. As is described more fully below, various methods of monitoring the removal of the portion of the liquid 1004 from the gel monolith 1000 can be used in embodiments of the present invention to determine the period of time and when to initiate removing substantially all of the remaining liquid 1004 in the operational block 1160.

In certain embodiments, in the operational block 1128, the temperature is decreased from the second temperature range to a third temperature range substantially below the second temperature range at a rate between approximately 1° C. and approximately 10° C. per hour. In other embodiments, the temperature is decreased by stepping down the set point temperature of the oven approximately instantaneously from a temperature in the second temperature range to a lower temperature in the third temperature range and allowing the gel monolith 1000 to re-equilibrize at the lower temperature.

In certain embodiments, the third temperature range is between approximately 10° C. below and approximately 10° C. above the boiling temperature of the liquid 1004. In other embodiments, the third temperature range is between approximately 5° C. below and approximately 5° C. above the boiling temperature of the liquid 1004. In still other embodiments, the third temperature range is between approximately the boiling temperature of the liquid and approximately 2° C. above the boiling temperature of the liquid 1004. While FIG. 21 shows the rate of temperature decrease between times $t_2$ and $t_3$ to be generally linear, other embodiments compatible with the present invention can use a nonlinear temperature decrease, or can include interim increases of the temperature.

In certain embodiments in which the gel monolith 1000 is generally cylindrical, the top and bottom portions of the gel monolith 1000 have larger surface areas than do the sides of the gel monolith 1000. Because the evaporation rate is proportional to the surface area, in such embodiments, the top and bottom portions can dry faster and hence shrink more than the sides of the gel monolith 1000. In certain such embodiments, the temperature can be reduced for a period of time so that the liquid 1004 can diffuse to the drier top and bottom portions of the gel monolith 1000, thereby reducing the overall stresses on the gel monolith 1000 by evening out the distribution of liquid 1004 throughout the gel monolith 1000.

Removing the liquid 1004 in the operational block 1120 results in the shrinkage or decrease of the volume of the wet porous gel monolith 1000 in the operational block 1140. The various parameters of this removal of the liquid 1004 (e.g., first temperature range, second temperature range, third temperature range, temperature increase rate, temperature decrease rate, and period of time in the second temperature range) are selected to provide a controlled drying rate of the gel monolith 1000 in the operational block 1120 which is economically rapid but avoids cracking.

The dimensional shrinking of the wet porous gel monolith 1000 in the operational block 1140 is closely correlated with the amount of liquid 1004 removed from the gel monolith 1000 in the operational block 1120. In addition, since it is only the mass of a portion of the pore liquid 1004 which is removed, the mass of the gel monolith 1000 itself remains substantially constant throughout the liquid removal of the operational block 1120. Therefore, the density of the gel monolith 1000 increases while the volume of the gel monolith 1000 shrinks during the removal of the portion of the liquid 1004.

The dimensional or linear gel shrinkage provides a measure of the increasing density of the gel monolith 1000 in the operational block 1140. For example, a linear gel shrinkage of a dimension of 10% (i.e., the dimension is 90% of its original size) corresponds to an increase in the density of the gel monolith 1000 of approximately 37%. In the embodiment illustrated in FIG. 21, beginning from a linear gel shrinkage defined to be 0% at time $t_0$, the gel monolith 1000 shrinks by some amount during the period of increasing temperature between times $t_0$ and $t_1$. The shrinkage of the wet porous gel monolith 1000 then continues as the gel monolith 1000 is held at the temperature $T_1$ in the second temperature range for a period of time $(t_2-t_1)$ between $t_1$ and $t_2$. During the period of time $(t_2-t_1)$ between $t_2$ and $t_3$, additional shrinkage of the wet porous gel monolith 1000 can occur, as schematically illustrated in FIG. 21.

As liquid 1004 is removed from the pores 1002 of the gel monolith 1000, the gel monolith 1000 shrinks in size yet remains wet, until the density of the gel monolith 1000 reaches its critical gel density $\rho_{crit}$, past which there is little or no shrinkage due to removal of liquid 1004. Further removal of liquid 1004 from regions of the gel monolith 1000 which have reached the critical gel density $\rho_{crit}$ results in the drying of those regions. The actual critical gel density $\rho_{crit}$ for a particular gel monolith 1000 is a function of various factors, including, but not limited to its chemical composition, catalysts, and the temporal temperature profile used during the removal of liquid 1004. In certain embodiments, as illustrated in FIG. 21, the critical gel density $\rho_{crit}$ corresponds to a gel monolith linear shrinkage of approximately 24%, which corresponds to a pure silica gel monolith 1000. In other embodiments in which the gel monolith 1000 is Ge-doped, the critical gel density $\rho_{crit}$ can correspond to a gel monolith linear shrinkage of approximately 30%.

In the embodiment schematically illustrated in FIG. 21, the temperature is reduced between times $t_2$ and $t_3$, until reaching $T_2$ in the third temperature range. In certain embodiments, this reduction of the temperature in the operational block 1128 is performed when the gel monolith 1000 has reached a selected gel density which is close to, but less than the critical gel density $\rho_{crit}$. The selected gel density corresponding to time $t_2$, for the embodiment illustrated in FIG. 21, is approximately 22%. The selected gel density for a particular gel monolith 1000 is a function of various factors including, but not limited to, its chemical composition, catalysts, geometry (e.g., surface area to volume ratio), and the temporal temperature profile used to remove the portion of the liquid 1004 in the operational block 1120.

Besides triggering the decrease of the temperature of the operational block 1128, the selected gel density in certain embodiments is used to initiate the operational block 1160 in which substantially all of the remaining liquid 1004 is removed from the pores 1002 of the gel monolith 1000. In embodiments in which the selected gel density is less than the critical gel density $\rho_{crit}$, subsequently removing substantially all of the remaining liquid 1004 from the pores 1002 of the gel monolith 1000 is initiated before the wet porous gel monolith 1000 has densified to substantially its critical gel density $\rho_{crit}$.

In certain embodiments, subsequently removing substantially all of the remaining liquid 1004 from the pores 1002 of the gel monolith 1000 is initiated when the linear shrinkage of the gel monolith 1000 is between approximately 15% and approximately 35%. In certain other embodiments, subsequently removing substantially all of the remaining liquid 1004 from the pores 1002 of the gel monolith 1000 is initiated when the linear shrinkage of the gel monolith 1000 is between approximately 20% and approximately 30%. In still other embodiments, subsequently removing substantially all of the remaining liquid 1004 from the pores 1002 of the gel monolith 1000 is initiated when the linear shrinkage of the gel monolith 1000 is between approximately 22% and approximately 27%.

In alternative embodiments, rather than measuring the gel density by continually monitoring the linear shrinkage of the gel monolith 1000 to detect the selected gel density, the weight of the portion of the liquid 1004 removed from the pores 1002 of the gel monolith 1000 is monitored. In such embodiments, the amount of liquid 1004 removed from the gel monolith 1000 is used to initiate subsequently removing substantially all of the remaining liquid 1004 from the pores 1002 of the gel monolith 1000.

In certain embodiments, the weight of the removed liquid 1004 is monitored by collecting the evaporated liquid 1004 from the oven, re-condensing the liquid 1004, and weighing the resultant condensate. The evaporated liquid 1004 can be collected via a piping system which provides a conduit for heated vapor from the oven to reach a container on a weight scale. Since the atmosphere in the oven is saturated with vapor from the liquid 1004, upon entering the piping system and the container, the vapor cools, re-condenses, and flows into the container to be weighed. In certain embodiments, the piping system and the container are at approximately room temperature, while in other embodiments, a cooling system (e.g., a condensing unit) is used to cool the piping system and the container to a temperature below room temperature.

After first empirically determining the weight of the collected condensate corresponding to the selected gel density for a gel monolith 1000 of a particular geometry and composition, the weight of the collected condensate provides a measure of the amount of liquid removed from the gel monolith 1000 and the resultant gel density. Expressed as a percentage of the weight of the initial wet porous gel monolith 1000, in certain embodiments, the weight of the removed liquid 1004 which initiates removing substantially all of the remaining liquid 1004 is between approximately 40% and 65%. In other embodiments, the weight of the removed liquid 1004 which initiates removing substantially all of the remaining liquid 1004 is between approximately 40% and 50%. In still other embodiments, the weight of the removed liquid 1004 which initiates removing substantially all of the remaining liquid 1004 is between approximately 44% and 50%.

In addition to monitoring the linear shrinkage of the gel monolith 1000 or the condensate weight, in certain other embodiments, visual examination of the gel monolith 1000 can be used to initiate subsequently removing substantially all of the remaining liquid 1004 from the pores 1002 of the gel monolith 1000. In such embodiments, the wet porous gel monolith 1000 has a clear, slightly bluish appearance from the time to at which the temperature begins to be increased, to the time at which the gel monolith 1000 reaches its critical gel density $\rho_{crit}$. This appearance of the gel monolith 1000 is indicative of a homogeneous gel monolith 1000 with pore diameters in the range of approximately 200 Angstroms to approximately 1500 Angstroms.

In certain such embodiments, a visual imaging system can be used to monitor the visual appearance of the gel monolith 1000. For example, a digital camera and a microprocessor can determine the height of the gel monolith 1000 to within approximately 1 mm, and can monitor the gel monolith 1000 for the formation of white, opaque features larger than approximately 1 mm. The visual imaging system can be coupled to the control system of the oven so that the temperature of the gel monolith 1000 is controlled in response to its size and visual appearance. Other visual imaging systems are compatible with embodiments of the present invention.

Continual exposure to temperatures in the second temperature range after reaching the critical gel density $\rho_{crit}$ of the gel monolith 1000 causes the outer region 1008 of the gel monolith 1000 to dry out more quickly than the inner region 1006, resulting in larger pore diameters near the surface of the gel monolith 1000 as compared to those in the inner region 1006 of the gel monolith 1000. This inhomogeneity of pore diameters can be evident by white, opaque features appearing at the surface of the gel monolith 1000, while the center of the gel monolith 1000 can remain relatively clear. In certain embodiments, the outer region 1008 is dried before the inner region 1006, and liquid 1004 from the inner region 1006 diffuses to the outer region 1008. In such embodiments, white, opaque features can be observed to form just inside the surface of the gel monolith 1000, with the inner region 1006 remaining transparent. As the outer region 1008 is dried further, more of the surface becomes white and opaque, with the inner region 1006 remaining transparent.

Figure 23:
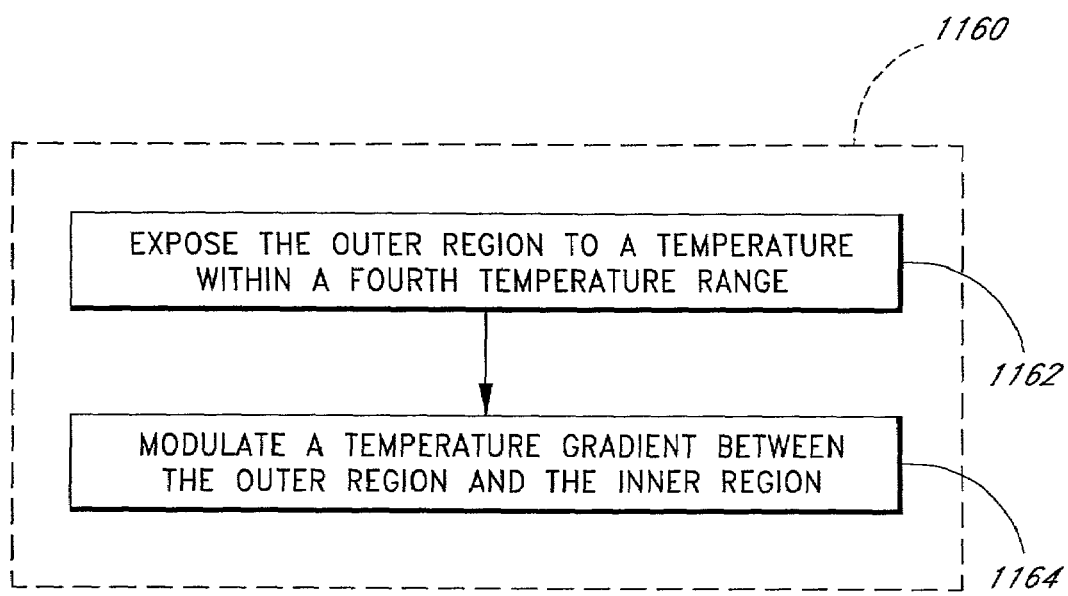
FIG. 23 is a flow diagram of an embodiment of removing substantially all of the remaining liquid from the pores of the gel monolith.

FIG. 23 is a flow diagram of an embodiment of the operational block 1160 in which substantially all of the remaining liquid 1004 is removed from the pores 1002 of the gel monolith 1000 in accordance with embodiments of the present invention. In an operational block 1162, the outer region 1008 of the gel monolith 1000 is exposed to a temperature within a fourth temperature range. In an operational block 1164, a temperature gradient between the outer region 1008 and the inner region 1006 is modulated. As is described more fully below, in certain embodiments, the outer region 1008 of the gel monolith 1000 is exposed to a temperature within the fourth temperature range until the gel monolith 1000 is substantially dried, with interim periods in which the outer region 1008 is exposed to higher temperatures in a fifth temperature range, thereby modulating a temperature gradient between the inner region 1006 and the outer region 1008. In certain embodiments, modulation of the temperature gradient comprises varying the magnitude of the temperature gradient, while in other embodiments, modulation further comprises varying the sign or direction of the temperature gradient relative to the inner region 1006 and the outer region 1008.

In certain embodiments, during the removal of substantially all of the remaining liquid 1004 in the operational block 1160, the gel monolith 1000 shrinks slightly (until the critical gel density $\rho_{crit}$ is reached), and the liquid content of the gel monolith 1000 is reduced, thereby drying the gel monolith 1000. The fourth temperature range of the operational block 1162 is selected in certain embodiments to provide a rate of drying which minimizes inhomogeneities in the capillary forces and the overall stresses on the gel monolith 1000, thereby avoiding cracking of the gel monolith 1000. In certain such embodiments, the fourth temperature range corresponds to a rate of evaporation $\Theta_{evap}$ from the outer region 1008 that is substantially equal to or less than the rate of diffusion $\Theta_{diff}$ of liquid 1004 through the pores 1002 of the gel monolith 1000. Under such conditions, the liquid 1004 which evaporates from the surface of the gel monolith 1000 is replaced by liquid 1004 from the inner region 1006 of the gel monolith 1000. The gel monolith 1000 of such embodiments dries primarily by diffusion, with the liquid 1004 from the inner region 1006 diffusing to the outer region 1008.

In certain embodiments, the fourth temperature range is between approximately 10° C. below and approximately 10° C. above the boiling temperature of the liquid 1004. In certain other embodiments, the fourth temperature range is between approximately 5° C. below and approximately 5° C. above the boiling temperature of the liquid 1004. In still other embodiments, the fourth temperature range is between approximately the boiling temperature of the liquid 1004 and approximately 2° C. above the boiling temperature of the liquid 1004. In the embodiment illustrated in FIG. 21, the temperature $T_2$ at time $t_3$ is within both the third temperature range and the fourth temperature range, thereby providing continuity between the operational block 1128 and the operational block 1162. Other embodiments compatible with the present invention can use a fourth temperature range that does not overlap with the third temperature range.

While FIG. 21 shows the temperature in the fourth temperature range to be generally constant, other embodiments compatible with the present invention can vary the temperature while staying in the fourth temperature range. In certain embodiments, the temperature is increased within the fourth temperature range at a rate between approximately 0.3 and 20 days per degree Celsius, while in other embodiments, the temperature increase rate is between approximately 1 and approximately 10 days per degree Celsius, and in still other embodiments, the temperature increase rate is between approximately 2 and approximately 5 days per degree Celsius. During such slowly-varying increases of the temperature, the inner region 1006 of the gel monolith 1000 remains at approximately the same temperature as is the outer region 1008 of the gel monolith 1000. Therefore, such slowly-increasing temperatures do not generate a substantial temperature gradient between the inner region 1006 and the outer region 1008 of the gel monolith 1000.

In certain embodiments, a temperature gradient between the outer region 1008 and the inner region 1006 is modulated in an operational block 1164 by exposing the outer region 1008 to a temperature within the fourth temperature range and exposing the outer region 1008 to a temperature within a fifth temperature range higher than the fourth temperature range. By exposing the outer region 1008 of the gel monolith 1000 to temperatures in the fifth temperature range while the inner region 1006 is effectively at a temperature within the fourth temperature range, a temperature gradient is generated between the inner region 1006 and the outer region 1008. Similarly, once the inner region 1006 is effectively at an elevated temperature above the fourth temperature range, by exposing the outer region 1008 to a temperature in the fourth temperature range, a temperature gradient is again generated between the inner region 1006 and the outer region 1008. As used herein, a temperature gradient in which the outer region 1008 is at a higher temperature than is the inner region 1006 is described as a positive temperature gradient, and a temperature gradient in which the outer region 1008 is at a lower temperature than is the inner region 1006 is described as a negative temperature gradient.

In the embodiment illustrated in FIG. 21, the rate of temperature increase or decrease between the fourth temperature range and the fifth temperature range is rapid enough to generate the temperature gradient between the inner region 1006 and the outer region 1008 of the gel monolith 1000. In certain embodiments, the temperature is increased or decreased approximately instantaneously by stepping the set point temperature of the oven between a temperature in the fourth temperature range and a temperature in the fifth temperature range and allowing the gel monolith 1000 to heat up or cool down in accordance with the modified temperature. In certain embodiments, the absolute value of the rate of temperature change is between approximately 60° C./hour and approximately 155° C./hour. In other embodiments, the absolute value of the rate of temperature change is approximately equal to 135° C./hour. Other embodiments can utilize nonlinear temperature changes between the fourth temperature range and the fifth temperature range. In certain embodiments, the absolute value of the temperature increase from the fourth to the fifth temperature range can be different from the absolute value of the temperature decrease from the fifth to the fourth temperature range.

In certain embodiments, the fifth temperature range is less than approximately 180° C. In other embodiments, the fifth temperature range is between approximately 100° C. and approximately 150° C. In still other embodiments, the fifth temperature range is between approximately 120° C. and approximately 130° C. In certain embodiments, the fifth temperature range corresponds to an evaporation rate $\Theta_{evap}$ of the liquid 1004 from the outer region 1008 which is greater than or equal to a diffusion rate $\Theta_{diff}$ of the liquid 1004 in the pores 1002 of the gel monolith 1000. Under such conditions, the outer region 1008 dries faster than does the inner region 1006 since liquid 1004 is removed from the outer region 1008 via evaporation faster than liquid 1004 is replaced by diffusion from the inner region 1006 to the outer region 1008. One result of such conditions is that the outer region 1008 becomes opaque before the inner region 1006 becomes opaque.

In the exemplary embodiment schematically illustrated in FIG. 21, the outer region 1008 is exposed to a temperature within the fourth temperature range for a period of time ($t_4$–$t_3$) between times $t_3$ and $t_4$. In certain such embodiments, the time period ($t_4$–$t_3$) between times $t_3$ and $t_4$ is sufficiently long so that at time $t_4$, the temperature of the inner region 1006 and the temperature of the outer region 1008 are both within the fourth temperature range. As described above, in certain embodiments the temperature applied to the outer region 1008 during the time period ($t_4$–$t_3$) between times $t_3$ and $t_4$ is constant or is varying sufficiently slowly so that the inner region 1006 remains at approximately the same temperature as is the outer region 1008. In such embodiments, there is not a substantial temperature gradient between the inner region 1006 and the outer region 1008 during the time period ($t_4$–$t_3$).

In embodiments in which the fourth temperature range corresponds to a rate of evaporation $\Theta_{evap}$ from the outer region 1008 that is substantially equal to or less than the rate of diffusion $\Theta_{diff}$ of liquid 1004 through the pores 1002, the liquid 1004 evaporating from the surface of the gel monolith 1000 is replaced by liquid 1004 from the inner region 1006 of the gel monolith 1000. In such embodiments, the outer region 1008 does not dry faster than does the inner region 1006 during the time period ($t_4$–$t_3$) between times $t_3$ and $t_4$.

At time $t_4$ in the exemplary embodiment of FIG. 21, the outer region 1008 is exposed to a temperature within the fifth temperature range, thereby generating a positive temperature gradient between the outer region 1008 and the cooler inner region 1006. This positive temperature gradient will exist for some time while the temperature within the fifth temperature range is applied, but the positive temperature gradient will decrease in magnitude as the inner region 1006 warms, eventually reaching zero once the inner region 1006 is at the same temperature as the outer region 1008 (i.e., once the inner region 1006 and outer region 1008 are equilibrated).

Because the rate of evaporation $\Theta_{evap}$ is proportional to temperature, the rate of evaporation $\Theta_{evap}$ from the outer region 1008 will be faster in the fifth temperature range than in the fourth temperature range. In embodiments in which the fifth temperature range corresponds to an evaporation rate $\Theta_{evap}$ which is greater than or equal to the diffusion rate $\Theta_{diff}$ for temperatures in the fourth temperature range, while the positive temperature gradient exists, liquid 1004 is removed from the outer region 1008 via evaporation faster than liquid 1004 is replaced by diffusion from the inner region 1006. During such times, the outer region 1008 dries faster than does the inner region 1006. In addition, the heat applied to the outer region 1008 is absorbed by the evaporating liquid 1004, thereby contributing to the temperature gradient between the outer region 1008 and the inner region 1006 by inhibiting the applied heat from diffusing to and warming the inner region 1006.

In the exemplary embodiment of FIG. 21, the outer region 1008 is exposed to a temperature in the fifth temperature range for a period of time ($t_5$–$t_4$) between $t_4$ and $t_5$. In certain embodiments, the outer region 1008 is exposed to a temperature in the fifth temperature range for a period of time between approximately 30 minutes and approximately 5 hours. In other embodiments, the outer region 1008 is exposed to a temperature in the fifth temperature range for a period of time between approximately one hour and approximately 2 hours. In still other embodiments, the outer region 1008 is exposed to a temperature in the fifth temperature range for a period of time between approximately 1.5 hours and approximately 2 hours.

In certain embodiments, the period of time ($t_5$–$t_4$) between $t_4$ and $t_5$ is selected to allow most, if not all, of the outer region 1008 to become opaque white before lowering the temperature. Such embodiments have a drier outer region 1008 and a wetter inner region 1006. Once the temperature is lowered, the liquid 1004 from various portions of the wetter inner region 1006 can diffuse into various portions of the drier outer region 1008 at approximately equal rates, thereby avoiding stresses in the gel monolith 1000.

The period of time during which the outer region 1008 is exposed to a temperature in the fifth temperature range can be described by examining the forces on the gel monolith 1000 in certain embodiments. While the positive temperature gradient exists between the outer region 1008 and the inner region 1006, there are two main forces acting on the gel monolith 1000: vapor pressure (tensile force) and capillary force (compressive force). While in the fifth temperature range, the outer region 1008 will have a net tensile force because the vapor pressure dominates over the capillary forces at these temperatures. Similarly, while in the fourth temperature range, the inner region 1006 will have a net compressive force because the capillary forces dominate at these temperatures. Gel monoliths 1000 comprising ceramics or oxide-based materials are more stable under compression than under tension. Therefore, certain such embodiments avoid cracking of the gel monolith 1000 by maintaining tensile forces which do not exceed compressive forces. The roles of compression and tension forces in gel monoliths is discussed further by Brinker & Scherer in "Sol-Gel Science, The Physics and Chemistry of Sol-Gel Processing," pages 483–498, Academic Press, 1990, which is incorporated in its entirety by reference herein.

This condition of keeping tensile forces less than compressive forces can constrain the period of time during which the outer region 1008 is exposed to the fifth temperature range in certain embodiments. After a sufficiently long period of time, the entire gel monolith 1000, including the inner region 1006, will be at a temperature within the fifth temperature range. Under such conditions, there is no longer a temperature gradient between the outer region 1008 and the inner region 1006, and the vapor pressure dominates over the capillary forces across the gel monolith 1000. Thus, the gel monolith 1000 will be under tension and can crack. Therefore, in accordance with embodiments of the present invention, the outer region 1008 is exposed to a temperature within the fifth temperature range only for relatively short periods of time so as to avoid conditions for cracking.

At time $t_5$ in the exemplary embodiment of FIG. 21, the outer region 1008 is exposed to a temperature within the fourth temperature range, thereby cooling the outer region 1008. In embodiments in which the outer region 1008 becomes cooler than the inner region 1006, a negative temperature gradient is generated between the outer region 1008 and the warmer inner region 1006. This negative temperature gradient will exist for some time while the temperature within the fourth temperature range is applied, but the negative temperature gradient will decrease in magnitude as the inner region 1006 cools, eventually reaching zero once the inner region 1006 is at the same temperature as the outer region 1008.

In embodiments in which the outer region 1008 does not reach temperatures below that of the inner region 1006, cooling the outer region 1008 reduces the magnitude of the positive temperature gradient and hastens the equalization of temperatures between the outer region 1008 and the inner region 1006. Whether the outer region 1008 reaches temperatures below that of the inner region 1006 is dependent on details of the temporal temperature profile, such as the temperatures applied and the periods of time that the temperatures were applied.

By allowing the outer region 1008 to cool, the rate of evaporation $\Theta_{evap}$ is reduced and the temperature gradient gradually decreases in magnitude, eventually reaching zero. Once both the inner region 1006 and outer region 1008 are again at temperatures within the fourth temperature range, the gel monolith 1000 dries primarily by diffusion and the overall stresses on the gel monolith 1000 are minimized. As described above, the liquid 1004 from the inner region 1006 diffuses to the drier, outer region 1008.

Figure 24A:
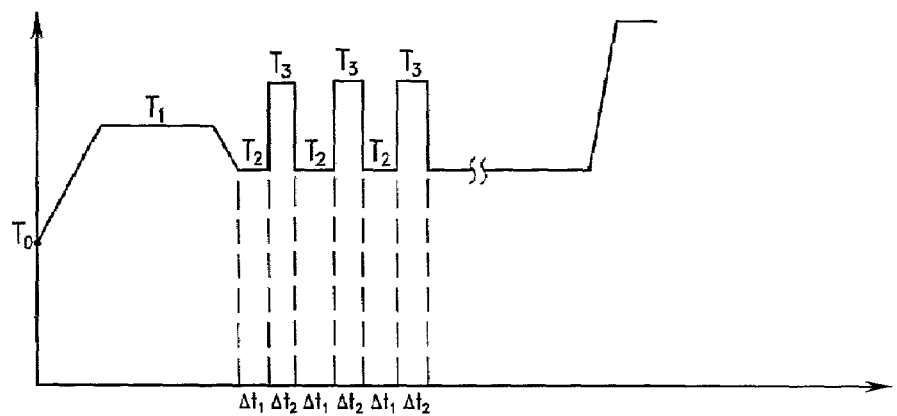
FIGS. 24A–24C schematically illustrate temporal temperature profiles comprising cycles in accordance with embodiments of the present invention.
Figure 24B:
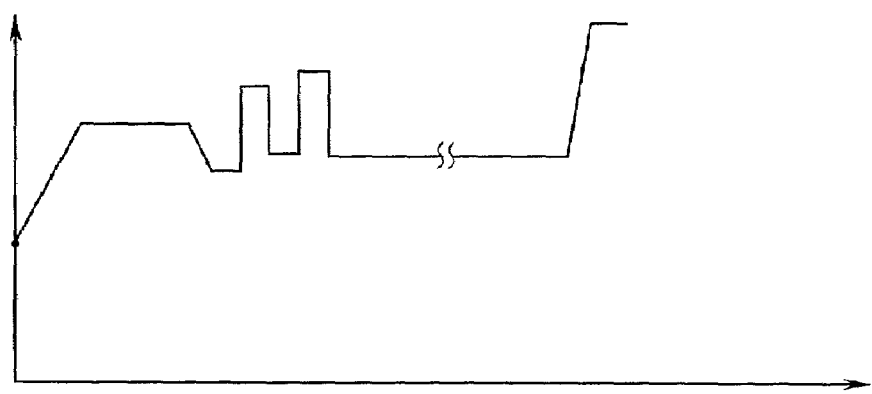
Figure 24C:
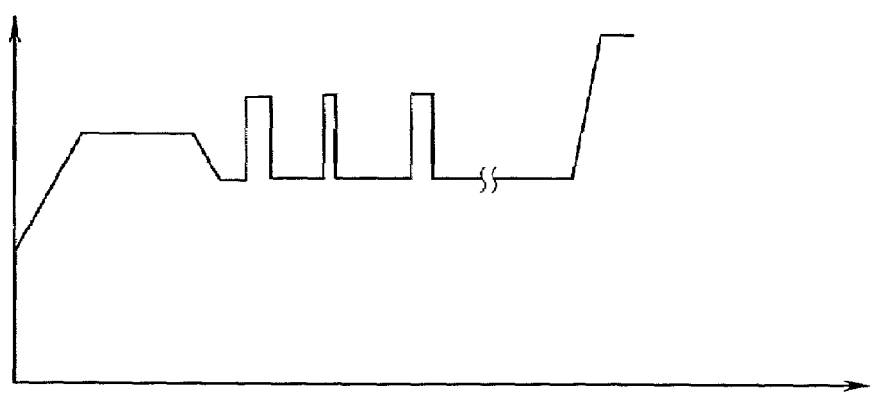

FIGS. 24A–C schematically illustrate other temporal temperature profiles in accordance with embodiments of the present invention. In certain embodiments, modulating the temperature gradient between the inner region 1006 and the outer region 1008 further comprises cycling the temperature through a plurality of cycles. Each cycle comprises exposing the outer region 1008 to the fourth temperature range for a first time period, increasing the temperature from the fourth temperature range to the fifth temperature range, and exposing the outer region to the fifth temperature range for a second time period. The temperature is increased between the fourth temperature range and the fifth temperature range at a rate to generate a substantial temperature gradient between the outer region and the inner region.

In certain embodiments, each cycle has substantially the same parameters as do the other cycles. For example, the temporal temperature profile illustrated in FIG. 24A comprises three cycles. Each cycle exposes the outer region 1008 to a temperature $T_2$ within the fourth temperature range for a first time period $\Delta t_1$ and exposes the outer region 1008 to a temperature $T_3$ within the fifth temperature range for a second time period $\Delta t_2$. In addition, the rates of temperature increase and decrease for each cycle are substantially the same, and are sufficiently rapid to generate substantial temperature gradients between the outer region and the inner region, as described above.

While the embodiment illustrated in FIG. 24A comprises three cycles, other embodiments compatible with the present invention comprise two, four, or more cycles. In addition, other temporal temperature profiles in accordance with embodiments of the present invention can comprise cycles with differing first time periods, second time periods, temperatures, or rates of temperature increase or decrease. For example, FIG. 24B illustrates an embodiment comprising two cycles with differing temperatures, and FIG. 24C illustrates an embodiment comprising three cycles with differing first time periods and differing second time periods.

In certain embodiments, the first time period is between approximately one hour and approximately 30 hours. In certain other embodiments, the first time period is between approximately 5 hours and approximately 20 hours.

In certain embodiments, the second time period is between approximately 10 minutes and approximately 15 hours. In certain other embodiments, the second time period is between approximately 10 minutes and approximately 10 hours. In still other embodiments, the second time period is between approximately 1.5 hours and approximately 2 hours.

In certain embodiments, as schematically illustrated in FIGS. 21 and 24A–C, the temporal temperature profile also comprises a relatively brief exposure of the gel monolith 1000 to high temperatures once the gel monolith 1000 is dried (i.e., the liquid 1004 has been completely driven from the pores 1002 of the gel monolith 1000). This period of heightened temperatures is used to drive the remaining vapor from the pores 1002 of the gel monolith 1000. In certain such embodiments, the temperature is ramped up to approximately 180° C. over a period of approximately 18 hours, and is held at this heightened temperature for approximately 3 hours to approximately 10 hours. In addition, to facilitate the removal of vapor from the pores 1002 of the gel monolith 1000, certain embodiments comprises backfilling the drying oven with an inert gas, nitrogen, air, or a combination thereof, at atmospheric pressure during this exposure to high temperatures.

Figure 25:
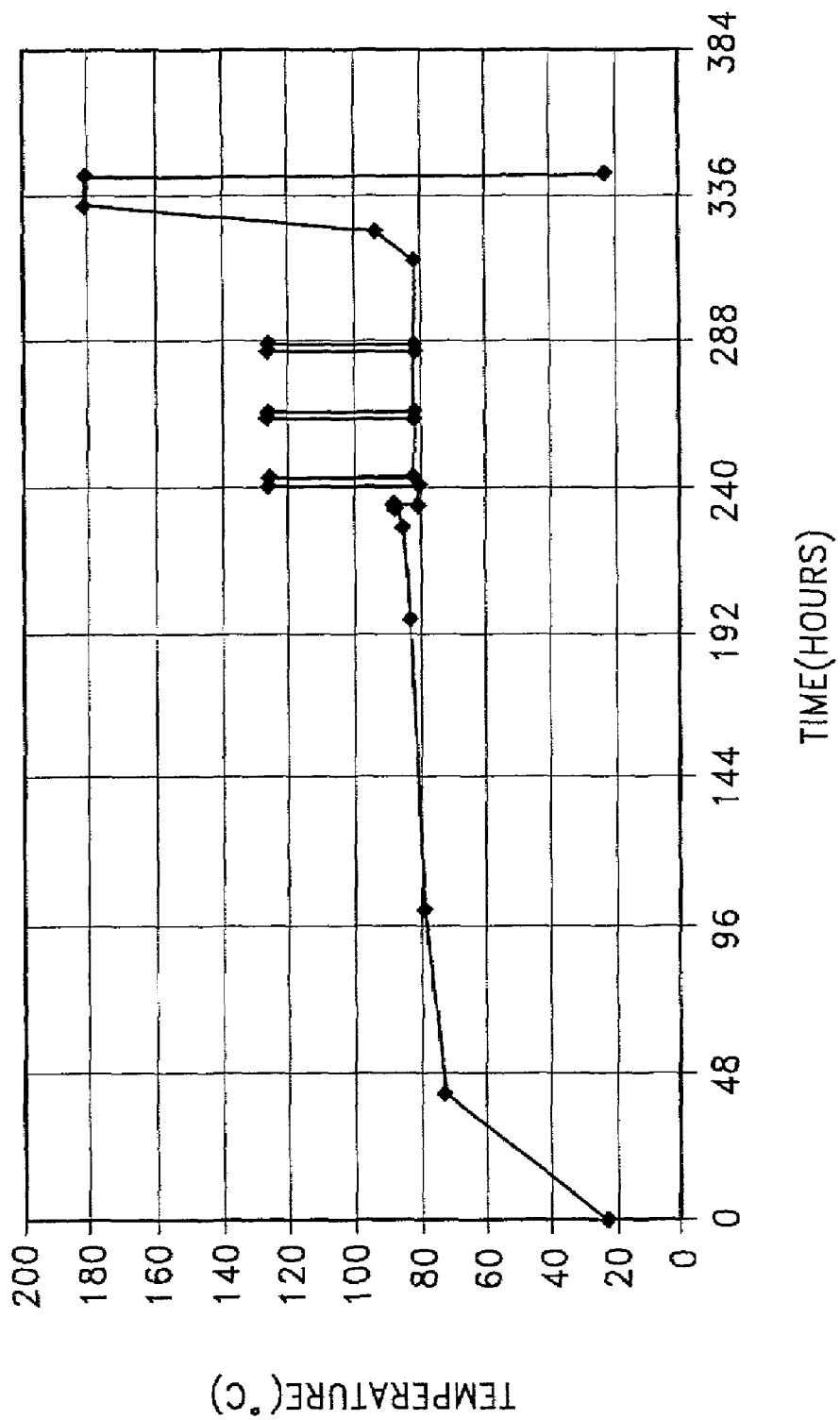
FIG. 25 schematically illustrates an exemplary temporal temperature profile in accordance with embodiments of the present invention.

FIG. 25 schematically illustrates an exemplary temporal temperature profile which was applied to a gel monolith 1000 in accordance with embodiments of the present invention. The gel monolith 1000 was formed from a sol-gel solution comprising a formulation with a mole ratio of TEOS:Ge:ethanol:HF:water of 1:0.105:2.5:0.25:2.2. At time $t_0$, removing a portion of the liquid 1004 from the pores 1002 of the gel monolith 1000 began by placing the wet porous gel monolith 1000 in the drying oven and exposing the gel monolith 1000 to a temperature of approximately 23° C., which is within the first temperature range of certain embodiments. The temperature in the drying oven was then increased linearly, eventually reaching a temperature of approximately 72° C. after approximately 40 hours. For the next approximately 194 hours, the outer region 1008 was exposed to a temperature which increased generally linearly from approximately 72° C. to approximately 87° C., which is within the second temperature range of certain embodiments. During this period of increasing temperature, the temperature increased from the first temperature range to the second temperature range which is substantially above the boiling temperature of the liquid 1004 (approximately 78° C. for ethanol) and the temperature was maintained within the second temperature range for a period of time (while still increasing).

Approximately 235 hours after placing the gel monolith 1000 in the drying oven, the temperature was reduced from approximately 87° C. to approximately 80° C., which is within the third temperature range of certain embodiments. During the removal of the portion of the liquid 1004, the volume of the gel monolith 1000 shrank, with the gel monolith 1000 becoming correspondingly more dense.

Once the temperature reached approximately 80° C., removal of substantially all of the remaining liquid 1004 from the pores 1002 of the gel monolith 1000 began. For approximately 6 hours, the outer region 1008 was exposed to a temperature of approximately 80° C., which is within the fourth temperature range of certain embodiments, and a temperature gradient between the outer region 1008 and the inner region 1006 was then modulated by cycling the temperature through a plurality of cycles.

Modulating the temperature gradient began with a first temperature cycle comprising the approximately 6-hour exposure of the outer region 1008 to approximately 80° C., which is within the fourth temperature range of certain embodiments. The first temperature cycle further comprised increasing the temperature from the fourth temperature range to a temperature of approximately 125° C., which is within the fifth temperature range of certain embodiments.

The first temperature cycle further comprised exposing the outer region 1008 to the fifth temperature range for approximately 2.5 hours.

Modulating the temperature gradient continued with two additional temperature cycles. Each of these cycles comprises exposing the outer region 1008 to approximately 80° C. for approximately 20 hours, increasing the temperature to approximately 125° C., and exposing the outer region 1008 to this temperature for approximately 2.5 hours. The temperature was then reduced and maintained at approximately 80° C. for approximately 28 hours. The temporal temperature profile also comprises a relatively brief exposure of the gel monolith 1000 to high temperatures once the gel monolith 1000 was dried to drive the remaining vapor from the pores 1002. The oven was backfilled with nitrogen gas and the temperature was ramped up to approximately 180° C. over a period of approximately 17 hours, and was held at approximately 180° C. for approximately 10 hours. The temperature was then reduced back to approximately room temperature (approximately 23° C.) under the nitrogen gas atmosphere.

Figure 26:
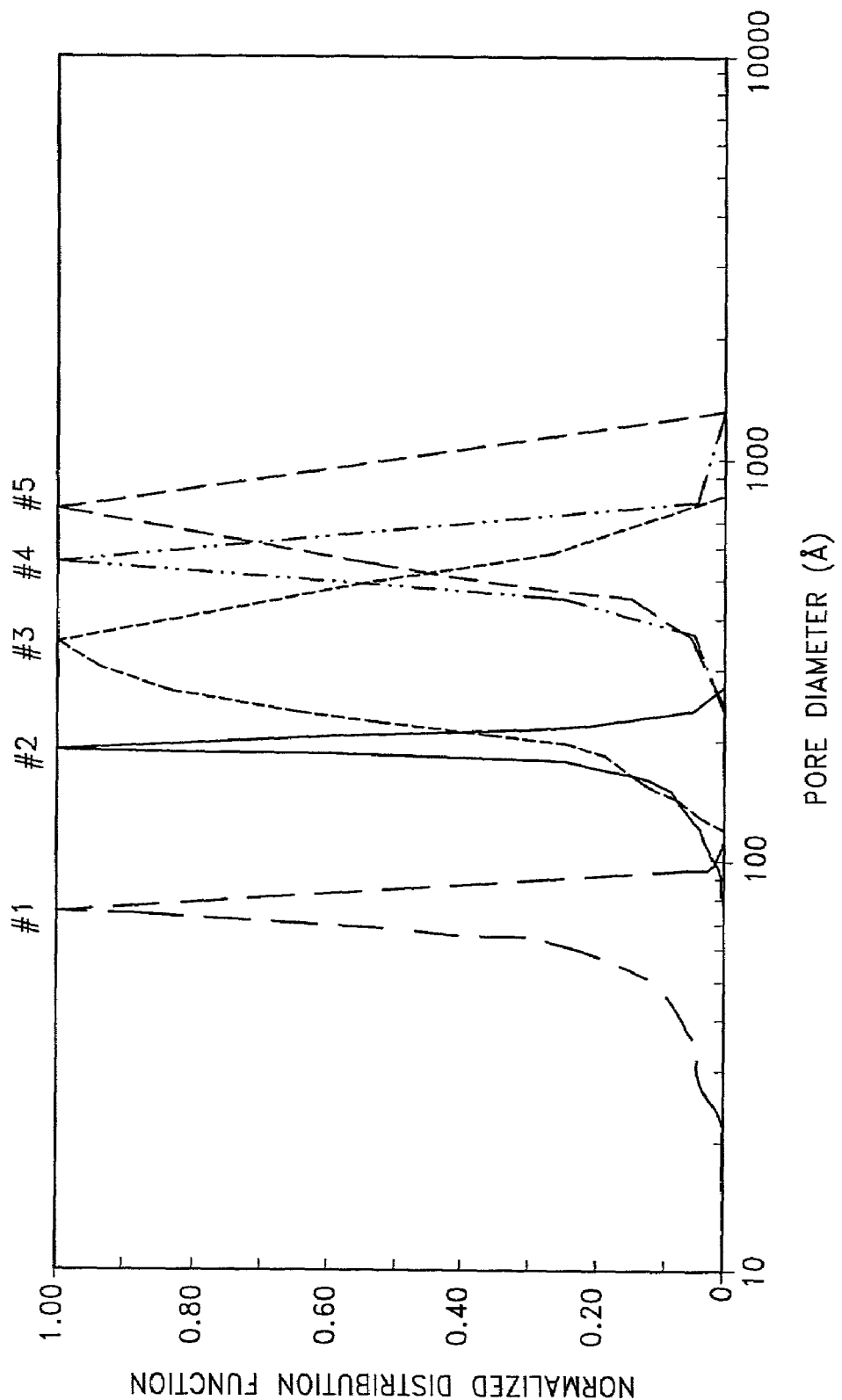
FIG. 26 graphically illustrates five pore diameter distributions in accordance with embodiments of the present invention.

FIG. 26 graphically illustrates the resultant pore diameter distributions for five different solution formulations after drying in accordance with embodiments of the present invention. Table 1 provides information regarding these five solution formulations and the resultant pore diameter distributions. In addition to the listed formulation, each of the solutions of FIG. 26 and Table 1 have a formulation with a mole ratio of TEOS:ethanol:water of 1:2:2.

diameters of xerogel monoliths fabricated in accordance with embodiments of the present invention correlate generally with the concentration of the catalyst HF in the solution.

In certain embodiments, the resultant xerogel monolith has a pore diameter distribution with an average pore diameter between approximately 200 Å and approximately 1500 Å. In certain such embodiments, the average pore diameter is between approximately 400 Å and approximately 1500 Å, while in certain other embodiments, the mean pore diameter is between approximately 1000 Å and approximately 1500 Å. Similarly, in certain embodiments, the resultant xerogel monolith has a pore diameter distribution with a mode pore diameter between approximately 200 Å and approximately 1500 Å.

In certain embodiments, at least 20% of the pores of the resultant xerogel monolith have diameters within approximately ±10% of the average pore diameter. In certain other embodiments, at least 45% of the pores of the resultant xerogel monolith have diameters within approximately ±30% of the average pore diameter. In certain embodiments, at least 30% of the pores have diameters within approximately ±10% of the mode pore diameter, while in certain other embodiments, at least 90% of the pores have diameters within approximately ±30% of the mode pore diameter.

Consolidating the Gel Monolith

Once dried, the gel monolith is densified into an optical-quality glass monolith by a consolidating process (i.e., sintering). The glass phase is characterized by an amorphous structure. Alternatively, in other embodiments, the densifi-

TABLE 1

| Monolith | Formulation (mole ratio) | Pore Volume (cc/g) | Pore Surface Area (m²/g) | Average Pore Diameter (Å) | % of Pores Within ±10%, ±30%, ±45% of Average | Mode Pore Diameter (Å) | % of Pores Within ±10%, ±30%, ±45% of Mode |
|---|---|---|---|---|---|---|---|
| A | HF 0.12 | 1.167 | 518.1 | 90.1 | 35% | 78 | 70% |
|   |   |   |   |   | 85% |   | 95% |
|   |   |   |   |   | 100% |   | 100% |
| B | HF 0.16 | 1.812 | 244.2 | 296.9 | 5% | 198 | 65% |
|   |   |   |   |   | 80% |   | 95% |
|   |   |   |   |   | 100% |   | 100% |
| C | HF 0.25 Ge 0.105 | 3.67 | 292.4 | 501.4 | 15% | 374 | 15% |
|   |   |   |   |   | 45% |   | 40% |
|   |   |   |   |   | 100% |   | 90% |
| D | HF 0.34 | 3.32 | 180.8 | 735 | 20% | 587 | 50% |
|   |   |   |   |   | 65% |   | 95% |
|   |   |   |   |   | 100% |   | 100% |
| E | HF 0.4 | 2.66 | 95.74 | 1114 | 20% | 809 | 30% |
|   |   |   |   |   | 60% |   | 90% |
|   |   |   |   |   | 100% |   | 100% |

Each of the xerogel monoliths of FIG. 26 and Table 1 was prepared in accordance with embodiments of the present invention as described herein. In certain embodiments, a sol comprising metal alkoxide and a catalyst at a catalyst concentration is first formed. The sol is then gelled to form a wet gel monolith, which is dried and shrunk by exposing the wet gel monolith to a temporal temperature profile, thereby forming a xerogel monolith. The catalyst, the catalyst concentration, and the temporal temperature profile for such embodiments are controlled and preselected to obtain the xerogel monolith having certain physical properties.

The pore diameter distributions of FIG. 26 and Table 1 were measured using either an Autosorb-6B or Autosorb-3B surface area and pore size analyzer manufactured by Quantachrome Corporation of Boynton Beach, Fla. As described above, and as seen in FIG. 26 and Table 1, the mean pore cation can result in a monolith which has a crystalline structure. The consolidating process can result in further linear shrinkage of the monolith, eventually reaching approximately 60% (i.e., to 40% of the starting size of the wet gel monolith).

Consolidation is performed by placing the dry gel monolith in a furnace and exposing it to a consolidating temporal temperature profile in an atmosphere comprising various gases. Numerous consolidating temporal temperature profiles and atmospheres are compatible with embodiments of the present invention, including those described by Kirkbir, et al., in U.S. Pat. No. 5,254,508, which is incorporated in its entirety by reference herein. As described by Kirkbir, et al., the consolidating temporal temperature profile and atmospheres can be chosen to fabricate optical fiber preforms which undergo reduced bubbling of the germanium-doped core portion during the high-temperature fiber drawing process.

Figure 27:
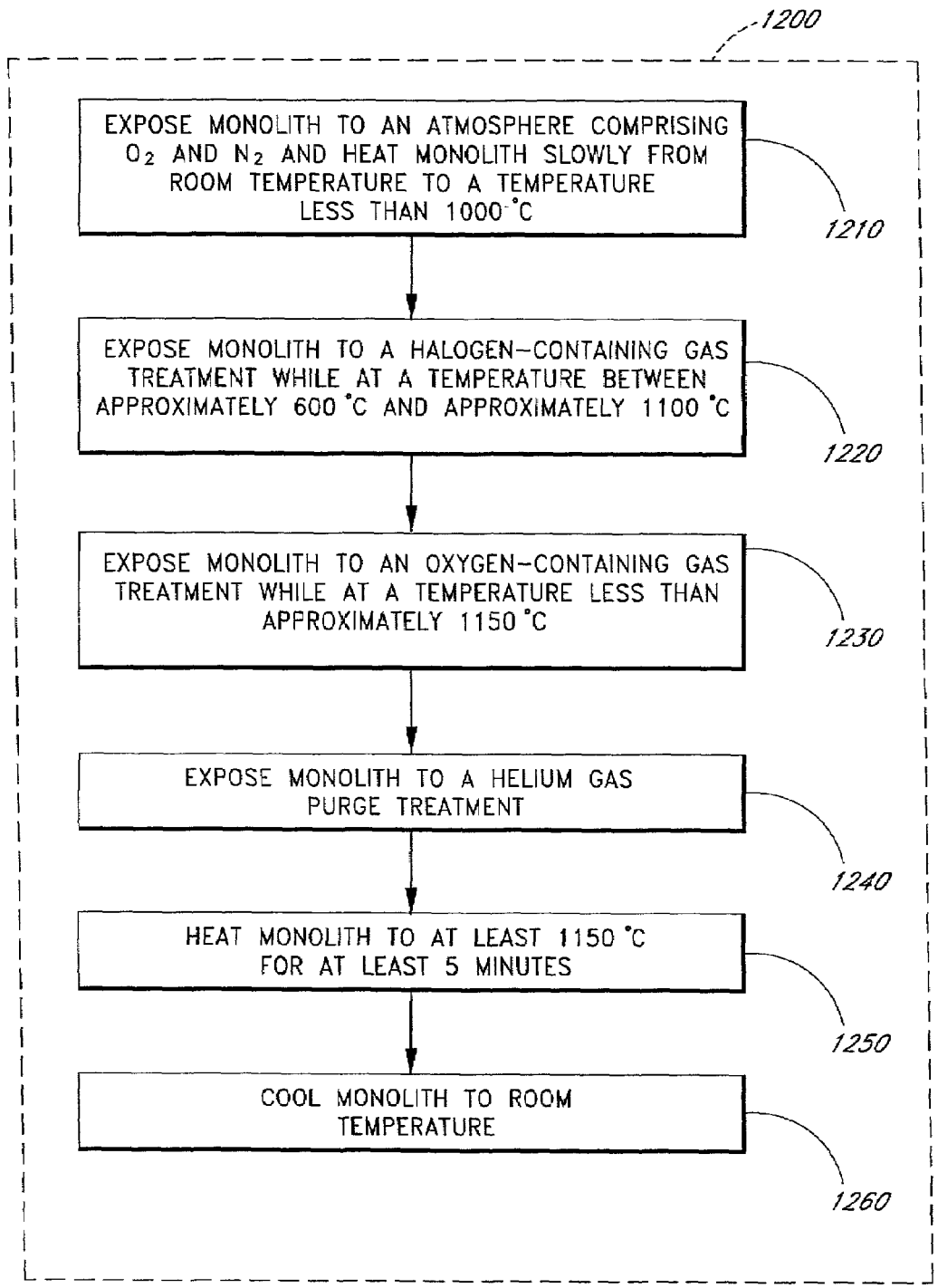
FIG. 27 is a flow diagram of a consolidating process in accordance with embodiments of the present invention.

FIG. 27 is a flowchart of a consolidating process 1200, in accordance with embodiments of the present invention, performed on a monolith in a furnace. In an operational block 1210, the monolith is exposed to an atmosphere comprising oxygen and nitrogen and heated slowly from room temperature to a temperature of no more than 1000° C. The operational block 1210 of certain embodiments can comprise intermittent periods at which the temperature is held constant. For example, in certain embodiments, the operational block 1210 comprises maintaining the temperature at approximately 160° C. for two hours, at approximately 240° C. for 20 hours, raising the temperature to approximately 700° C. in 30 hours, and holding at this temperature for 39 hours. In addition, the monolith can also be exposed to intermittent vacuum treatments during the operational block 1210. These intermittent vacuum treatments, in which the monolith is exposed to pressures of less than approximately atmospheric pressure for periods of time between approximately 10 minutes and approximately 10 hours, can serve to shorten the overall time the monolith is exposed to the conditions of the operational block 1210. In certain embodiments, the monolith is exposed to absolute pressures of approximately 0.7 psi (i.e., approximately −14 psi relative to atmospheric pressure) during the operational block 1210.

The processing step of the operational block 1210 can remove unwanted molecules from the pore surfaces of the monolith. In certain embodiments, these unwanted molecules can include, but are not limited to, organic species, corrosive effluent molecules such as HF, and byproducts of the hydrolysis and polymerization reactions, such as alcohol, $H_2O$, or hydrocarbons. In embodiments having a Ge-doped monolith, this processing step can also remove $GeF_2$, $GeF_4$, or $GeCl_4$ from the pore surfaces of the monolith.

In certain embodiments, the consolidating process 1200 further comprises an operational block 1220 in which the monolith is exposed to a halogen-containing gas treatment while at a temperature between approximately 600° C. and approximately 1100° C. This processing step can remove hydroxyl groups (OH) from the pore surfaces of the monolith which would otherwise degrade the optical performance of the resultant glass. In addition, this processing step can remove unwanted free GeO molecules from a Ge-doped monolith.

In certain embodiments of the operational block 1220, the monolith is exposed to a gas comprising an inert gas (such as helium or nitrogen), and at least 0.1% of a halogen-containing gas such as chlorine gas ($Cl_2$). In certain embodiments, the gas further comprises oxygen. In still other embodiments, the gas comprises approximately 10% by volume of $Cl_2$ and approximately 90% by volume of $O_2$. Other halogen-containing gases compatible with embodiments of the present invention include, but are not limited to, $SiF_4$, $NF_3$, $NH_4F$, HF, $SOCl_2$, $CCl_4$, and $SiCl_4$. The temperature during the operational block 1220 of certain embodiments can be held constant, or can be varied with a predetermined temporal temperature profile. For example, in certain embodiments, the operational block 1220 comprises holding the temperature at approximately 700° C. for 5 hours, increasing to approximately 800° C. in 10 hours, holding at approximately 800° C. for 5 hours, increasing to approximately 900° C. in 10 hours, and holding at this temperature for 10 hours. As described above in relation to the operational block 1210, the operational block 1220 of certain embodiments can comprise one or more intermittent vacuum treatments which can shorten the overall time the monolith is exposed to the conditions of the operational block 1220.

In certain embodiments, the consolidating process 1200 further comprises an operational block 1230 in which the monolith is exposed to an oxygen-containing gas treatment while at a temperature less than approximately 1150° C. This processing step can remove chlorine from the monolith and burn off residual carbon atoms. In certain embodiments, the oxygen-containing gas comprises at least 10% oxygen ($O_2$), with the balance comprising helium or nitrogen or both. The temperature during the operational block 1230 of certain embodiments can be held constant, or can be varied with a predetermine temporal temperature profile. For example, in certain embodiments, the operational block 1230 comprises maintaining the temperature at 900° C. for 29 hours, increasing to 1020° C. in 10 hours, and increasing to 1040° C. in 20 hours. As described above, the operational block 1230 of certain embodiments can comprise one or more intermittent vacuum treatments which can shorten the overall time the monolith is exposed to the conditions of the operational block 1230.

In certain embodiments, the consolidating process 1200 further comprises an operational block 1240 in which the monolith is exposed to a helium gas purge treatment which can remove oxygen gas from the pores of the monolith. In addition, for Ge-doped monoliths, embodiments of the operational block 1240 can remove unwanted free $GeO_2$ molecules from the monolith. In certain embodiments, this processing step lasts at least 30 minutes during a temperature less than approximately 1150° C. As described above, the operational block 1240 of certain embodiments can comprise one or more intermittent vacuum treatments which can shorten the overall time the monolith is exposed to the conditions of the operational block 1240.

In certain embodiments, the consolidating process 1200 further comprises an operational block 1250 in which the monolith is heated to a temperature of at least 1150° C. for at least 5 minutes. This processing step can densify and consolidate the monolith into optical quality glass. In certain embodiments, the temperature is increased from the temperature of the operational block 1240 at a rate of at least approximately 10° C. per hour. For example, in certain embodiments, the operational block 1250 comprises increasing the temperature to approximately 1160° C. in 12 hours, increasing to approximately 1280° C. in 15 hours, maintaining at approximately 1280° C. for 10 hours, and decreasing to approximately 1120° C. in 2 hours. In certain embodiments, this processing step is performed in vacuum, while in other embodiments, it is performed in an atmosphere of helium gas to facilitate heat transfer during consolidation.

In certain embodiments, the consolidating process 1200 further comprises an operational block 1260 in which the monolith is cooled down to room temperature in a nitrogen or helium gas environment. In certain embodiments, the operational block 1260 comprises cooling to approximately 1120° C. in 6 hours, cooling to approximately 850° C. in 26 hours, cooling to approximately 500° C. in 18 hours, and cooling freely to approximately 20° C. Other embodiments can utilize other temporal temperature profiles which avoid stresses which would otherwise result in poor optical quality of the monolith.

Below are described particular examples of consolidating temperature profiles and the atmospheres in accordance with embodiments of the present invention:

EXAMPLE 1

For 27 hours, a dry gel monolith was heated from room temperature (approximately 20° C.) to 400° C. in an atmosphere of 20% oxygen and 80% nitrogen. The monolith was then heated to 700° C. in 45 hours in an atmosphere of 40% oxygen and 60% nitrogen. The monolith was then heated to 800° C. in 5 hours, then to 900° C. in 10 hours, and held at this temperature for 10 hours in an atmosphere of 10% chlorine and 90% helium. The monolith was then held at 900° C. for 95 hours in an atmosphere of 80% oxygen and 20% helium. The monolith was then heated to 1000° C. in 15 hours in an atmosphere of 10% oxygen and 90% helium, and held at 1000° C. for 8.5 hours in pure helium. The monolith was then heated in an atmosphere of helium to a temperature of 1280° C. in one hour and held at that temperature for 8 minutes. The monolith was then allowed to cool to room temperature over the course of 24 hours in a nitrogen atmosphere. The resultant monolith was consolidated into an optical quality glass sol-gel-derived rod.

EXAMPLE 2

For 18 hours, a dry Ge-doped gel monolith was heated from room temperature to 160° C. and then to 400° C. in an atmosphere of 20% oxygen and 80% nitrogen. The monolith was then heated to 700° C. in 25 hours and held at that temperature for 20 hours in an atmosphere of 40% oxygen and 60% nitrogen. In an atmosphere of 10% chlorine and 90% helium, the monolith was heated to 800° C. in 10 hours. The monolith was then heated to 900° C. in 10 hours, and held at 900° C. for 5 hours in an atmosphere of 6% chlorine and 94% oxygen. The monolith was then heated to 950° C. in 10 hours and held at 950° C. for 25 hours in an atmosphere of 80% oxygen and 20% helium. The monolith was then heated in an atmosphere of helium at a temperature of 950° C. for 10 hours and then heated to 1100° C. in 5 hours and further heated to a temperature of 1280° C. in one hour and held at that temperature for 10 minutes. After cooling to room temperature in helium, the resultant monolith was consolidated into an optical quality glass sol-gel-derived rod.

Forming the Optical Fiber Preform

An optical fiber preform, from which optical fiber is drawn, typically consists of a doped silica cylindrical core portion and at least one tubular cladding portion around and concentric with the core portion. Optical fibers with sufficient optical properties (e.g., low attenuation) typically have a refractive index of the cladding portion which is between approximately 0.3% and approximately 0.4% less than the refractive index of the core portion. To increase the refractive index of the core portion, the core portion can be doped with germanium, phosphorous, or a combination of Ge and P. Both Ge and P have deep ultraviolet and infrared cutoff wavelengths. To decrease the refractive index of the cladding portion, the cladding portion can be doped with fluorine.

Figure 28A:
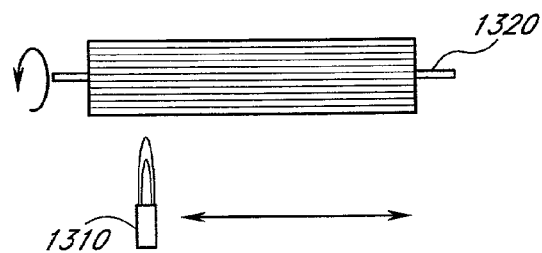
FIGS. 28A–C schematically illustrate prior art deposition processes for forming optical fiber preforms.

Various methods are described in the prior art which utilize vapor deposition of fine particles (or soot) of pure silica, fluorine-doped silica, and germanium-doped silica for producing optical fiber preforms with the desired refractive indices. For example, outside vapor deposition (OVD) is used by Corning, Inc. of Corning, N.Y. to fabricate its SMF-28 optical fibers. As schematically illustrated in FIG. 28A, the OVD process utilizes a burner 1310 (supplied by appropriate vapors and fuel) which moves laterally along a horizontal, rotating mandrel 1320, depositing germanium-doped silica layer-by-layer onto the mandrel to a predetermined thickness (which eventually becomes the core portion). After depositing a pure silica cladding portion in the same manner onto the germanium-doped core portion, the mandrel 1310 is removed, and the remaining tube is consolidated (or densified) at approximately 1500° C. to 1600° C. to form the optical fiber preform.

Figure 28B:
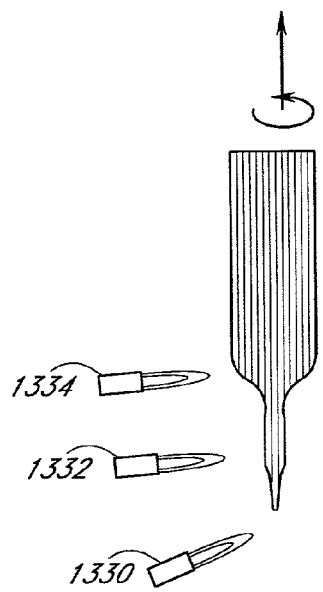

Another vapor deposition technique described in the prior art for forming optical fiber preforms is called vertical axial deposition (VAD), and is schematically illustrated in FIG. 28B. During the VAD process, the core portion and the cladding portion are deposited axially and simultaneously using multiple burners. The first burner 1330 deposited the core portion and subsequent burners 1332, 1334 deposit the cladding portion over the core portion as the boule is rotated and drawn upwards. The VAD process can provide continuous preform formation, with deposition rates suitable for batch processes. After deposition, the deposited soot is consolidated to form the optical fiber preform under similar conditions as in OVD.

Figure 28C:
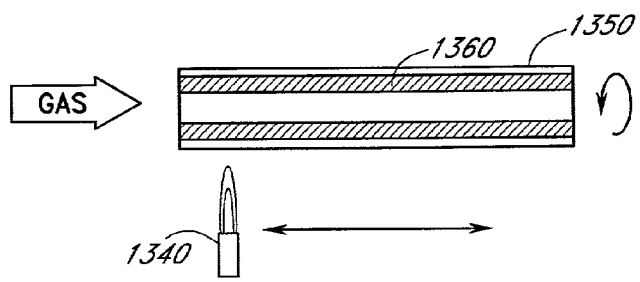

Another common vapor deposition technique described in the prior art for forming optical fiber preforms is called modified chemical vapor deposition (MCVD), and is schematically illustrated in FIG. 28C. During the MCVD process, a traversing oxygen/hydrogen burner 1340 is used to heat a rotating pure silica tube 1350. High-purity gas mixtures are injected into one end of the tube 1350, producing soot 1360 which is deposited and vitrified on the inside diameter of the tube. In certain configurations, a cladding portion is deposited first, which comprises either pure silica or fluorine-doped silica. In certain other configurations, the cladding portion corresponds to the pure silica tube 1350 itself. The core portion, comprising germanium-doped silica, is deposited next, until the tube 1350 is closed by the deposited soot 1360. After deposition, the deposited soot 1360 is consolidated to form the optical fiber preform.

Figure 28D:
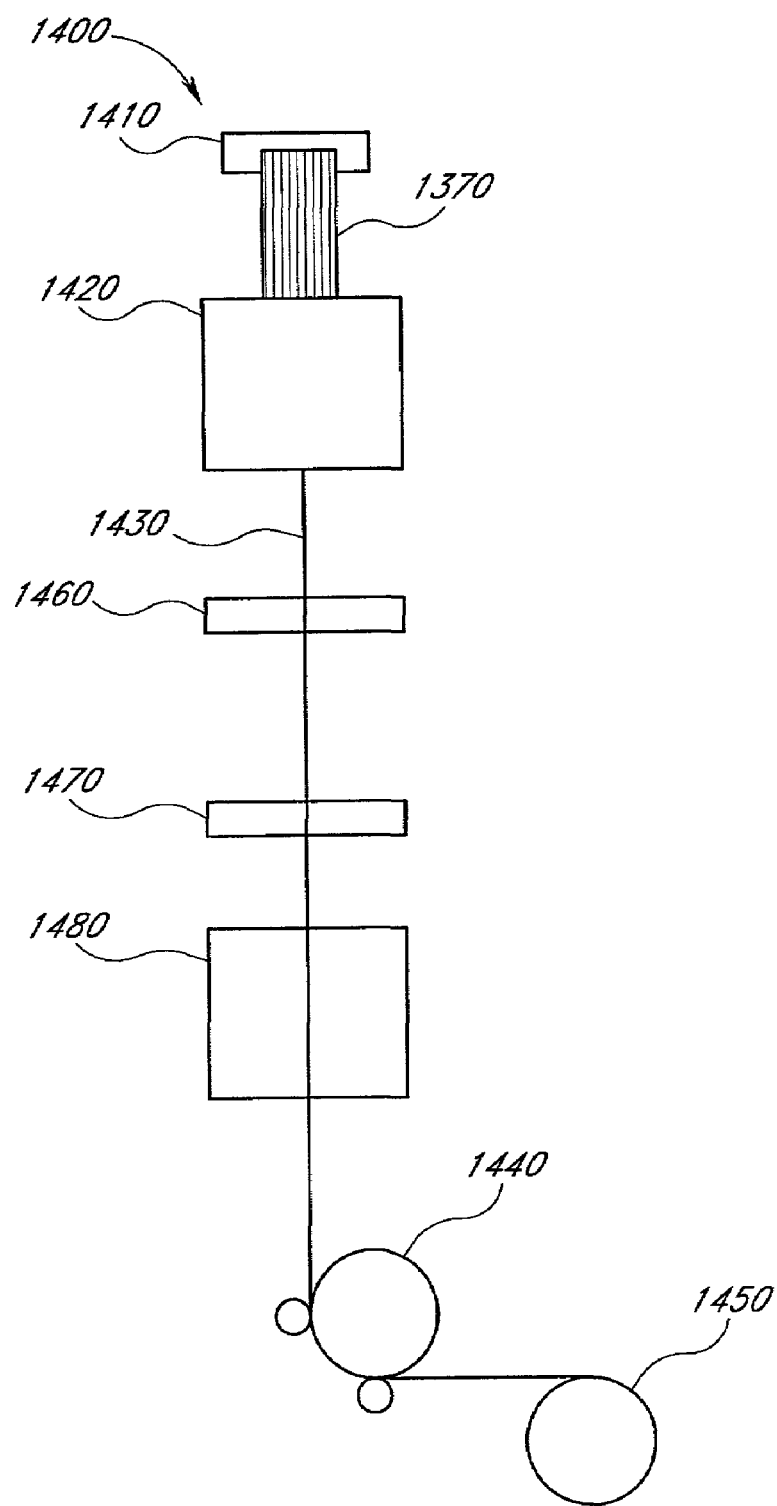
FIG. 28D schematically illustrates a prior art drawing process for forming optical fiber from an optical fiber preform.

Once formed, the optical fiber preform 1370 is used to fabricate a continuous strand of optical fiber. The completed optical fiber preform 1370 is drawn using a draw tower 1400, as schematically illustrated in FIG. 28D. A movable preform holder 1410 holds the preform 1370 which extends into the furnace 1420. The tip of the preform 1370 is heated until a piece of molten glass begins to fall, pulling a thin glass strand or fiber 1430 behind it. The fiber 1430 is threaded through the other components of the draw tower 1400, including a computer-controlled tractor assembly 1440 which continues to pull the fiber 1430 through the draw tower 1400, and a take-up spool 1450 which collects the resultant fiber 1430.

The diameter of the fiber 1430 is dependent on the speed at which the fiber 1430 is pulled through the draw tower 1400, and the diameter is monitored by a precise detector 1460 coupled to the tractor assembly 1440. To ensure a specified outside diameter of the fiber 1430, the pulling speed of the tractor assembly 1400 is modified in response to signals from the detector 1460. Coatings can be applied to the fiber 1430 using an applicator 1470, and the coatings can be cured using ultraviolet lamps 1480.

Alternatively, the optical fiber preform, including the core portion and cladding portion, can be fabricated using sol-gel techniques. However, prior art systems which utilize sol-gel techniques suffer from various difficulties which have hindered the mass production of sol-gel-derived optical fiber preforms. As described by Kirkbir, et al., these difficulties include precipitation of germanium, thereby reducing the homogeneity of the resultant gel monolith, and bubbling of germanium-doped glass rods during the high-temperature fiber drawing process. In addition, prior art techniques result in gel monoliths with relatively small pore sizes, thereby making it more difficult to dry and consolidate the gel monolith without cracking.

As described herein, sol-gel-derived rods fabricated in accordance with embodiments of the present invention avoid problems encountered when using prior art sol-gel techniques. In certain embodiments, filtering the sol-gel solution after mixing with a 0.05 μm filter removes Ge precipitates. In other embodiments, the sol-gel solution comprises phosphorous which stabilizes Ge in the network, and facilitates achieving the desired refractive index while using less Ge. In other embodiments, consolidation under an oxygen-containing atmosphere can serve to stabilize Ge in the network. As described above, the xerogel monolith is consolidated so as to reduce or eliminate bubbling of the glass rods during the drawing process. In addition, the pore diameter distributions for wet gel monoliths and xerogel monoliths fabricated in accordance with embodiments of the present invention are sufficiently large to facilitate drying and consolidating without cracking the resultant monolith.

Figure 29:
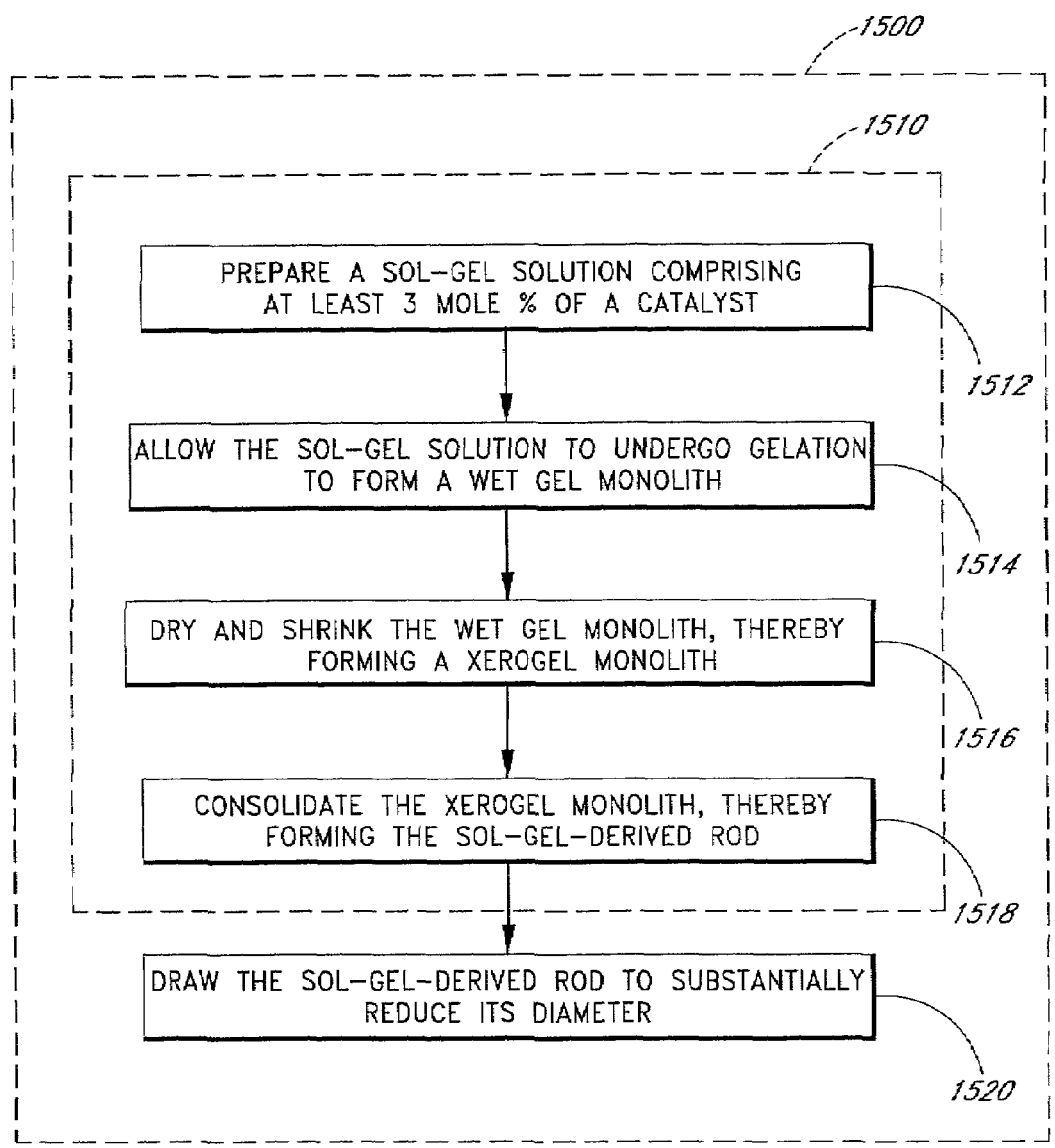
FIG. 29 is a flow diagram of a method of forming an optical fiber preform in accordance with embodiments of the present invention.

FIG. 29 is a flow diagram of a method 1500 of forming an optical fiber preform 1600 in accordance with certain embodiments of the present invention. FIGS. 30A–30E schematically illustrate various interim stages in the fabrication of the optical fiber preform 1600 in accordance with embodiments of the present invention. While the flow diagram of FIG. 29 illustrates a particular embodiment with steps in a particular order, other embodiments with different orders of steps are also compatible with the present invention.

In the embodiment described by FIG. 29, the method 1500 comprises an operational block 1510 in which a sol-gel-derived rod 1610 having a first diameter $D_1$ is formed. As illustrated in the flow diagram of FIG. 29, forming the sol-gel-derived rod 1610 comprises an operational block 1512 in which a sol-gel solution comprising at least 3 mole % of a catalyst is prepared. As described above, preparing such a sol-gel solution in certain embodiments is performed at a mixing temperature substantially below room temperature, thereby allowing higher catalyst concentrations with sufficiently long gelation times.

In an operational block 1514, the sol-gel solution is allowed to undergo gelation to form a wet gel monolith, as described above. In certain embodiments, the sol-gel solution is placed in a cylindrical mold in which the sol-gel solution undergoes gelation, resulting in a cylindrical wet gel monolith. As described herein, in certain other embodiments, the sol-gel solution is placed in a tubular mold in which the sol-gel solution undergoes gelation, resulting in a tubular wet gel monolith. The cross-section of such tubular wet gel monoliths can be square, rectangular, hexagonal, or have an arbitrary shape. In still other embodiments, the sol-gel solution can be one of a plurality of sol-gel solutions for multiple castings, resulting in a multiply-cast wet gel monolith. The sol-gel-derived rod 1610 formed by such embodiments can comprise a step-index or gradient-index glass, in which portions of the sol-gel-derived rod 1610 with differing refractive indices are formed by separate castings.

In an operational block 1516, the wet gel monolith is dried and shrunk by exposing the wet gel monolith to a temporal temperature profile. As described above, drying and shrinking the wet gel monolith forms a xerogel monolith. In an operational block 1518, the xerogel monolith is consolidated as described above, thereby forming the sol-gel-derived rod 1610.

Figure 30A:
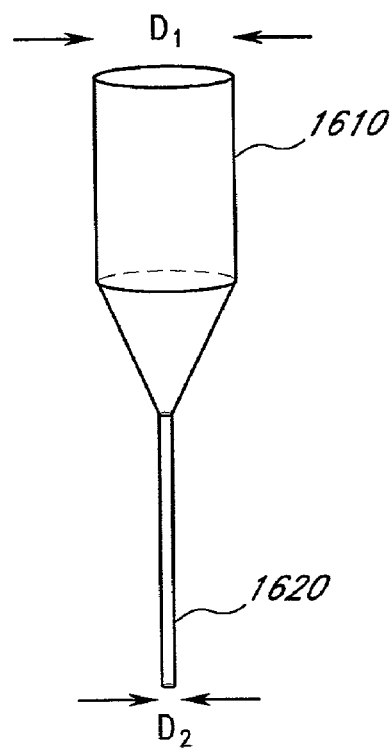
FIGS. 30A–30E schematically illustrate interim stages of forming the optical fiber preform.

In the embodiment described by FIG. 29, the method 1500 further comprises an operational block 1520 in which the sol-gel-derived rod 1610 is drawn to substantially reduce its diameter. In this way, a drawn rod 1620 is formed, the drawn rod 1620 having a second diameter $D_2$ less than the first diameter $D_1$. FIG. 30A schematically illustrates the drawn rod 1620 in relation to the sol-gel-derived rod 1610.

Drawing the sol-gel-derived rod 1610 in certain embodiments comprises heating the sol-gel-derived rod 1610 at a softening temperature (which can be at least 1400° C.) in a furnace tower, extracting one end of the sol-gel-derived rod 1610 from the furnace tower at an extraction speed, and adjusting the extraction speed to form the drawn rod 1620 with the second diameter $D_2$ substantially equal to a predetermined value. Certain embodiments of the drawing process are similar to the prior art process of drawing an optical fiber preform to fabricate optical fiber, as described above. In certain embodiments, the first diameter $D_1$ is between approximately 30 mm and approximately 65 mm, and the second diameter $D_2$ is between approximately 4 mm and approximately 8 mm.

Figure 31A:
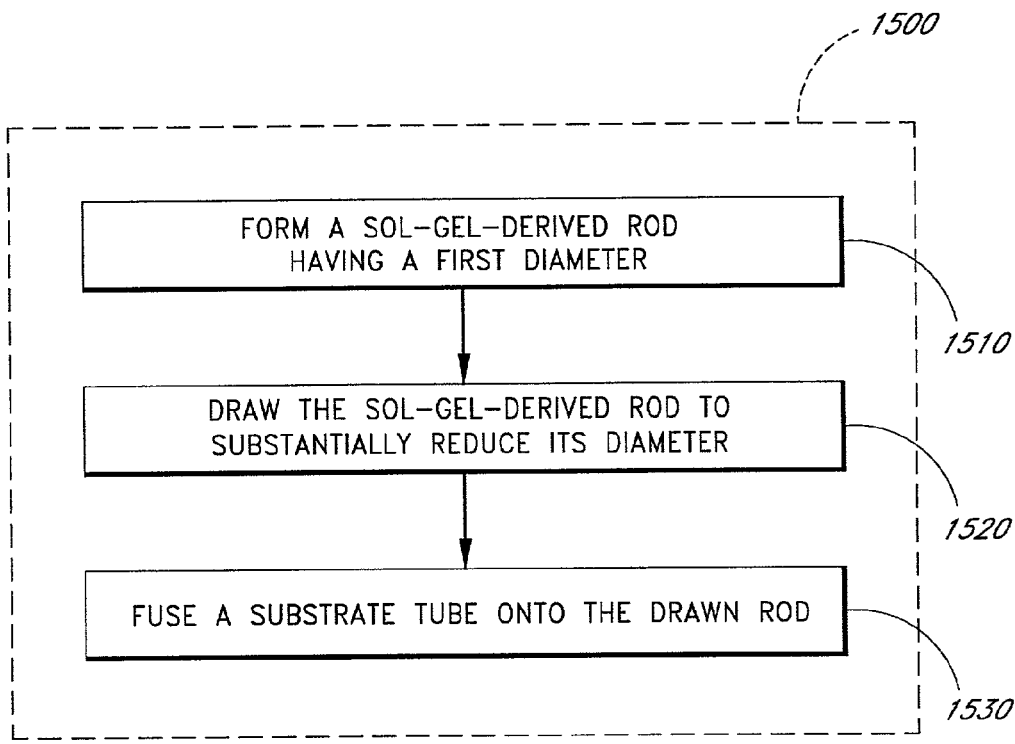
FIGS. 31A and 31B are flow diagrams of alternative embodiments of the method of forming the optical fiber preform.
Figure 31B:
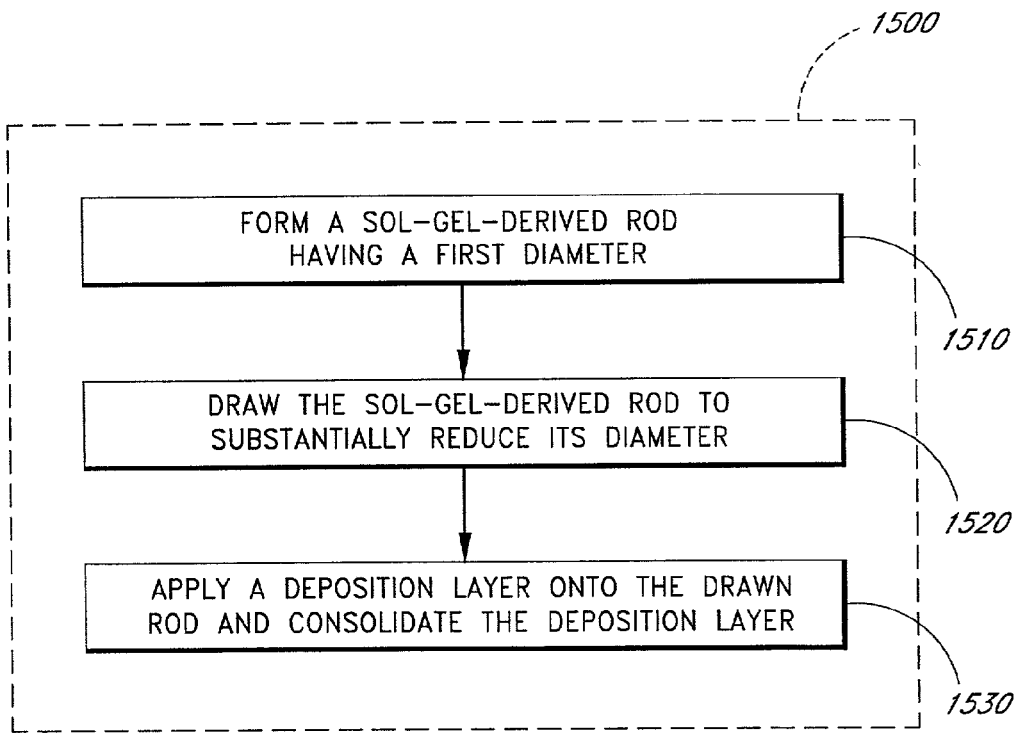

In certain embodiments, as illustrated in the flow diagrams of FIGS. 31A and 31B, the method 1500 further comprises an operational block 1530 in which a substrate portion 1632 is formed around the drawn rod 1620, thereby forming a substrate rod 1630 with a third diameter $D_3$. The substrate portion 1632 of certain embodiments corresponds to a substrate portion of the resultant fiber, while the sol-gel-derived rod 1610 corresponds to the core portion of the resultant fiber.

Figure 30B:
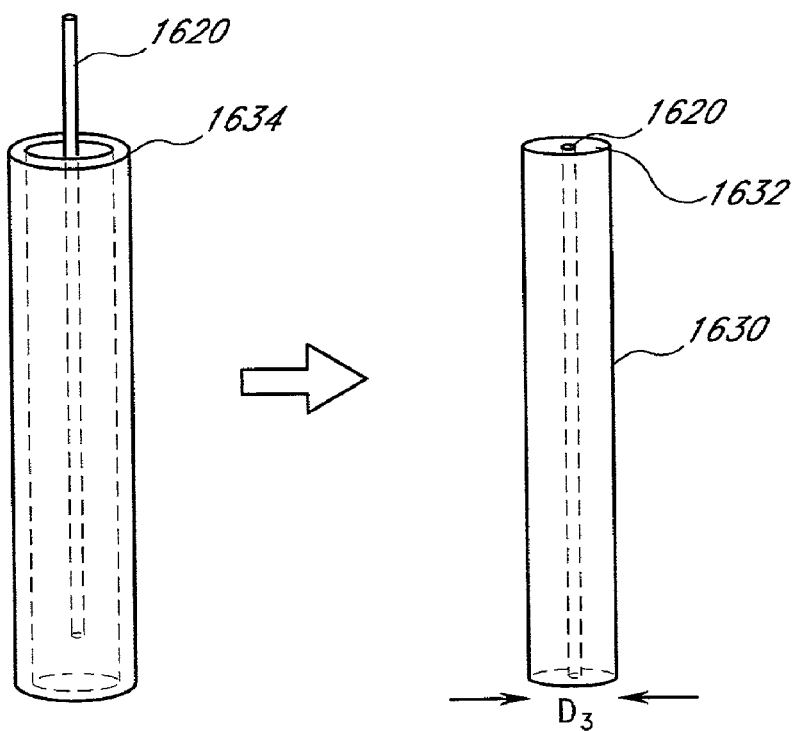

In certain embodiments, as illustrated in FIGS. 30B and 31A, forming the substrate portion 1632 comprises fusing a substrate tube 1634 onto the drawn rod 1620. In certain such embodiments, fusing the substrate tube 1634 onto the drawn rod 1620 can comprise inserting the drawn rod 1620 into the substrate tube 1634, heating the substrate tube 1634, collapsing the substrate tube 1634 onto the drawn rod 1620, and annealing the substrate tube 1634 and the drawn rod 1620. A vacuum can be applied in a region between the substrate tube 1634 and the drawn rod 1620. In addition, in certain embodiments, a gas can be introduced in the region between the substrate tube 1634 and the drawn rod 1620. Fusing silica tubes onto silica rods is a known process, and persons skilled in the art can select process parameters (e.g., heating and annealing temperatures, vacuum pressure, gas concentrations, and collapse rates) in accordance with embodiments of the present invention.

In an exemplary embodiment, a sol-gel-derived Ge-doped rod 1610 is reduced to a drawn rod 1620 having a predetermined second diameter $D_2$, as illustrated in FIG. 30A, and cut to a predetermined length (e.g., 1000 to 1500 mm). The predetermined second diameter $D_2$ is calculated based on the size of the preform to be manufactured and on the type of optical fiber being fabricated (e.g., single-mode or multi-mode fiber). Quartz handles can be welded onto the ends of the sol-gel-derived rod 1610, as well as on the silica substrate tube 1634 and silica sleeving tube 1644, to facilitate handling and to minimize waste of material.

During the drawing process on the draw tower 1400, as schematically illustrated in FIG. 28D, the sol-gel-derived rod 1610 is heated using an induction furnace 1420 and the diameter of the drawn rod 1620 is measured online using a detector 1460 comprising a diameter gauge coupled to the tractor assembly 1440 via the control system (not shown) so that the speed of the draw is maintained at a desired level to yield the predetermined second diameter within tolerances. The drawn rod 1620 is inspected and firepolished, if necessary, to remove surface bubbles or other imperfections.

Continuing the exemplary embodiment, a substrate tube 1634 (e.g., Heraeus F300) is selected based on the size of the preform to be manufactured. A cleaning pass is performed on the inside surface of the substrate tube 1634 by one torch pass in an atmosphere comprising approximately 0.3% $Cl_2$, approximately 80% $O_2$, with the balance He. After etching approximately 100 μm thickness from the drawn rod 1620, the drawn rod 1620 is inserted into the substrate tube 1634 on a sleeving lathe, which is typically in either a vertical or horizontal configuration. The substrate tube 1634 is positioned to be concentric with the drawn rod 1620, with a gap of approximately 2 mm between the inside diameter of the substrate tube 1634 and the outside diameter of the drawn rod 1620.

After an additional cleaning pass comprising a torch pass in an atmosphere comprising approximately 0.3% $Cl_2$, approximately 80% $O_2$, with the balance He, a helium soak is performed for approximately 3 hours by traversing the torch along the substrate tube 1634 in an atmosphere comprising approximately 17% He and approximately 83% $O_2$. The substrate tube 1634 is then collapsed onto the drawn rod 1620 to form the substrate rod 1630 by heating in an atmosphere of approximately 17% He and approximately 83% $O_2$ at a vacuum of approximately 0.15 inches of water (0.28 Torr) between the drawn rod 1620 and the substrate tube 1634. The oxygen is turned off just prior to the collapse of the substrate tube 1634 to reduce the probability of bubble formation. Forming the substrate rod 1630 further comprises stretching the collapsed substrate tube 1634 and drawn rod 1620 to have a predetermined diameter. A sleeve tube 1644 can then be collapsed onto the substrate rod 1630 using similar processes to fabricate the optical fiber preform 1600 to final predetermined dimensions.

In addition, forming the substrate portion 1632 can further comprise applying a deposition layer onto an inner surface of the substrate tube 1634 prior to fusing the substrate tube 1634 onto the drawn rod 1620 and consolidating the deposition layer. Such embodiments can utilize known MCVD techniques to apply the deposition layer, which can have a different refractive index than does the drawn rod 1620, but matched to the substrate tube 1634. In this way, the refractive index of the resultant optical fiber preform 1600 can be tailored to a predetermined profile.

Figure 30C:
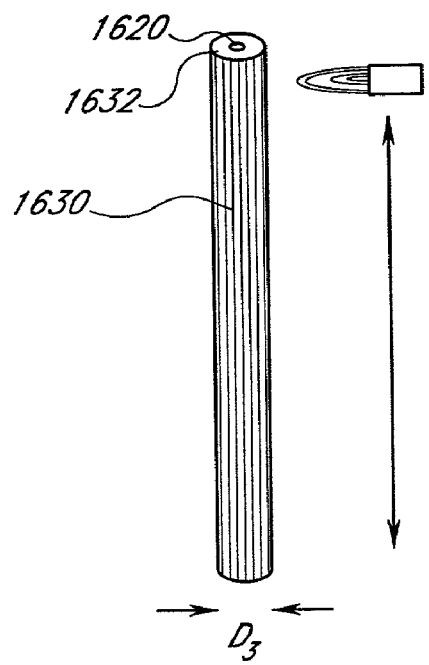

In certain other such embodiments, forming the substrate portion 1632, as illustrated in FIGS. 30C and 31B, comprises applying a deposition layer onto the drawn rod 1620 and consolidating the deposition layer. Such embodiments can utilize known OVD techniques to apply the deposition layer. In such embodiments, the silica material can be deposited onto a doubly-cast sol-gel-derived monolith, not directly onto a surface of a Ge-doped silica rod, prior to drawing the rod.

Figure 30D:
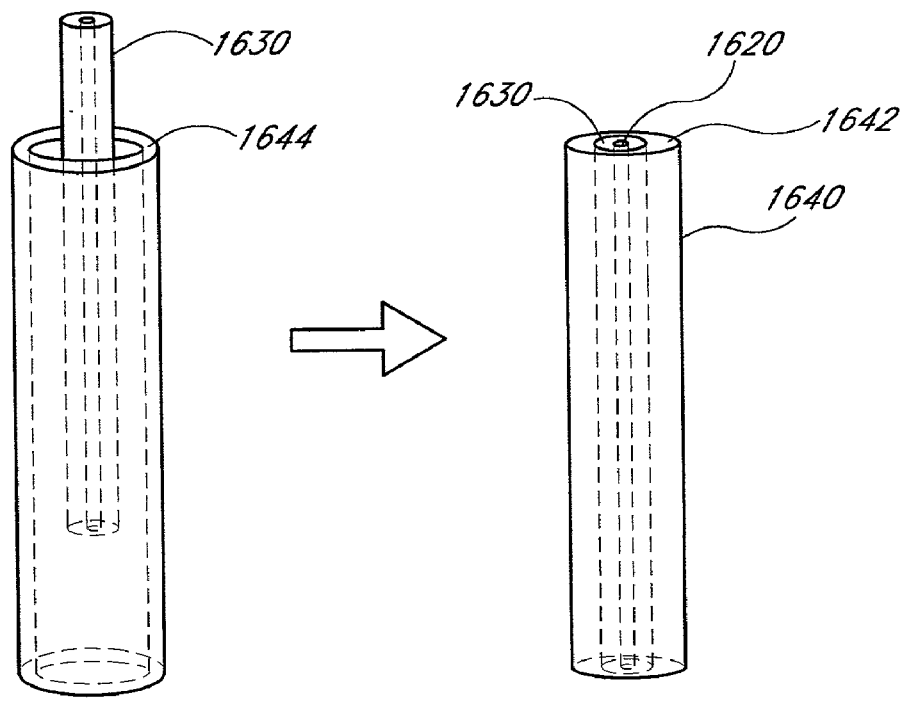
Figure 32A:
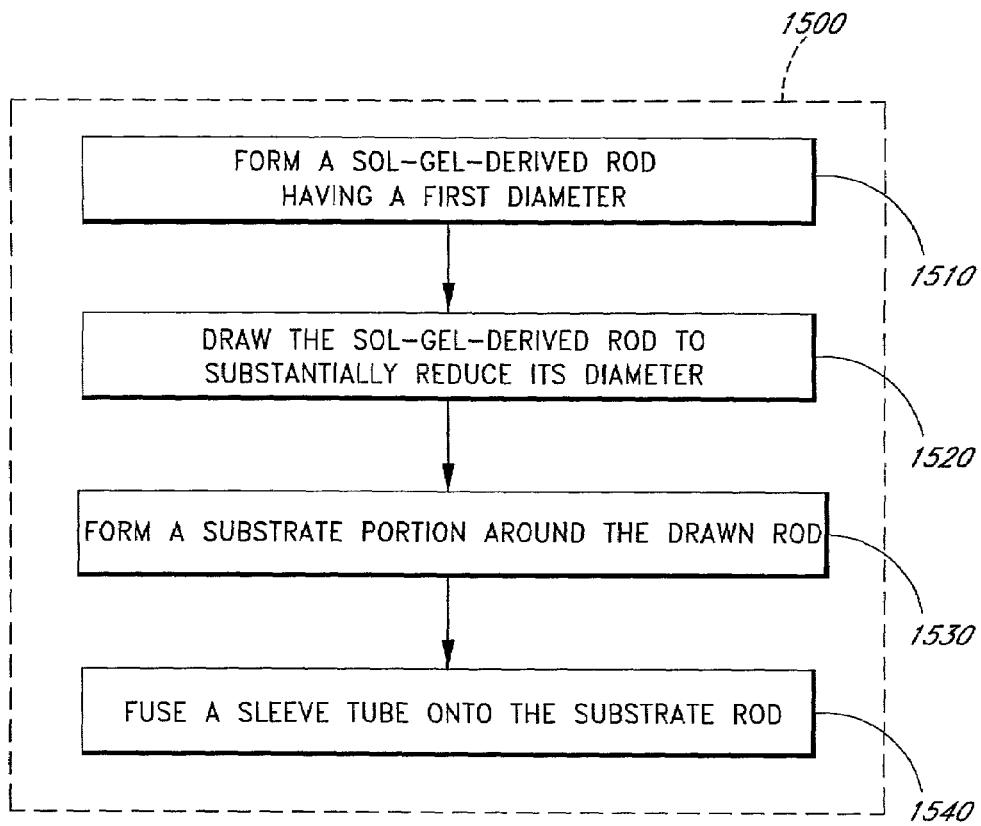
FIGS. 32A and 32B are flow diagrams of additional alternative embodiments of the method of forming the optical fiber preform.
Figure 32B:
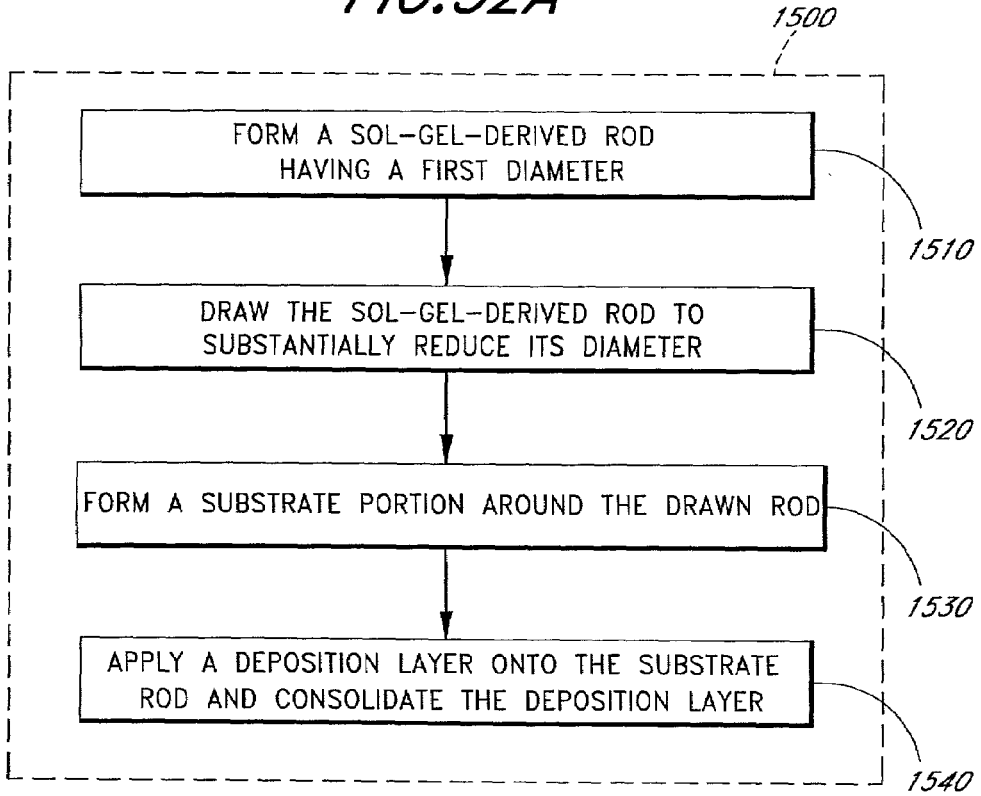

In certain embodiments, as illustrated in the flow diagrams of FIGS. 32A and 32B, the method 1500 further comprises an operational block 1540 in which a sleeve portion 1642 is formed around the substrate rod 1630, thereby forming the optical fiber preform 1640 with a fourth diameter $D_4$. The sleeve portion 1642 of certain embodiments serves to provide a fourth diameter $D_4$ which conforms to a predetermined value conducive to subsequent processing. In certain such embodiments, as illustrated in FIGS. 30D and 32A, forming the sleeve portion 1642 comprises fusing a sleeve tube 1644 onto the substrate rod 1630. In certain embodiments, the sleeve tube 1644 comprises a Heraeus F300 quartz tube, and the fusing process is as described above in relation to fusing the substrate tube 1634 onto the drawn rod 1620.

In certain such embodiments, fusing the sleeve tube 1644 onto the substrate rod 1630 can comprise inserting the substrate rod 1630 into the sleeve tube 1644, heating the sleeve tube 1644, collapsing the sleeve tube 1644 onto the substrate rod 1630, and annealing the sleeve tube 1644 and the substrate rod 1630. A vacuum can be applied in a region between the sleeve tube 1644 and the substrate rod 1630. In addition, in certain embodiments, a gas can be introduced in the region between the sleeve tube 1644 and the substrate rod 1630. The sleeve tube 1644 of certain embodiments comprises substantially defect-free (i.e., low bubble density) silica glass. Sleeve tubes 1644 compatible with embodiments of the present invention can be obtained from Heraeus Tenevo, Inc. of Duluth, Ga. or GE Quartz, Inc. of Willoughby, Ohio. As described above, fusing silica tubes onto silica rods is a known process, and persons skilled in the art can select process parameters (e.g., heating and annealing temperatures, vacuum pressure, gas concentrations, and collapse rates) in accordance with embodiments of the present invention.

Figure 30E:
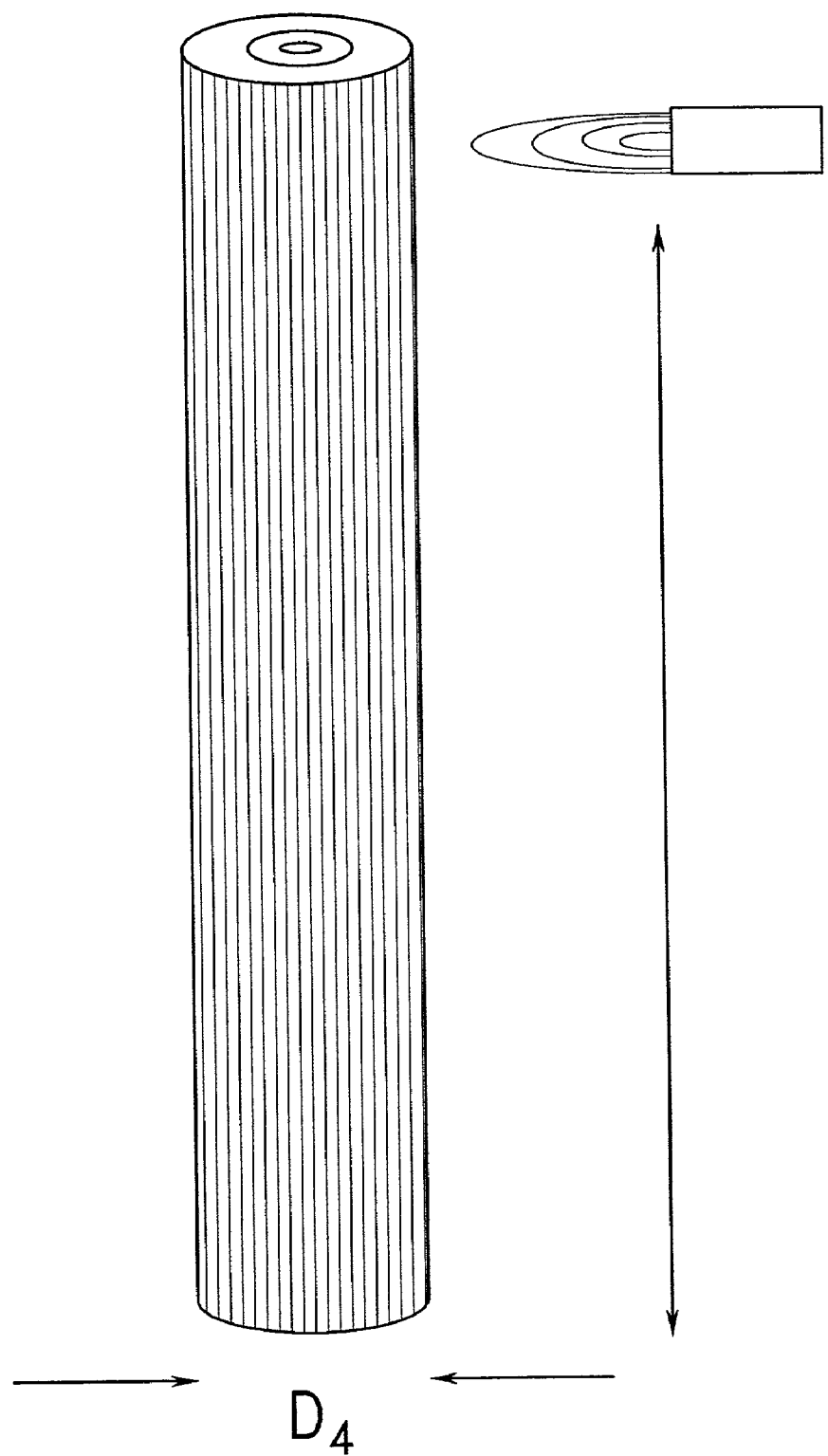

In certain other such embodiments, forming the sleeve portion 1642, as illustrated in FIGS. 30E and 32B, comprises applying a deposition layer onto the substrate rod 1630 and consolidating the deposition layer. Such embodiments can utilize known OVD techniques to apply the deposition layer.

Other methods of forming the optical fiber preform are compatible with embodiments of the present invention. In certain embodiments, the sol-gel-derived rod 1620 comprises pure silica, while in other embodiments, the sol-gel-derived rod 1620 comprises silica doped to have a predetermined refractive index profile or to provide amplification of optical signals. Examples of dopants include, but are not limited to, germanium, fluorine, aluminum, boron, phosphorous, erbium, and rare earth elements. [discuss other embodiments]

In certain embodiments in which the sol-gel-derived rod 1620 comprises a cylindrical core portion and a tubular cladding portion, the tubular cladding portion is around and concentric with the core portion. The cladding portion of certain such embodiments has a refractive index which is between approximately 0.3% and approximately 0.4% less than the refractive index of the core portion. As described above, the sol-gel-derived rod 1620 can be fabricated by a multiple casting process in which a cladding gel is formed by allowing a first sol-gel solution to gel while confined to a predetermined tubular volume, and allowing a second sol-gel solution to gel while confined to a predetermined inner volume within the tubular volume. In certain such embodiments, the ratio of the diameter of the core portion to the diameter of the cladding portion is less than approximately 1/2.

In certain embodiments, the substrate portion 1630 of the optical fiber preform 1640 has a refractive index which is between approximately 0.3% and approximately 0.4% less than the refractive index of the sol-gel-derived rod 1620. The ratio of the diameter $D_2$ of the sol-gel-derived rod 1620 to the diameter $D_3$ of the substrate portion 1630 in certain embodiments is between approximately 4/125 and approximately 10/125, corresponding to a single-mode optical fiber. In other embodiments, the ratio of $D_2/D_3$ is between approximately 50/125 and approximately 100/140, corresponding to a multiple-mode optical fiber.

In certain embodiments in which the optical fiber preform 1640 comprises a sleeve portion 1642, the ratio of the diameter $D_2$ of the sol-gel-derived rod 1620 to the diameter $D_4$ of the optical fiber preform 1640 is between approximately 4/125 and approximately 10/125, corresponding to a single-mode optical fiber. In other embodiments, the ratio of $D_2/D_4$ is between approximately 50/125 and approximately 100/140, corresponding to a multiple-mode optical fiber.

The optical fiber preform 1640 fabricated in accordance with embodiments of the present invention can be drawn in accordance with prior art methods to form an optical fiber. The properties of the resultant optical fiber are dependent upon the fabrication process used to form the optical fiber preform 1640. In certain embodiments, the resultant optical fiber has a mode-field diameter $D_{mf}$ wherein the ratio of $D_{mf}$ to the outer diameter of the optical fiber is between approximately 4/125 and approximately 12/125.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. A mold for forming a gel monolith comprising a first gel portion and a second gel portion, the mold comprising:
   a base comprising a first hydrophobic surface;
   a tubular outer wall comprising a second hydrophobic surface, the outer wall coupled to the base;
   a removable tubular insert comprising an inner surface and an outer hydrophobic surface, the insert removably coupled to the base; and
   a plug removably coupled to the tubular insert, thereby forming an airtight seal between the plug and the tubular insert.

2. The mold of claim 1, wherein the base is removably coupled to the outer wall.

3. A mold for forming a gel monolith comprising a first gel portion and a second gel portion, the mold comprising:
   a base comprising a first hydrophobic surface;
   a tubular outer wall comprising a second hydrophobic surface, the outer wall coupled to the base; and
   a removable tubular insert comprising an inner surface and an outer hydrophobic surface, the insert removably coupled to the base, wherein the base further comprises:
   a first base portion coupled to the outer wall, the first base portion comprising the first hydrophobic surface, a cavity, and a mating surface, the cavity extending from the first hydrophobic surface to the mating surface;
   a second base portion comprising a tubular projection adapted to couple to the insert, the second base portion adapted to couple to the mating surface with the tubular projection coupled to the cavity; and
   a third base portion comprising a solid projection, the third base portion adapted to couple to the mating surface with the solid projection filling the cavity, wherein the second and third base portions are interchangeably removably coupled to the first base portion.

4. The mold of claim 3, wherein the solid projection has a hydrophobic top surface that is substantially flush with the first hydrophobic surface when the third base portion is coupled to the first base portion.

5. The mold of claim 3, wherein the insert fits through the cavity and is coupled to the tubular projection when the second base portion is coupled to the first base portion.

6. The mold of claim 1, wherein the first hydrophobic surface comprises polytetrafluoroethylene (PTFE), polystyrene (PS), or polymethylpentene (PMP).

7. The mold of claim 1, wherein the first hydrophobic surface is tapered from the tubular outer wall to the tubular insert.

8. The mold of claim 7, wherein the first hydrophobic surface has a spherical curvature.

9. The mold of claim 1, wherein the base comprises a cylindrical recess and the outer wall is cylindrical and is removably coupled to the recess.

10. The mold of claim 1, wherein the second hydrophobic surface comprises polytetrafluoroethylene (PTFE), polystyrene (PS), polymethylpentene (PMP), or quartz coated with dichlorodimethylsilane (DCDMS).

11. The mold of claim 1, wherein the insert is interior to and spaced from the outer wall so as to form a volume for receiving a sol-gel solution.

12. The mold of claim 1, wherein the insert is removably coupled to the base so as to form an airtight seal between the insert and the base.

13. The mold of claim 1, wherein the outer hydrophobic surface comprises polytetrafluoroethylene (PTFE), polystyrene (PS), polymethylpentene (PMP), or quartz coated with dichlorodimethylsilane (DCDMS).

14. The mold of claim 1, wherein the second hydrophobic surface is cylindrical and the outer hydrophobic surface is cylindrical and concentric with the second hydrophobic surface.

15. The mold of claim 1, wherein the base further comprises a bottom surface and a cavity adapted to couple the base to the insert.

16. The mold of claim 15, wherein the cavity extends from the first hydrophobic surface to the bottom surface.

17. The mold of claim 15, further comprising a bottom wall which encloses one end of the outer wall.

18. The mold of claim 17, wherein the base is within a volume defined by the outer wall and the bottom wall.

19. The mold of claim 17, wherein the bottom wall comprises the base.

20. A mold for forming a gel monolith comprising a first gel portion and a second gel portion, the mold comprising:
   a base comprising a first hydrophobic surface;
   a tubular outer wall comprising a second hydrophobic surface, the outer wall coupled to the base;
   a removable tubular insert comprising an inner surface and an outer hydrophobic surface, the insert removably coupled to the base; and
   a cap removably coupled to the outer wall and the insert, the cap having a third hydrophobic surface.

21. The mold of claim 20, wherein the third hydrophobic surface comprises polytetrafluoroethylene (PTFE), polystyrene (PS), or polymethylpentene (PMP).

22. A mold for forming a gel monolith comprising a first gel portion and a second gel portion, the mold comprising:
   a base comprising a first hydrophobic surface;
   a tubular outer wall comprising a second hydrophobic surface, the outer wall coupled to the base; and
   a removable tubular insert comprising an inner surface and an outer hydrophobic surface, the insert removably coupled to the base, wherein the base further comprises:
   a mating surface with a first seal, whereby the mating surface is removably coupled to the outer wall and the first seal forms a liquid-tight seal between the base and the outer wall;
   a cavity removably coupled to the insert;

a recess;

a removable second seal between the cavity and the recess, the second seal forming a removable liquid-tight seal between the cavity and the recess; and a plug removably coupled to the recess, whereby removing the plug and second seal from the recess fluidly couples the cavity and the recess.

23. The mold of claim 22, wherein the first hydrophobic surface has a sufficiently large radius of curvature along an edge of the cavity so as to avoid stress-generating corners between the first gel portion and the second gel portion.

24. A mold for forming a gel monolith comprising a first gel portion and a second gel portion, the mold comprising:

a base comprising a first hydrophobic surface;

a tubular outer wall comprising a second hydrophobic surface, the outer wall coupled to the base; and a removable tubular insert comprising an inner surface and an outer hydrophobic surface, the insert removably coupled to the base, wherein the base further comprises:

a bottom wall which encloses one end of the outer wall; and a plug removably coupled to the bottom wall, whereby the plug forms a removable liquid-tight seal between the plug and the bottom wall.

25. A mold for forming a gel monolith comprising a first gel portion and a second gel portion, the mold comprising:

a base comprising a first hydrophobic surface;

a tubular outer wall comprising a second hydrophobic surface, the outer wall coupled to the base; and an insert removably coupled to the base, the insert comprising:

a first portion removably coupled to the base;

a second portion spaced from the base;

an outer hydrophobic surface; and an inner surface defining a conduit which fluidly couples the first portion and the second; and a plug removably coupled to the tubular insert, thereby forming an airtight seal between the plug and the tubular insert.

26. The mold of claim 25, wherein the outer wall is removably coupled to the base.

\* \* \* \* \*

UNITED STATES PATENT AND TRADEMARK OFFICE
CERTIFICATE OF CORRECTION

PATENT NO. : 7,000,885 B2  Page 1 of 1
APPLICATION NO. : 10/062746
DATED : February 21, 2006
INVENTOR(S) : Shiho Wang et al.

It is certified that error appears in the above-identified patent and that said Letters Patent is hereby corrected as shown below:

In Col. 3, Line 5, delete "cylidrical" and insert -- cylindrical --.

In Col. 13, Line 9, delete "Å." and insert -- Å). --.

In Col. 15, Line 13, delete "filly" and insert -- fully --.

In Col. 15, Line 36, delete "filly" and insert -- fully --.

In Col. 29, Line 30, delete "(i.e.," and insert -- , i.e., --.

In Col. 37, Line 58, delete "30hours." and insert -- 30 hours. --.

In Col. 52, Line 15, Claim 25, delete "second;" and insert -- second portion; --.

Signed and Sealed this

Twelfth Day of September, 2006

JON W. DUDAS
*Director of the United States Patent and Trademark Office*